(12) United States Patent
Maruyama et al.

(10) Patent No.: US 12,337,862 B2
(45) Date of Patent: Jun. 24, 2025

(54) VISUAL GUIDANCE DEVICE, ATTENTION CALLING SYSTEM, ATTENTION CALLING METHOD, AND PROGRAM

(71) Applicant: HONDA MOTOR CO., LTD., Tokyo (JP)

(72) Inventors: Masaki Maruyama, Wako (JP); Toshiaki Seo, Wako (JP); Minoru Higuchi, Wako (JP); Yuya Kishimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 18/549,271

(22) PCT Filed: Jan. 17, 2022

(86) PCT No.: PCT/JP2022/001330
§ 371 (c)(1),
(2) Date: Sep. 6, 2023

(87) PCT Pub. No.: WO2022/190630
PCT Pub. Date: Sep. 15, 2022

(65) Prior Publication Data
US 2024/0166229 A1    May 23, 2024

(30) Foreign Application Priority Data

Mar. 12, 2021  (JP) .................................. 2021-040411
Mar. 12, 2021  (JP) .................................. 2021-040412
Mar. 12, 2021  (JP) .................................. 2021-040549

(51) Int. Cl.
*B60W 50/14*    (2020.01)
*B60K 35/235*   (2024.01)
(Continued)

(52) U.S. Cl.
CPC ........... *B60W 50/14* (2013.01); *B60K 35/235* (2024.01); *B60K 35/285* (2024.01); *G06V 20/58* (2022.01);
(Continued)

(58) Field of Classification Search
CPC ......... B60W 50/14; B60W 2554/4041; B60W 2554/4044; B60W 2540/223;
(Continued)

(56) References Cited

U.S. PATENT DOCUMENTS

2009/0023116 A1   1/2009   Shaw
2009/0187343 A1   7/2009   Koch-Groeber et al.
(Continued)

FOREIGN PATENT DOCUMENTS

JP    2007-102639 A    4/2007
JP    2009-217682 A    9/2009
(Continued)

OTHER PUBLICATIONS

English translation of the International Preliminary Report on Patentability issued Sep. 21, 2023 in corresponding International application No. PCT/JP2022/001330 (7 pages).
(Continued)

*Primary Examiner* — Chico A Foxx
(74) *Attorney, Agent, or Firm* — Rankin, Hill & Clark LLP

(57) ABSTRACT

To reduce a chance that the driver overlooks the object that should be seen, a visual guidance device for guiding a visual line of a driver of the vehicle to an object existing ahead of the vehicle includes an object recognition unit for recognizing the object, and a display control unit for causing the display device to display the visual guidance virtual image for guiding the driver's visual line to a position corresponding to the object recognized by the object recognition unit on
(Continued)

a windshield of the vehicle. The display control unit sets a length of the visual guidance virtual image to be displayed by the display device in the vehicle width direction to a length in accordance with a status of the object existing ahead of the vehicle.

20 Claims, 30 Drawing Sheets

(51) Int. Cl.
*B60K 35/28* (2024.01)
*G06V 20/58* (2022.01)

(52) U.S. Cl.
CPC .... *B60K 2360/31* (2024.01); *B60K 2360/334* (2024.01); *B60K 2360/785* (2024.01); *B60W 2050/143* (2013.01); *B60W 2050/146* (2013.01); *B60W 2420/403* (2013.01); *B60W 2540/223* (2020.02); *B60W 2554/4041* (2020.02); *B60W 2554/4044* (2020.02)

(58) Field of Classification Search
CPC ..... B60W 2050/143; B60W 2050/146; B60W 2420/403; G06V 20/58; B60K 35/285; B60K 35/235; B60K 2360/785; B60K 2360/31; B60K 2360/334
See application file for complete search history.

(56) References Cited

U.S. PATENT DOCUMENTS

| | | | |
|---|---|---|---|
| 2012/0314074 A1 | 12/2012 | Aimura et al. | |
| 2018/0086346 A1* | 3/2018 | Fujisawa | B60W 50/14 |
| 2018/0118109 A1 | 5/2018 | Fujisawa et al. | |
| 2018/0118224 A1* | 5/2018 | Arita | B60K 35/213 |
| 2018/0198955 A1 | 7/2018 | Watanabe | |
| 2019/0088011 A1* | 3/2019 | Liu | G06T 15/20 |
| 2019/0092235 A1* | 3/2019 | Kim | B60Q 9/008 |
| 2019/0351823 A1 | 11/2019 | Van Der Meijs | |
| 2020/0064629 A1* | 2/2020 | Yamashita | B60K 35/23 |
| 2020/0282832 A1* | 9/2020 | Watanabe | B60K 35/10 |
| 2021/0165220 A1 | 6/2021 | Nakada et al. | |
| 2023/0046484 A1* | 2/2023 | Fang | B60K 35/00 |

FOREIGN PATENT DOCUMENTS

| | | | |
|---|---|---|---|
| JP | 2009244985 A | * | 10/2009 |
| JP | 2010-88045 A | | 4/2010 |
| JP | 2012-234410 A | | 11/2012 |
| JP | 2013-032082 A | | 2/2013 |
| JP | 2016-196289 A | | 11/2016 |
| JP | 2017-021546 A | | 1/2017 |
| JP | 2019-215620 A | | 12/2019 |
| JP | 2020-199839 A | | 12/2020 |
| WO | 2011/108218 A1 | | 9/2011 |
| WO | 2019/097918 A1 | | 5/2019 |

OTHER PUBLICATIONS

Japanese Office Action dated Feb. 20, 2024 issued in corresponding Japanese application No. 2023-505160; English machine translation included (15 pages).
International Search Report, International Application No. PCT/JP2022/001330, Date of mailing: Mar. 8, 2022, 3 pages.
Written Opinion of the International Searching Authority dated Mar. 8, 2022 filed in PCT/JP2022/001330, 5 pages.

* cited by examiner

FIG.18

| CATEGORY | COGNITION PROFICIENCY VALUE | | | | |
|---|---|---|---|---|---|
| | FIRST | SECOND | THIRD | FOURTH | FIFTH |
| VEHICLE APPEARING FROM CROSSING ROAD IN PRESENCE OF SHIELDING OBJECT | 5 | 4 | 4 | 4 | 3 |
| VEHICLE APPEARING FROM CROSSING ROAD IN ABSENCE OF SHIELDING OBJECT | 4 | 3 | 4 | 3 | 3 |
| PEDESTRIAN CROSSING TRAVELING ROAD AT INTERSECTION | 2 | 2 | 1 | 3 | 1 |
| VEHICLE RUNNING STRAIGHT ON OPPOSITE LANE OF TRAVELING ROAD AT INTERSECTION | 2 | 2 | 1 | 1 | 1 |

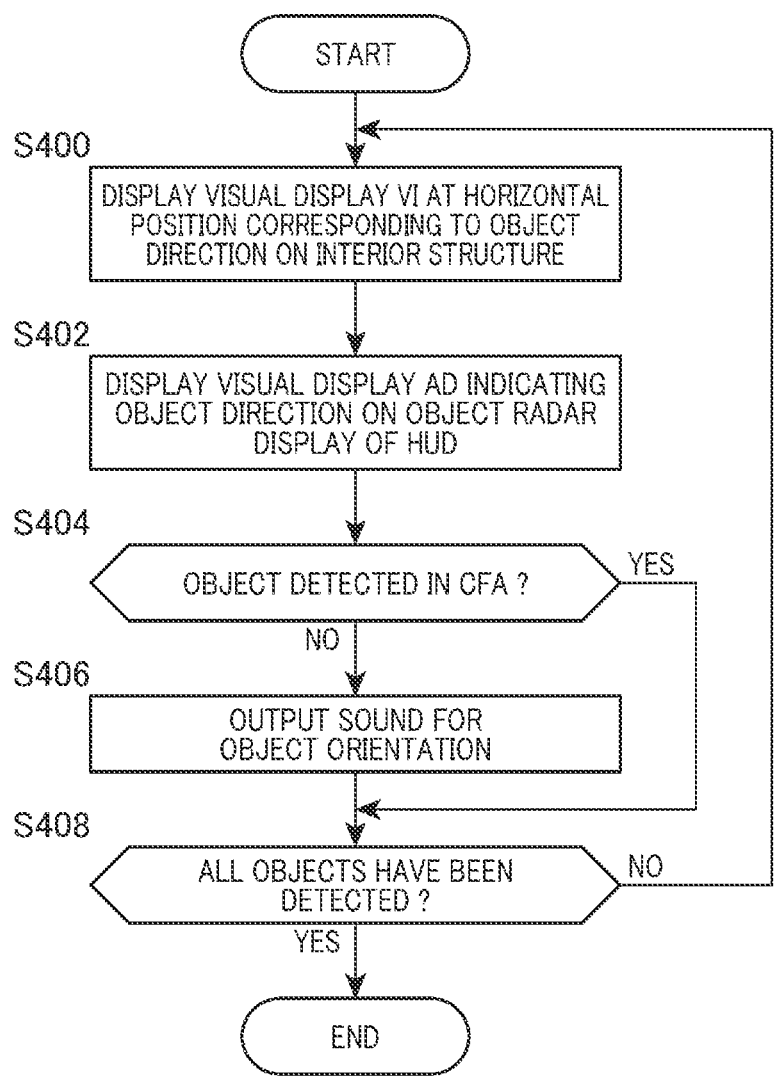

VISUAL GUIDANCE DEVICE, ATTENTION CALLING SYSTEM, ATTENTION CALLING METHOD, AND PROGRAM

TECHNICAL FIELD

The present invention relates to a visual guidance device, an attention calling system, an attention calling method, and a program.

BACKGROUND ART

Conventionally, technology for displaying an image on a windshield of a moving body has been known (for example, see Patent Literature 1).

Patent Literature 1 discloses the technology for displaying a marking image which follows a contour of a detected object ahead of an own vehicle so that the marking image is overlaid with the real object.

CITATION LIST

Patent Literature

[Patent Literature 1]
Japanese Patent Laid-Open No. 2017-021546

SUMMARY OF INVENTION

Technical Problem

Patent Literature 1 discloses that the marking image is generated to include the contour of the object. Accordingly, as the object becomes closer to the own vehicle, the marking image to be overlaid becomes larger to enhance visual attractivity of the marking image. The object that should be seen by an operator exists irrespective of the distance from the own vehicle. It is not always preferable to enhance the visual attractivity of the marking image in proportion to proximity of the object to the own vehicle. For this reason, the object that should be seen by the operator may be overlooked unless the visual attractivity of the image for visual guidance is varied in accordance with the status of the object existing ahead of the vehicle.

Generally, a visual line direction of the operator in the moving body changes depending on the position of the operator in the moving body. Patent Literature 1 takes account of the object position relative to the display position of the marking image, but does not take account of the position of the operator in the moving body. In the case of the display method disclosed in Patent Literature 1, there may be the risk of failing to accurately guide the operator's visual line to the object upon change in the position of the operator in the moving body.

Assuming that the disclosed technique of the display system is utilized for calling the operator's attention to many traffic participants in the traffic environment such as the urbane area, many contour images will be displayed while being overlaid with the individual traffic participants on the windshield, resulting in attention distraction of the operator.

A first object of the present invention is to reduce the chance that the operator overlooks the object that should be seen.

A second object of the present invention is to accurately guide the operator's visual line to the object in spite of change in the operator's position in the moving body.

A third object of the present invention is to call the operator's attention to various real objects existing in the environment surrounding the moving body without distracting the operator's attention.

Solution to Problem

According to an aspect of the present invention, a visual guidance device for guiding a visual line of an operator of a moving body to an object existing ahead of the moving body includes an object recognition unit for recognizing the object, and a display control unit for causing a display device to display a visual guidance virtual image for guiding the visual line of the operator at a position corresponding to the object recognized by the object recognition unit on a windshield of the moving body. The display control unit sets a length of the visual guidance virtual image to be displayed by the display device in a width direction of the moving body to a length in accordance with a status of the object existing ahead of the moving body.

In the aspect of the present invention, in the existence of the object moving ahead of the moving body, the display control unit sets the length of the visual guidance virtual image to be displayed by the display device in the width direction to a length corresponding to a distance from a current position of the object to a position taken after movement by a predetermined period of time.

In the aspect of the present invention, the display control unit causes the display device to display the visual guidance virtual image extending in a moving direction of the object from a position corresponding to the current position of the object.

In the aspect of the present invention, in the existence of multiple objects ahead of the moving body, the display control unit sets the length of the visual guidance virtual image to be displayed by the display device in the width direction to a length corresponding to a distance between two objects which are separated farthest in the width direction.

In the aspect of the present invention, when the number of the objects existing ahead of the moving body is n or more (n is an integer equal to or more than three), the display control unit causes the display device to display the visual guidance virtual image in a display mode different from a display mode of the visual guidance virtual image to be displayed when the n or more objects do not exist ahead of the moving body.

In the aspect of the present invention, when the number of the objects existing ahead of the moving body is m or more (m is an integer equal to or more than three), the length of the visual guidance virtual image to be displayed by the display device in the width direction is set to a length extending across an entire width of a display range of the display device.

In the aspect of the present invention, when the visual guidance virtual image is displayed by the display device, the display control unit makes the length of the visual guidance virtual image in the width direction longer as a possibility of the object influencing the moving body becomes higher.

According to another aspect of the present invention, an attention calling system includes a display device for outputting a visual display which is visually recognizable by an operator of a moving body on a windshield of the moving body, and an attention calling device for controlling the display device to call the operator's attention to the object around the moving body by means of the visual display. The attention calling device includes an object recognition unit for detecting the object existing in an area surrounding the moving body, and a display control unit for outputting the visual display in a predetermined display range on the windshield of the moving body by controlling the display device. The display range is a horizontally extending belt-like range on the windshield in a width direction of the moving body. The display control unit outputs the visual display at a horizontal position in the display range corresponding to a horizontal position of the object on the windshield seen from a position of the operator.

According to another aspect of the present invention, an attention calling system includes the visual guidance device as described above, and a display device for outputting a visual display which is visually recognizable by an operator of a moving body on a windshield of the moving body. The visual guidance device includes an object recognition unit for detecting an object existing in an area surrounding the moving body, and a display control unit for outputting the visual display in a predetermined display range on the windshield of the moving body by controlling the display device. The display range is a horizontally extending belt-like range on the windshield in a width direction of the moving body. The display control unit outputs the visual display at a horizontal position in the display range corresponding to a horizontal position of the object on the windshield seen from a position of the operator.

In the aspect of the present invention, the display device is a light projection device which outputs the visual display by projecting predetermined shaped light rays onto the windshield.

In the aspect of the present invention, the display device includes multiple light sources arranged on a lower part of the windshield along the width direction of the moving body.

In the aspect of the present invention, when the object in the area surrounding the moving body is detected at a position deviating from a predetermined front visual field range having a position of the operator seated on an operator's seat of the moving body defined as the center, a sound for the object orientation is generated in an interior of the moving body.

In the aspect of the present invention, the object is a real object having a possibility of contact with the moving body equal to or higher than a predetermined value.

In the aspect of the present invention, the visual guidance device further includes an object position recognition unit for recognizing a position of the object, and an operator position recognition unit for recognizing a position of the operator in the moving body. The display control unit corrects a display position of the visual guidance virtual image based on the position of the object recognized by the object position recognition unit, and the position of the operator recognized by the operator position recognition unit.

In the aspect of the present invention, in a top view of the moving body, the display control unit corrects a position at which the windshield intersects a line connecting the position of the object recognized by the object position recognition unit to the position of the operator recognized by the operator position recognition unit as a display position of the visual guidance virtual image.

In the aspect of the present invention, the operator position recognition unit recognizes a position of a head of the operator as the position of the operator.

In the aspect of the present invention, when the operator sees the visual guidance virtual image, the display control unit causes the display device to display the visual guidance virtual image which is overlaid with the object, or matched at a position of the object in a horizontal direction.

An attention calling method is implemented by a computer according to another aspect of the present invention. The attention calling method includes the steps of detecting an object existing in an area surrounding a moving body, and outputting a visual display in a predetermined display range on a windshield of the moving body by controlling a display device provided in an interior of the moving body. The display range is a horizontally extending belt-like range on the windshield in a width direction of the moving body. In the step of outputting the visual display, the visual display is output at a horizontal position in the display range corresponding to a horizontal position of the object on the windshield seen from a position of the operator in the moving body.

According to another aspect of the present invention, an attention calling method is implemented by a visual guidance device for guiding a visual line of an operator of a moving body to an object existing ahead of the moving body. In the method, the object is recognized. When a display device is caused to display a visual guidance virtual image for guiding the visual line of the operator to a position corresponding to the object recognized on a windshield of the moving body, a length of the visual guidance virtual image to be displayed by the display device in a width direction of the moving body is set to a length in accordance with a status of the object existing ahead of the moving body.

According to another aspect of the present invention, an attention calling method is implemented by a visual guidance device for guiding a visual line of an operator of a moving body to an object existing ahead of the moving body. In the method, a position of the object is recognized, a position of the operator in the moving body is recognized, and a display device is caused to display a visual guidance virtual image on a windshield of the moving body for guiding the visual line of the operator to the object. When displaying the visual guidance virtual image, a display position of the visual guidance virtual image is corrected based on the recognized position of the object, and the recognized position of the operator.

According to another aspect of the present invention, a program is executed by a computer of a visual guidance device for guiding a visual line of an operator of a moving body to an object existing ahead of the moving body. When the object is recognized, and a display device is caused to display a visual guidance virtual image for guiding the visual line of the operator on a windshield of the moving body at a position corresponding to the recognized object, the computer is caused to set a length of the visual guidance virtual image to be displayed by the display device in a width direction of the moving body to a length in accordance with a status of the object existing ahead of the moving body.

The disclosed contents of the following Japanese Patent Applications to which this application claims priority are hereby incorporated by reference: JP2021-040412 filed on Mar. 12, 2021; JP2021-040411 filed on Mar. 12, 2021; and JP2021-040549 filed on Mar. 12, 2021.

Advantageous Effects of Invention

The present invention is effective for reducing the chance that the operator overlooks the object which should be seen.

According to the present invention, it is possible to accurately guide the operator's visual line to the object in spite of change in the position of the operator in the moving body.

According to the present invention, it is possible to call the operator's attention to various real objects existing in the environment surrounding the moving body without distracting the operator's attention.

BRIEF DESCRIPTION OF DRAWINGS

FIG. 18 shows an example of cognition proficiency information which is stored in a storage unit by a cognition skill evaluation unit of the attention calling system as illustrated in FIG. 17.

FIG. 30 is a flowchart representing an operation procedure executed by the attention calling system as illustrated in FIG. 25.

DESCRIPTION OF EMBODIMENTS

Figure 1:
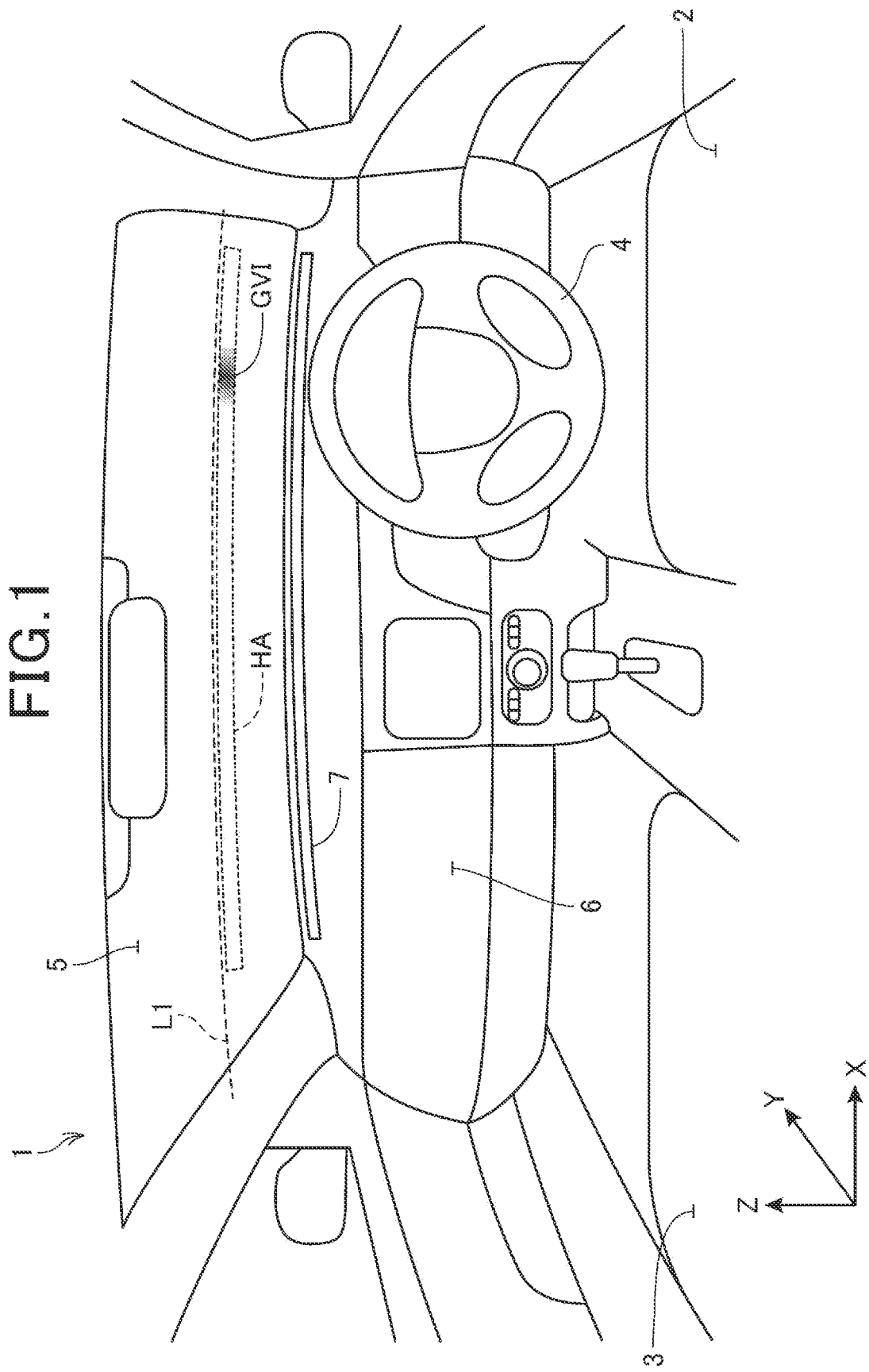
FIG. 1 is a view of an interior structure of a vehicle.

Embodiments will be described referring to the drawings.

First Embodiment

Each of FIGS. 1, 4, 5, 6, and 7 shows an X-axis, a Y-axis, and a Z-axis. The X-axis, the Y-axis, and the Z-axis are orthogonal to one another. The Z-axis indicates an up-down direction. The X-axis and the Y-axis are parallel to a horizontal direction. The X-axis indicates a left-right direction as a vehicle width direction. The Y-axis indicates a front-rear direction. A forward direction of the X-axis indicates a right direction. A forward direction of the Y-axis indicates a front direction. A forward direction of the Z-axis indicates an upper direction. The vehicle width direction corresponds to a width direction in the disclosure.

FIG. 1 is a view of an interior structure of a vehicle 1.

The vehicle 1 according to the embodiment is a four-wheeled automobile. The vehicle 1 corresponds to a moving body in the disclosure.

A driver's seat 2 and a front passenger seat 3 are disposed in the interior of the vehicle 1. The interior of the vehicle 1 is provided with a steering wheel 4 for steering the vehicle 1, a windshield 5 for partition between the vehicle exterior and the vehicle interior, and an instrument panel 6. The steering wheel 4 is disposed on the instrument panel 6 at a position facing a driver U seated on the driver's seat 2. The driver U corresponds to an operator as an example in the disclosure.

In the interior of the vehicle 1, an LED array 7 extending in the vehicle width direction is provided to the upper front of the instrument panel 6. The LED array 7 includes multiple LEDs. The LED array 7 projects light rays to the windshield 5 to display a visual guidance virtual image GVI on a part of the windshield 5 below a displayable upper limit line L1 as a virtual image for guiding the visual line of the driver U. The displayable upper limit line L1 indicates an upper limit position at which the image can be displayed in the up-down direction of the windshield 5. The upper limit position indicated by the displayable upper limit line L1 is specified by legal regulations. The visual guidance virtual image GVI displayed on the windshield 5 by the LED array 7 allows the driver U seated on the driver's seat 2 to see the view to the front of the vehicle 1 via the windshield 5 together with the visual guidance virtual image GVI.

The displayed visual guidance virtual image GVI is a virtual image extending in the vehicle width direction. The LED array 7 makes the light projecting LEDs different from one another to vary each display position, and each length of the visual guidance virtual image GVI in the vehicle width direction. The visual guidance virtual image GVI of FIG. 1 has its color darkened from an end toward the center in the vehicle width direction. A color shade of the visual guidance virtual image GVI is a mere example, and is not limited to the shade as illustrated in the drawing.

A display range HA of the visual guidance virtual image GVI is extendedly formed below the displayable upper limit line L1 on the windshield 5. A length of the display range HA in the vehicle width direction corresponds to that of the LED array 7. A length of the display range HA in the direction intersecting the vehicle width direction corresponds to that of the LED array 7 in the front-rear direction.

The visual guidance virtual image GVI is displayed in the display range HA so as to be overlaid with an object 8 for visual guidance, or matched at a position of the object 8 in a horizontal direction when the driver U seated on the driver's seat 2 sees the visual guidance virtual image GVI. In the state where the driver U seated on the driver's seat 2 sees the windshield 5, even if the object 8 is positioned above the displayable upper limit line L1 or below the display range HA, the driver U is allowed to identify the object 8 to which the visual guidance virtual image GVI visually guides.

Figure 2:
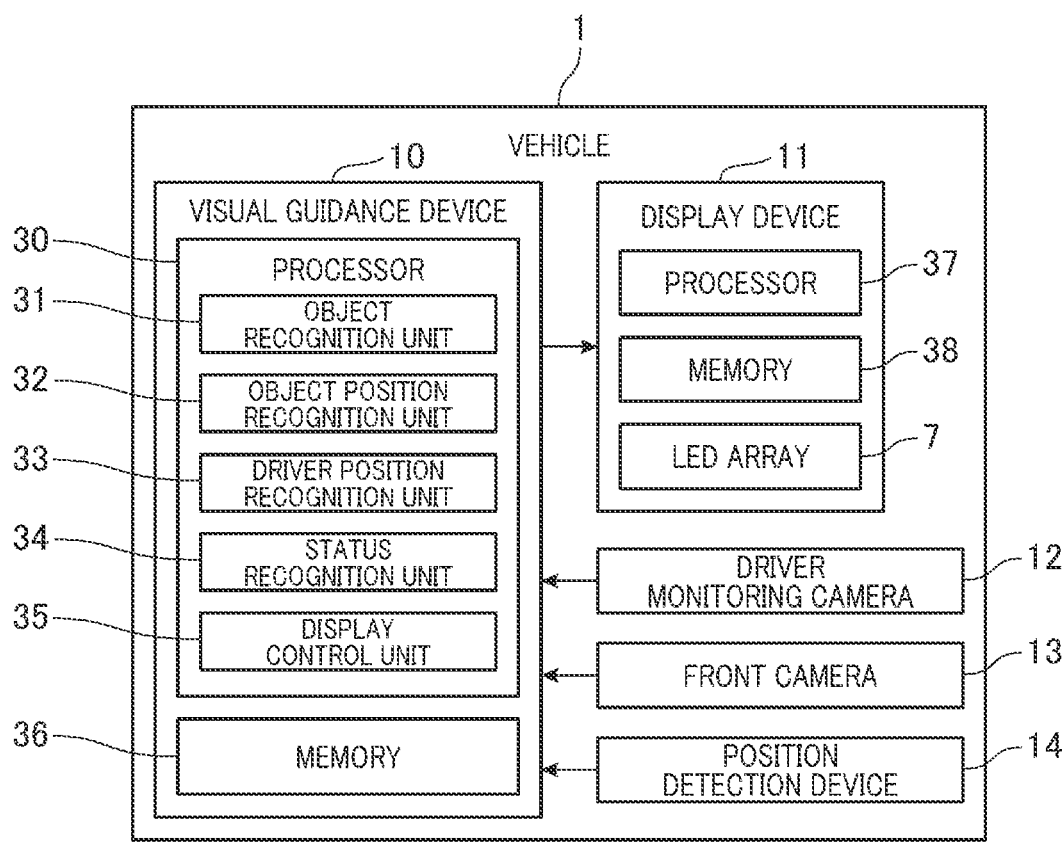
FIG. 2 is a block diagram of a structure of the vehicle.

FIG. 2 is a block diagram of a structure of the vehicle.

The vehicle 1 includes a visual guidance device 10. The visual guidance device 10 includes a processor 30 such as a CPU (Central Processing Unit) and an MPU (Micro-processing Unit), and a memory 36.

The processor 30 reads and executes the control program stored in the memory 36 to control the respective units of the visual guidance device 10. The processor 30 executes the control program stored in the memory 36 to implement functions of an object recognition unit 31, an object position recognition unit 32, a driver position recognition unit 33, a status recognition unit 34, and a display control unit 35.

The control program corresponds to an example of the program in the present disclosure.

The memory 36 stores the program to be executed by the processor 30, and data to be processed by the processor 30. The memory 36 stores the control program to be executed by the processor 30, and other various data. The memory 36 includes a nonvolatile storage region. The memory 36 includes a volatile storage region to constitute a work area in the processor 30.

The visual guidance device 10 is connected to a display device 11, a driver monitoring camera 12, a front camera 13, and a position detection device 14. The devices to be connected to the visual guidance device 10 are not limited to those described above. For example, other devices such as a rear camera and a vehicle speed sensor may be connected.

The display device 11 includes a processor 37 such as the CPU and the MPU, a memory 38, and the LED array 7.

The processor 37 reads and executes the control program stored in the memory 38 to control the respective units of the display device 11. In the embodiment, the processor 37 causes the LED array 7 to display the visual guidance virtual image GVI in the display range HA based on the display data input from the visual guidance device 10.

The memory 38 stores the program to be executed by the processor 37, and the data to be processed by the processor 37. The memory 38 stores the control program to be executed by the processor 37, and other various data. The memory 38 includes the nonvolatile storage region. The memory 38 may include the volatile storage region to constitute the work area in the processor 37.

The driver monitoring camera 12 is a camera provided at a predetermined position in the interior of the vehicle 1 for capturing an image of the driver U seated on the driver's seat 2. A capturing range of the driver monitoring camera 12 includes at least a head HD of the driver U seated on the driver's seat 2. The driver monitoring camera 12 outputs captured data as data of captured results to the visual guidance device 10.

The front camera 13 is provided at a predetermined position of the vehicle 1 for capturing an image of the front of the vehicle 1. The front camera 13 outputs captured data as data of captured results to the visual guidance device 10.

The position detection device 14 is capable of detecting a position of the object existing around the vehicle 1. The position detection device 14 is constituted by at least one or more devices selected from a group including a sonar, a radar, a Lidar, each capable of measuring the distance from the object by utilizing a sound wave, a radio wave, an electromagnetic wave, or light rays, and a stereo camera or the like, capable of measuring the distance from the object by utilizing a parallax.

As described above, the processor 30 of the visual guidance device 10 implements functions of the object recognition unit 31, the object position recognition unit 32, the driver position recognition unit 33, the status recognition unit 34, and the display control unit 35.

The object recognition unit 31 recognizes the object 8 in the captured result of the front camera 13 based on the captured data output from the front camera 13. Based on characteristics such as a shape, color, and the like, the object recognition unit 31 recognizes the object 8 in the captured result of the front camera 13. Data necessary for recognizing the object 8 are stored in the memory 36.

The object position recognition unit 32 recognizes the position of the object 8 recognized by the object recognition unit 31. The object position recognition unit 32 recognizes the position of the object 8 relative to the vehicle 1 in a top view. Based on a detection result of the position detection device 14 and/or a captured result of the front camera 13, the object position recognition unit 32 recognizes the position of the object 8 recognized by the object recognition unit 31.

The driver position recognition unit 33 recognizes the position of the driver U seated on the driver's seat 2. In the embodiment, the driver position recognition unit 33 recognizes the position of the head HD of the driver U in the vehicle 1 as the position of the driver U seated on the driver's seat 2. The driver position recognition unit 33 recognizes the position of the head HD of the driver U in the vehicle 1 relative to the vehicle 1 in a top view. The driver position recognition unit 33 recognizes the head HD of the driver U in the captured result of the driver monitoring camera 12 based on the characteristics such as the shape, color, and the like. Based on the size of the head HD in the captured result, and the position of the head HD at the field angle of the captured result, the driver position recognition unit 33 recognizes the position of the head HD of the driver U in the vehicle 1.

The status recognition unit 34 recognizes the status of the object 8 existing ahead of the vehicle 1 from the captured result of the front camera 13, and the image analysis based on the recognition result of the object recognition unit 31.

The status recognition unit 34 determines whether or not the status of the object 8 existing ahead of the vehicle 1 is a first status. The first status denotes that the object 8 existing ahead of the vehicle 1 is on the move. Based on the captured result of the front camera 13 indicating whether or not the object 8 recognized by the object recognition unit 31 is on the move, the status recognition unit 34 determines whether or not the status of the object 8 is the first status. If it is determined that the status of the object is the first status, the status recognition unit 34 calculates a moving speed and a moving direction of the object 8 recognized by the object recognition unit 31 by the image analysis based on the captured result of the front camera 13. The status recognition unit 34 in the disclosure calculates the moving speed and the moving direction of the object 8 at least in the vehicle width direction.

The status recognition unit 34 determines whether or not the status of the object 8 existing ahead of the vehicle 1 is a second status. The second status denotes that multiple objects 8 exist ahead of the vehicle 1. Based on the number of the objects 8 recognized by the object recognition unit 31, the status recognition unit 34 determines whether or not the status of the object 8 is the second status. If the objects 8 recognized by the object recognition unit 31 are partially overlaid in the front-rear direction, the status recognition unit 34 may be allowed to recognize the multiple objects 8 in the overlaid state as the single object 8, and to determine with respect to the second status. If the second status is determined, the status recognition unit 34 recognizes the number of the objects 8 recognized by the object recognition unit 31 as the number of those existing ahead of the vehicle 1.

The display control unit 35 causes the display device 11 to display the visual guidance virtual image GVI. The display control unit 35 generates display data for displaying the visual guidance virtual image GVI, and outputs the generated display data to the display device 11. The processor 37 of the display device 11 causes the LED array 7 to display the visual guidance virtual image GVI based on the input display data. The display data in the embodiment represent the display position and the length of the visual guidance virtual image GVI in the vehicle width direction, which are indicated by both end positions of the visual guidance virtual image GVI in the vehicle width direction.

In response to the input of the display data, the processor 37 of the display device 11 lights the LEDS corresponding to both end positions as indicated by the display data, and the LEDs corresponding to those arranged between the end positions.

Figure 3:
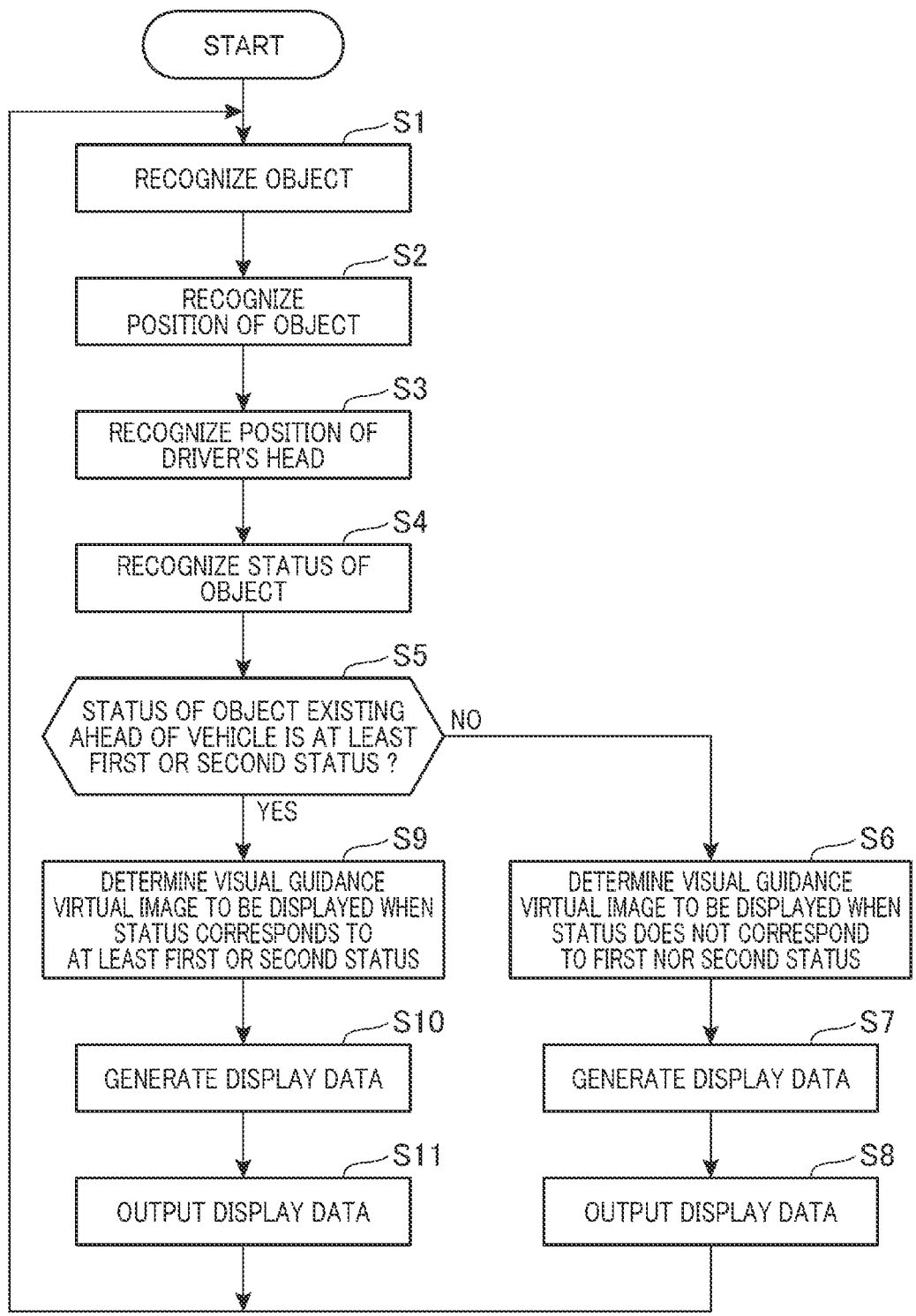
FIG. 3 is a flowchart representing operations of a visual guidance device.

FIG. 3 is a flowchart representing operations of the visual guidance device 10.

The flowchart shown in FIG. 3 presupposes that the driver U is seated on the driver's seat 2, and the driver monitoring camera 12 captures an image of the driver U. The flowchart shown in FIG. 3 presupposes that the front camera 13 captures an image, and the position detection device 14 performs a sensing operation.

Referring to the flowchart in FIG. 3, the object recognition unit 31 recognizes the object 8 from the captured result of the front camera 13 (step S1).

The object position recognition unit 32 recognizes the position of the object 8 recognized in step S1 (step S2).

Then the driver position recognition unit 33 recognizes the position of the head HD of the driver U in the vehicle 1 from the captured result of the driver monitoring camera 12 (step S3).

The status recognition unit 34 recognizes the status of the object 8 existing ahead of the vehicle 1 (step S4).

The display control unit 35 determines whether or not the status of the object 8 existing ahead of the vehicle 1 is at least the first status or the second status based on the recognition result of the status recognition unit 34 (step S5).

If it is determined that the status of the object 8 existing ahead of the vehicle 1 is not the first status nor the second status (step S5: NO), the display control unit 35 determines the visual guidance virtual image GVI to be displayed by the display device 11 (step S6). The visual guidance virtual image GVI determined in step S6 is the visual guidance virtual image GVI to be displayed when the status of the object 8 existing ahead of the vehicle 1 does not correspond to the first status nor the second status. In step S6, based on the position recognized by the object position recognition unit 32 and the position recognized by the driver position recognition unit 33, the display control unit 35 determines the visual guidance virtual image GVI to be displayed by the display device 11.

Step S6 will be described in detail referring to FIG. 4.

Figure 4:
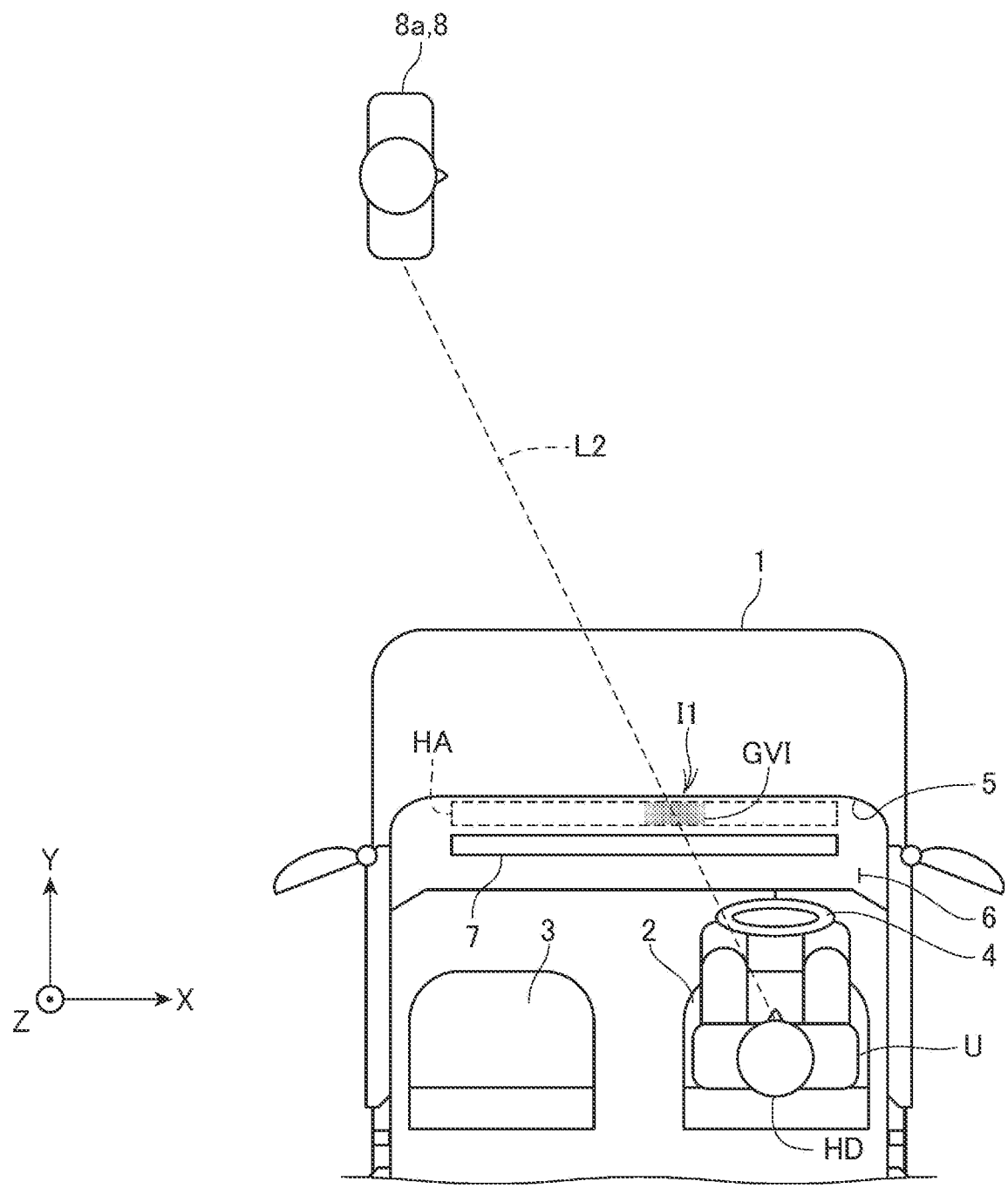
FIG. 4 is an explanatory view of a visual guidance virtual image to be displayed by a display device.

FIG. 4 is an explanatory view of the visual guidance virtual image GVI to be displayed by the display device 11.

FIG. 4 illustrates an example that a person 8*a* as the object 8 exists ahead of the vehicle 1, and the visual guidance device 10 guides the visual line of the driver U to the person 8*a*.

Referring to FIG. 4, in a top view of the vehicle 1, a line L2 intersects the windshield 5 at a position I1 in the vehicle width direction. The line L2 connects the position of the head HD of the driver U to the position of the person 8*a*.

In the case as illustrated in FIG. 4, the display control unit 35 determines the visual guidance virtual image GVI having a predetermined length extending toward opposite ends in the vehicle width direction from the position I1 as the visual guidance virtual image GVI to be displayed by the display device 11.

Returning back to the explanation of the flowchart in FIG. 3, the display control unit 35 generates the display data for displaying the visual guidance virtual image GVI determined in step S6 (step S7).

The display control unit 35 then outputs the display data generated in step S7 to the display device 11 (step S8).

Returning back to the explanation of step S5, if it is determined that the status of the object 8 existing ahead of the vehicle 1 is at least the first status or the second status (step S5: YES), the display control unit 35 determines the visual guidance virtual image GVI to be displayed by the display device 11 (step S9). The visual guidance virtual image GVI determined in step S9 is the visual guidance virtual image GVI to be displayed when the status of the object existing ahead of the vehicle 1 corresponds to at least the first or the second status. In step S9, based on the position recognized by the object position recognition unit 32, and the position recognized by the driver position recognition unit 33, the display control unit 35 determines the visual guidance virtual image GVI to be displayed by the display device 11.

The display control unit 35 generates the display data for displaying the visual guidance virtual image GVI determined in step S9 (step S10), and outputs the generated display data to the display device 11 (step S11).

Steps S9 to S11 will be described in detail referring to FIGS. 5 to 7.

Steps S9 to S11 will be described specifically in two patterns including the case where the status of the object 8 existing ahead of the vehicle 1 is the first status, and the case where the status of the object 8 is the second status.

<First Status of Object Existing Ahead of Vehicle>

An explanation will be made about the first status of the object 8 existing ahead of the vehicle 1.

Figure 5:
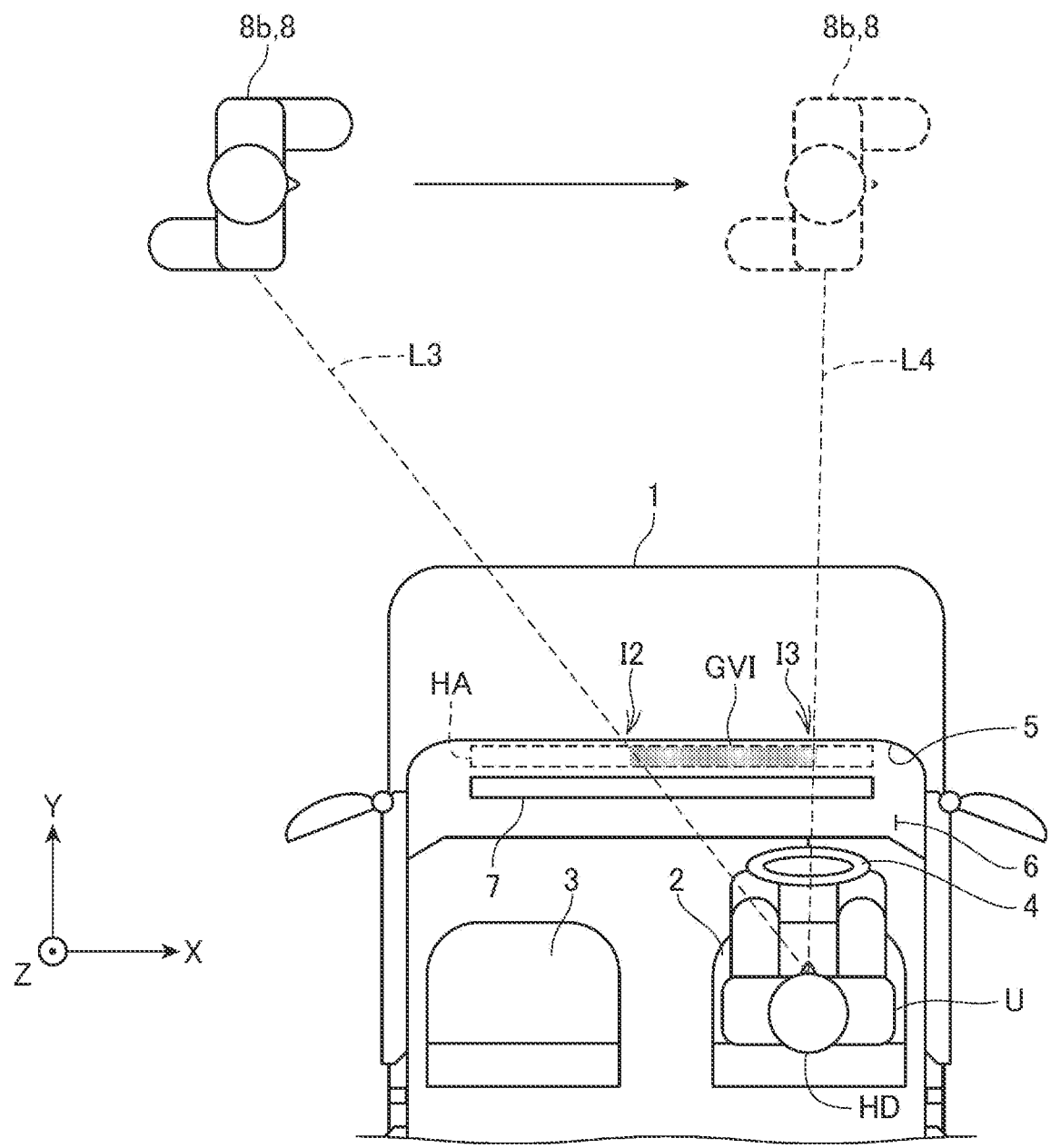
FIG. 5 is an explanatory view of a visual guidance virtual image to be displayed by a display device.

FIG. 5 is an explanatory view of the visual guidance virtual image GVI to be displayed by the display device 11.

FIG. 5 illustrates an example that a person 8*b* as the object 8 exists ahead of the vehicle 1, and the visual guidance device 10 guides the visual line of the driver U to the person 8*b*.

Referring to FIG. 5, the person 8b is moving ahead of the vehicle 1 from the left to the right. FIG. 5 indicates the person 8b existing at the current position by a solid line, and the person 8b at the position taken after movement by a predetermined period of time from the current position by a dotted line.

Referring to FIG. 5, in a top view of the vehicle 1, a line L3 intersects the windshield 5 at a position I2 in the vehicle width direction. In the top view of the vehicle 1, the line L3 connects the current position of the person 8b to the position of the head HD of the driver U. Referring to FIG. 5, in the top view of the vehicle 1, a line L4 intersects the windshield 5 at a position I3 in the vehicle width direction. In the top view of the vehicle 1, the line L4 connects the position taken after movement by the predetermined period of time from the current position to the position of the head HD of the driver U. The object position recognition unit 32 calculates the position I3 based on the moving speed and moving direction of the person 8b, which have been calculated by the status recognition unit 34, the current position of the person 8b, and the predetermined period of time.

In the case as illustrated in FIG. 5, in steps S9 to S11, the display control unit 35 determines the visual guidance virtual image GVI having its left end at the position I2, and its right end at the position I3 as the visual guidance virtual image GVI to be displayed by the display device 11. In other words, the display control unit 35 determines the visual guidance virtual image GVI with its length extending from the position I2 to I3 in the vehicle width direction. The length corresponds to the distance from the current position of the person 8b to the position taken after movement of the person 8b by the predetermined period of time, in other words, the moving distance of the person 8b from the current position to the position taken after movement by the predetermined period of time. In the case as illustrated in FIG. 5, the display control unit 35 generates the display data indicating that the left end and the right end of the visual guidance virtual image GVI are at the positions I2 and I3, respectively, and outputs the generated display data to the display device 11. The display device 11 then displays the visual guidance virtual image GVI extending to the right from the position corresponding to the current position of the person 8b in the vehicle width direction.

In the existence of the object 8 moving ahead of the vehicle 1, the length of the visual guidance virtual image GVI in the vehicle width direction may be varied corresponding to the moving distance of the object 8. This may enhance the visual attractivity of the visual guidance virtual image GVI to be displayed corresponding to the moving object 8, and reduce the chance that the driver U overlooks the object 8. The length of the visual guidance virtual image GVI in the vehicle width direction is varied corresponding to the moving distance of the object 8 from the current position to the position taken after movement by the predetermined period of time. This allows the driver U to easily confirm how far the moving object 8 is expected to move from the current position only by seeing the visual guide virtual image GVI.

In the example as illustrated in FIG. 5, the object 8 ahead of the vehicle 1 is moving from the left to the right. If the object 8 moves from the right to the left side, the display control unit 35 executes steps S9 to S11 similarly to those described referring to FIG. 5. In this case, the visual guide virtual image GVI to be displayed by the display device 11 becomes the virtual image extending to the left from the position corresponding to the current position of the object 8 in the vehicle width direction.

In the example as illustrated in FIG. 5, the left end position of the visual guidance virtual image GVI is defined as the position at which the line L3 intersects the windshield 5, and the right end position of the visual guidance virtual image GVI is defined as the position at which the line L4 intersects the windshield 5. Each of end positions of the visual guidance virtual image GVI, however, is not limited to the position at which the windshield 5 intersects the line connecting the object 8 to the position of the head HD of the driver U. For example, the left end of the visual guidance virtual image GVI may be the position apart from the intersecting position to the left by a predetermined length. For example, the right end of the visual guidance virtual image GVI may be the position apart from the intersecting position to the right by a predetermined length.

<Second Status of Object Existing Ahead of Vehicle>

An explanation will be made about the second status of the objects 8 existing ahead of the vehicle 1.

Figure 6:
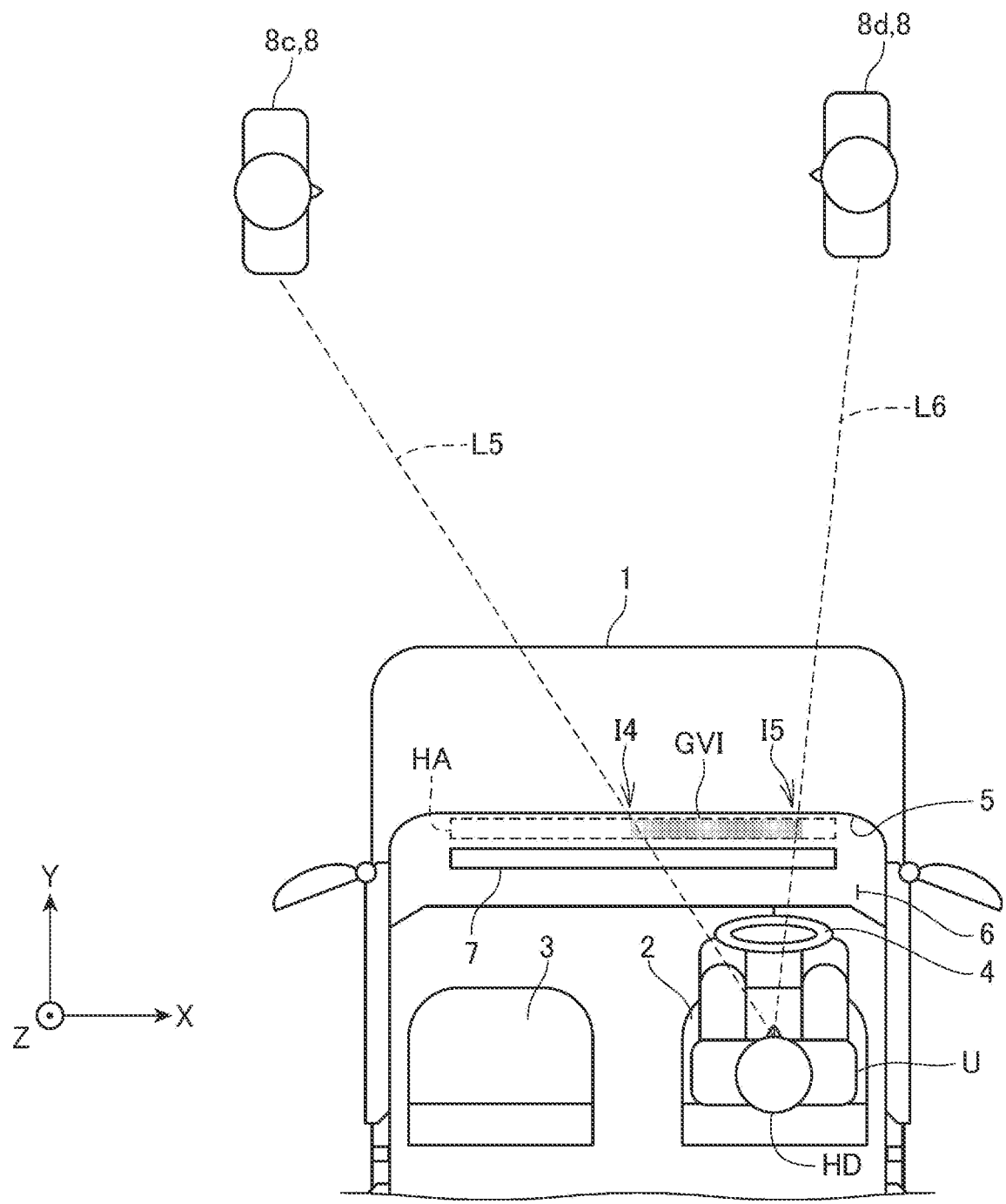
FIG. 6 is an explanatory view of a visual guidance virtual image to be displayed by a display device.

FIG. 6 is an explanatory view of the visual guidance virtual image GVI to be displayed by the display device 11.

FIG. 6 illustrates an example that persons 8c, 8d as the objects 8 exist ahead of the vehicle 1, and the visual guidance device 10 guides the visual line of the driver U to the persons 8c, 8d. FIG. 6 illustrates the state on the presupposition that the persons 8c, 8d exist in the visual line direction of the visual guidance virtual image GVI to be displayed. In the vehicle width direction, the person 8d exists closer to the driver U than the person 8c.

Referring to FIG. 6, in a top view of the vehicle 1, a line L5 intersects the windshield 5 at a position I4 in the vehicle width direction. In the top view of the vehicle 1, the line L5 connects the position of the person 8c to the position of the head HD of the driver U. Referring to FIG. 6, in the top view of the vehicle 1, a line L6 intersects the windshield 5 at a position I5 in the vehicle width direction. In the top view of the vehicle 1, the line L6 connects the position of the person 8d to the position of the head HD of the driver U.

In the case as illustrated in FIG. 6, in steps S9 to S11, the display control unit 35 determines the visual guidance virtual image GVI having its left end at the position I4, and its right end at the position I5 as the visual guidance virtual image GVI to be displayed by the display device 11. In other words, the display control unit 35 determines the visual guidance virtual image GVI with its length extending from the position I4 to I5 in the vehicle width direction. The length corresponds to the distance between the persons 8c and 8d apart from each other in the vehicle width direction. In the case as illustrated in FIG. 6, the display control unit 35 generates the display data indicating that the left end and the right end of the visual guidance virtual image GVI are at the positions I4 and I5, respectively, and outputs the generated display data to the display device 11. The display device 11 then displays the visual guidance virtual image GVI extending to the left from the position corresponding to the position of the person 8d to the position corresponding to the position of the person 8c in the vehicle width direction.

In the example as illustrated in FIG. 6, the left end position of the visual guidance virtual image GVI is defined as the position at which the line L5 intersects the windshield 5, and the right end position of the visual guidance virtual image GVI is defined as the position at which the line L6 intersects the windshield 5. Each of end positions of the visual guidance virtual image GVI, however, is not limited to the position at which the windshield 5 intersects the line connecting the object 8 to the position of the head HD. For example, the left end of the visual guidance virtual image GVI may be the position apart from the intersecting position to the left by a predetermined length. For example, the right end of the visual guidance virtual image GVI may be the position apart from the intersecting position to the right by a predetermined length.

In the example as illustrated in FIG. 6, two objects 8 exist ahead of the vehicle 1. If the number of the objects 8 existing ahead of the vehicle 1 is n or more (n is an integer equal to or more than three), the display control unit 35 determines the visual guide virtual image GVI indicating two objects 8 which are separated farthest in the vehicle width direction as described referring to FIG. 6. In this case, the display control unit 35 makes the color of the visual guidance virtual image GVI to be displayed by the display device 11 different from the color of the visual guidance virtual image GVI displayed when the number of the objects 8 is smaller than n. For example, on the assumption that the color of the visual guidance virtual image is set to yellow indicating that the number of the objects 8 is smaller than n, the color of the visual guidance virtual image is set to red indicating that the number of the objects 8 is equal to or more than n, which exhibits higher visual attractivity compared with yellow. The display mode for varying the color depending on whether or not the number of the objects 8 is equal to or more than n is not limited to the color, but may be attained by the blinking frequency or brightness. The number n may be preliminarily set arbitrarily so long as the number n is equal to or more than three.

As FIG. 6 illustrates, if multiple objects 8 exist ahead of the vehicle 1, the display control unit 35 is capable of varying the length of the visual guidance virtual image GVI in the vehicle width direction to the length corresponding to the case where the multiple objects 8 exist. This makes it possible to enhance the visual attractivity of the visual guidance virtual image GVI, and reduce the chance that the driver U overlooks the multiple objects 8 existing ahead of the vehicle 1. The length of the visual guidance virtual image GVI in the vehicle width direction is varied to the length corresponding to the distance between two objects 8 which are apart farthest in the vehicle width direction. Accordingly, the visual guidance device 10 can urge the driver U to move the visual line in the vehicle width direction. Even if the object 8 exists at the position which is likely to be overlooked, it is possible to reduce the chance that the driver U overlooks the object 8. The object 8 exists at the end of the visual guidance virtual image GVI in the vehicle width direction in the visual line direction. Even if the object 8 exists at the position which is likely to be overlooked, the driver U immediately notices the existence of the object 8. In the case as illustrated in FIG. 6, the person 8d as the object 8 is closer to the driver U. Accordingly, the person 8c exists at the position which is more likely to be overlooked by the driver U than the person 8d. The driver U moves the visual line to an extending direction of the visual guidance virtual image GVI. This allows the driver U to easily notice the existence of the person 8c.

The description referring to FIG. 6 presupposes that the object 8 exists in the visual line direction of the visual guidance virtual image GVI to be displayed. Referring to FIG. 7, an explanation will be made about the case where at least one of the multiple objects 8 existing ahead of the vehicle 1 exists in the visual line direction of the visual guidance virtual image GVI to be displayed, and at least one of the objects 8 does not exist in the visual line direction of the visual guidance virtual image GVI to be displayed.

Figure 7:
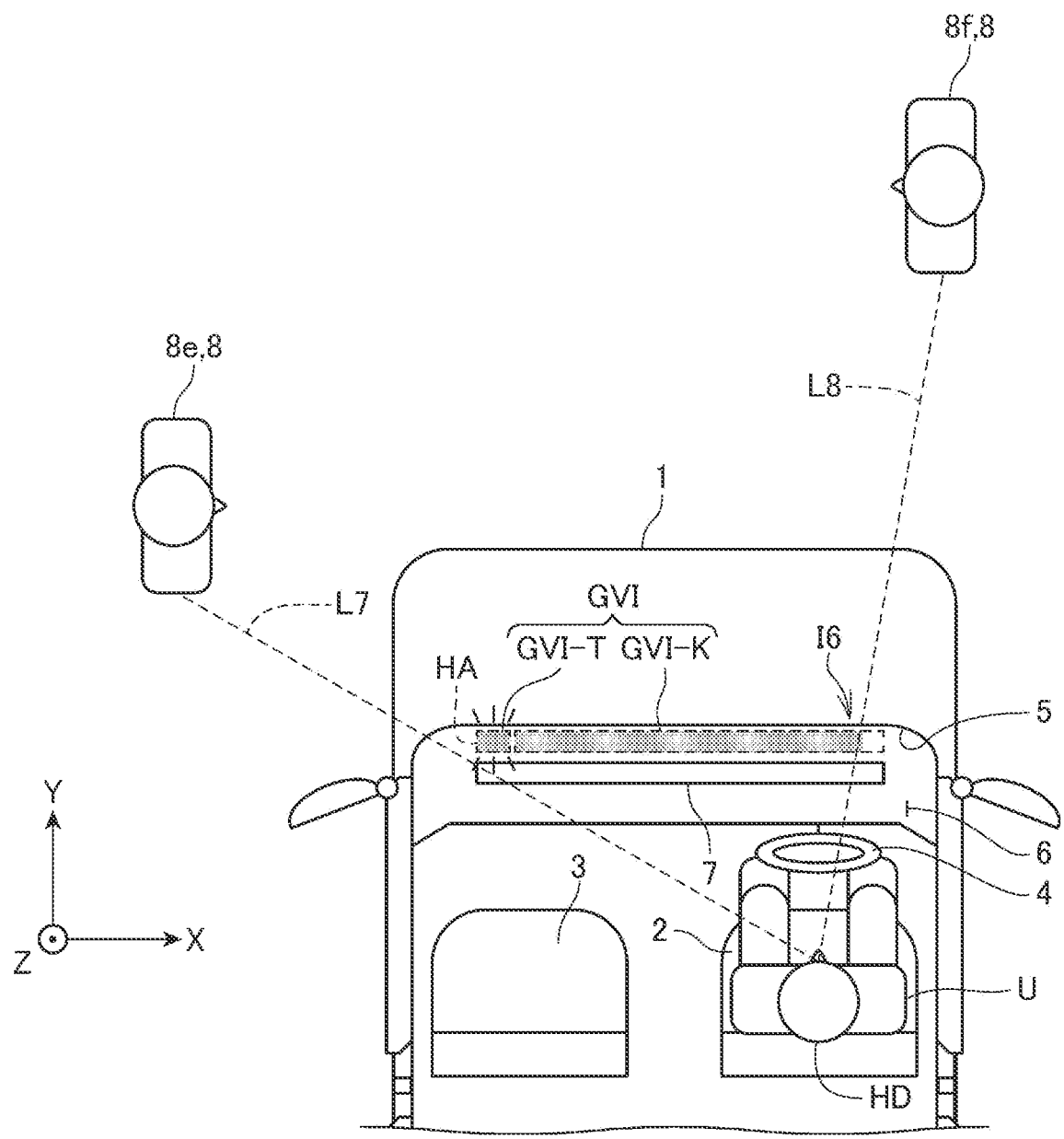
FIG. 7 is an explanatory view of a visual guidance virtual image to be displayed by a display device.

FIG. 7 is an explanatory view of a visual guidance virtual image GVI to be displayed by the display device 11.

FIG. 7 illustrates an example that persons 8e, 8f exist as the objects 8 existing ahead of the vehicle 1, and the visual guidance device 10 guides the visual line of the driver U to the persons 8e, 8f. Referring to FIG. 7, the visual guidance virtual image GVI can be displayed while being overlaid with the person 8f, or matched at the position of the person 8f in the horizontal direction. Meanwhile, in the case of the person 8e, the visual guidance virtual image cannot be displayed in this mode. That is, as FIG. 7 illustrates, the person 8f exists ahead of the visual line of the driver U from the visual guidance virtual image GVI to be displayed. On the contrary, the person 8e does not exist ahead of the visual line of the driver U from the visual guidance virtual image GVI.

Referring to FIG. 7, in a top view of the vehicle 1, a line L7 connects the position of the head HD of the driver U to a position of the person 8e. Referring to FIG. 7, in a top view of the vehicle 1, a line L8 connects the position of the head HD of the driver U to a position of the person 8f. As FIG. 7 shows, the line L8 intersects the windshield 5 at a position I6 in the vehicle width direction.

In the case as illustrated in FIG. 7, in steps S9 to S11, the display control unit 35 determines the visual guidance virtual image GVI having its left end matched with the left end of the display range HA, and its right end at the position I6 as the visual guidance virtual image GVI to be displayed by the display device 11. The display control unit 35 determines the visual guidance virtual image GVI having its left end blinking as the visual guidance virtual image GVI to be displayed by the display device 11. The display control unit 35 generates the display data indicating the left end position corresponding to the left end of the display range HA, and the right end position corresponding to the position I6. The display data to be generated indicate a position of a boundary between a blinking section GVI-T and a non-blinking section GVI-K in the vehicle width direction. The display control unit 35 outputs the generated display data to the display device 11. The display device 11 then displays the visual guidance virtual image GVI extending from the position corresponding to that of the person 8f to the left end of the display range HA in the vehicle width direction while having the left end blinking.

Referring to FIG. 7, the boundary between the blinking section GVI-T and the non-blinking section GVI-K of the visual guidance virtual image GVI appears to be marked with a white line just for clearly showing the boundary conveniently. Actually, the virtual image is displayed on the boundary.

As FIG. 7 illustrates, blinking of the left end makes the driver U aware of the object 8 existing ahead of the vehicle 1, to which the visual guidance virtual image GVI cannot visually guide. This makes it possible to reduce the chance that the driver U overlooks the object 8 to which the visual guidance virtual image GVI cannot visually guide.

FIG. 7 illustrates an example that the object 8 to which the visual guidance virtual image GVI cannot visually guide exists to the left front of the vehicle 1. Even in the existence of the object 8 to the right front of the vehicle, to which the visual guidance virtual image GVI cannot visually guide, the display control unit 35 performs operations in steps S9 to S11 to similar operations as described referring to FIG. 7. In this case, the visual guidance virtual image GVI to be displayed by the display device 11 has its right end blinking.

As described above, the visual guidance device 10 varies the length of the visual guidance virtual image GVI in the vehicle width direction to be displayed by the display device 11 to the length in accordance with the status of the object 8 existing ahead of the vehicle 1. In this case, the visual guidance device 10 may be configured to vary the length of the visual guidance virtual image GVI in the vehicle width direction to be displayed by the display device 11 in accordance with a level of possibility that the object 8 influences the vehicle 1 (contact, collision, and the like). The length may be varied in accordance with the influence while having the length varied in accordance with the status of the object 8 existing ahead of the vehicle 1.

It is assumed that any one of three levels, that is, "low", "intermediate", "high", which will be determined in accordance with the level of possibility of influencing the vehicle 1 is set to each type of the object 8 which can be recognized by the object recognition unit 31. The level becomes higher, in other words, the level of possibility of influence becomes higher in the order from the "low", "intermediate", and "high". The object recognition unit 31 recognizes the type of the object 8. The display control unit 35 determines the length of the visual guidance virtual image GVI in the vehicle width direction to be displayed by the display device 11 in accordance with the level set to the type of the object 8 recognized by the object recognition unit 31. As the level set to the type of the object 8 recognized by the object recognition unit 31 becomes higher, the display control unit 35 increases the length of the visual guidance virtual image GVI in the vehicle width direction to be displayed by the display device 11.

It is assumed that the three levels of "low", "intermediate", and "high", each indicating the level of possibility of influence on the vehicle 1 are set in accordance with the moving speed of the object 8. The level becomes higher in the order from the "low", "intermediate", and "high". The status recognition unit 34 calculates the moving speed of the object 8 recognized by the object recognition unit 31. The display control unit 35 determines the length of the visual guidance virtual image GVI in the vehicle width direction to be displayed by the display device 11 in accordance with the calculated moving speed. As the calculated moving speed becomes higher, the display control unit 35 increases the length of the visual guidance virtual image GVI in the vehicle width direction to be displayed by the display device 11.

If the number of the objects 8 existing around the vehicle 1 is equal to or more than m (m is an integer equal to or more than three), the visual guidance device 10 is allowed to display the visual guidance virtual image GVI over the entire region of the display range HA in the vehicle width direction. Display of the visual guidance virtual image GVI extending across the entire width of the display range HA notifies the driver U of existence of three or more objects 8 around the vehicle 1. The number m as described above is not limited to three, but may be an arbitrary value. The visual guidance virtual image GVI may be displayed in color in accordance with the number of existing objects 8.

Second Embodiment

A second embodiment will be described referring to the drawings.

Figure 8:
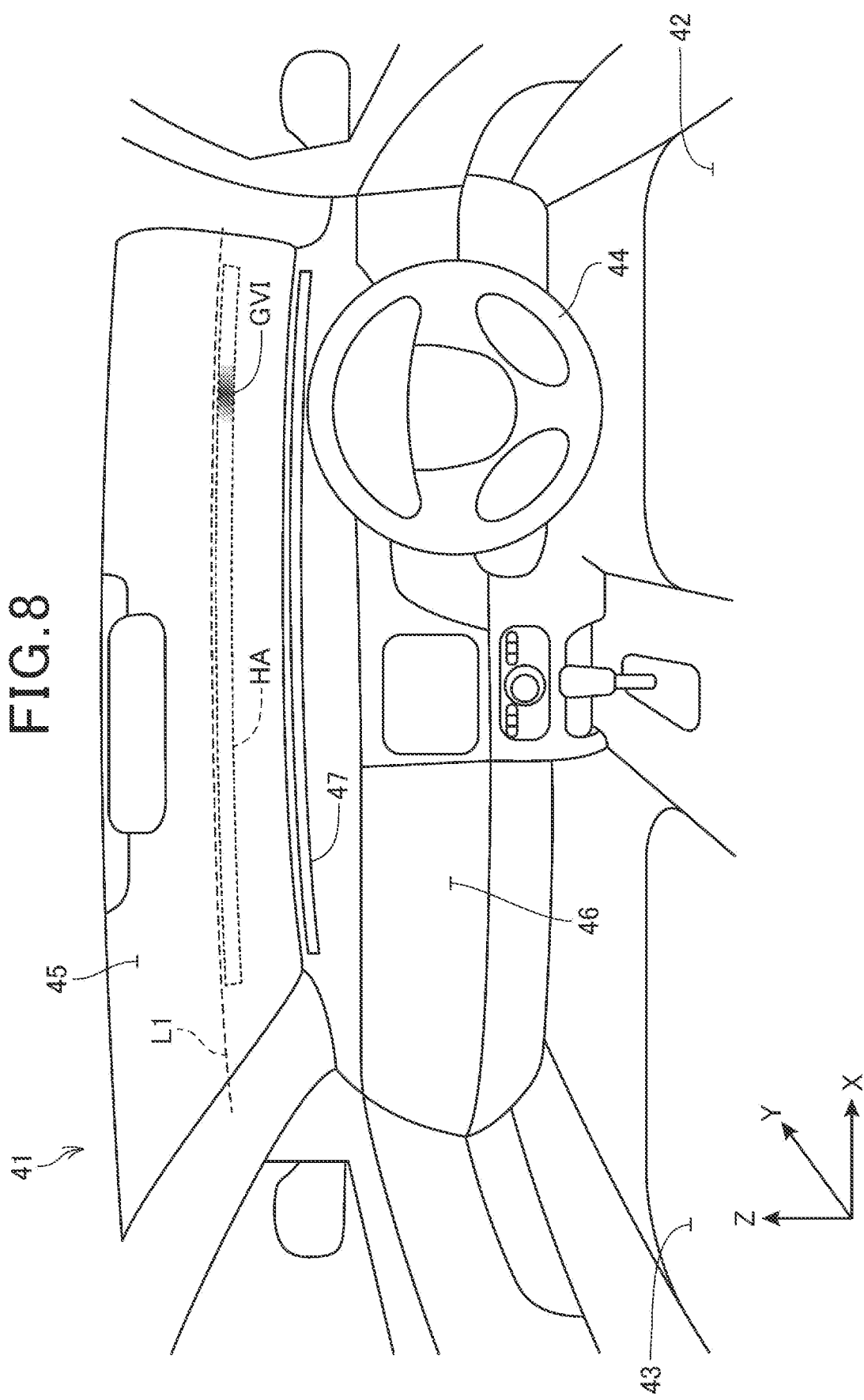
FIG. 8 is a view of an interior structure of a vehicle.
Figure 11:
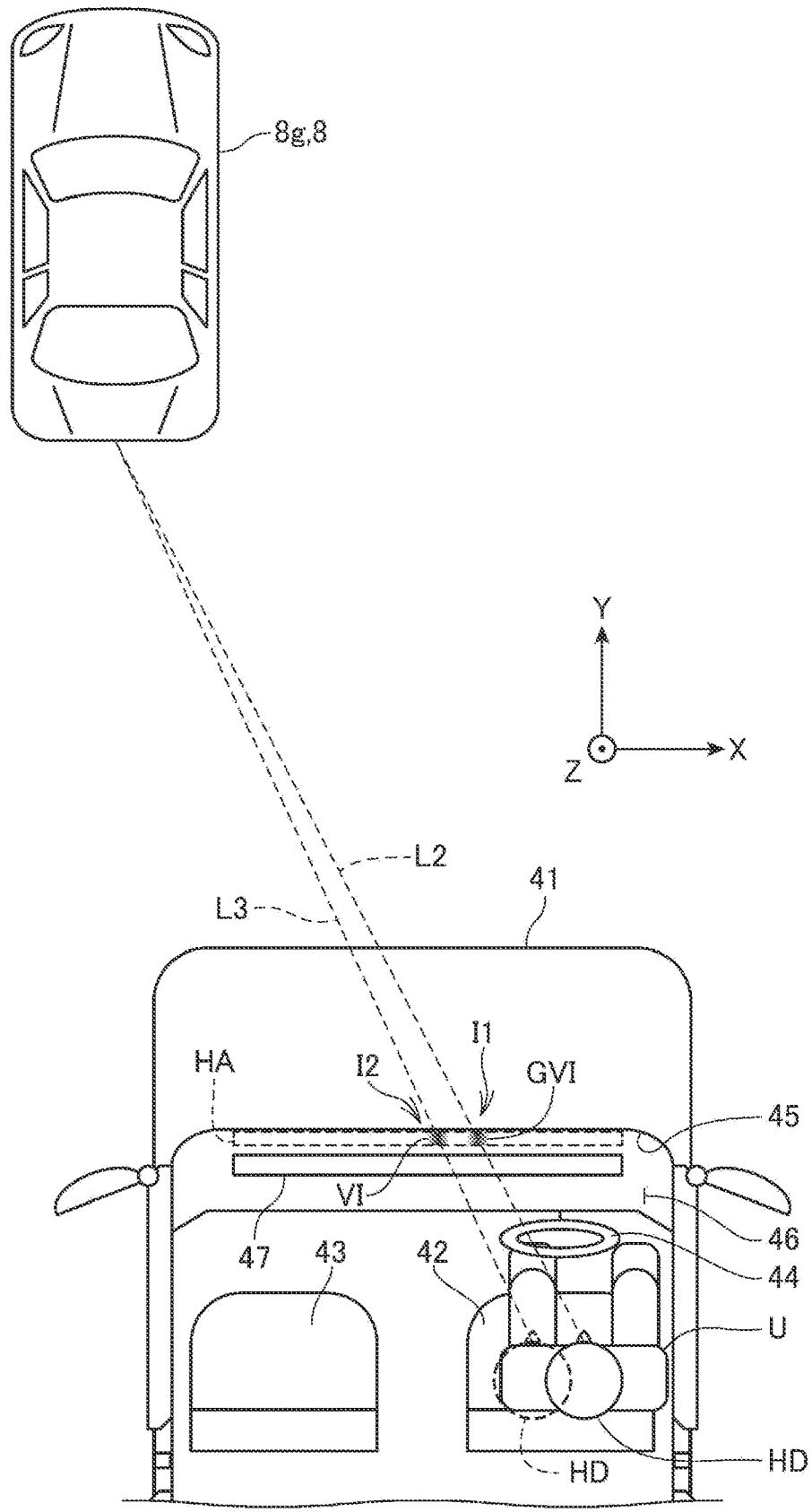
FIG. 11 is an explanatory view in the case where a display position of the visual guidance virtual image is corrected.
Figure 12:
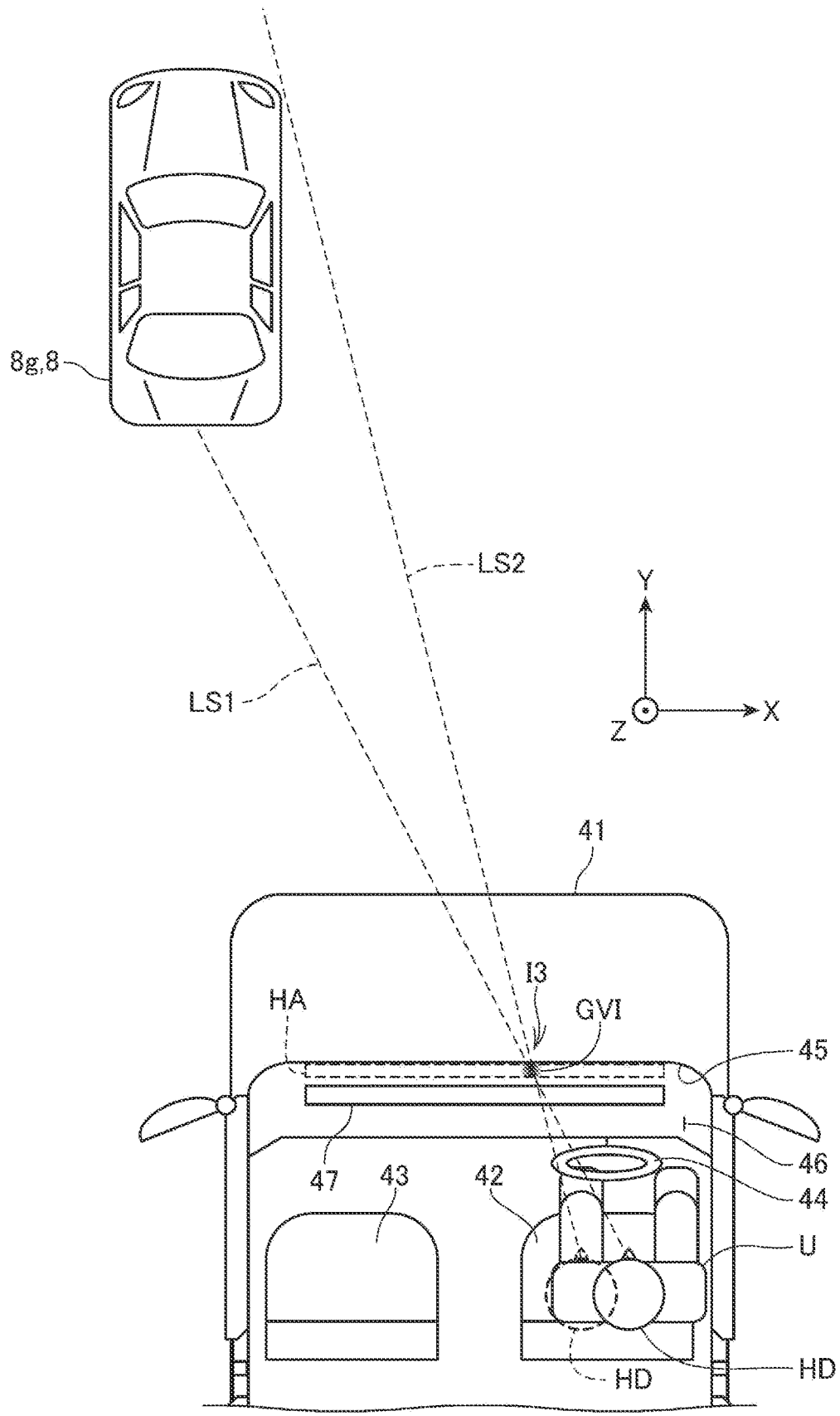
FIG. 12 is an explanatory view in the case where a display position of the visual guidance virtual image is not corrected.

Each of FIGS. 8, 11, and 12 shows an X-axis, a Y-axis, and a Z-axis. The X-axis, the Y-axis, and the Z-axis are orthogonal to one another. The Z-axis indicates an up-down direction. The X-axis and the Y-axis are parallel to a horizontal direction. The X-axis indicates a left-right direction as the vehicle width direction. The Y-axis indicates a front-rear direction. A forward direction of the X-axis indicates a right direction. A forward direction of the Y-axis indicates a front direction. A forward direction of the Z-axis indicates an upper direction.

FIG. 8 corresponding to FIG. 1 of the first embodiment is a view of an interior structure of a vehicle 41.

The vehicle 41 of the embodiment is a four-wheeled automobile. The vehicle 41 corresponds to a moving body in the disclosure.

A driver's seat 42 and a front passenger seat 43 are disposed in the interior of the vehicle 41. The interior of the vehicle 41 is provided with a steering wheel 44 for steering the vehicle 41, a windshield 45 for partition between the vehicle exterior and the vehicle interior, and an instrument panel 46. The steering wheel 44 is disposed on the instrument panel 46 at a position facing the driver U seated on the driver's seat 42. The driver U corresponds to an operator as an example in the disclosure.

In the interior of the vehicle 41, an LED array 47 extending in the vehicle width direction is provided to the upper front part of the instrument panel 46. The LED array 47 includes multiple LEDs. The LED array 47 projects light rays to the windshield 45 to display a visual guidance virtual image GVI on a part of the windshield 45 below the displayable upper limit line L1 as a virtual image for guiding the visual line of the driver U to an object 48. The object 48 represents an object to which the visual line of the driver U is guided, for example, the object like a person, a vehicle, and the like. The displayable upper limit line L1 indicates an upper limit position at which the image is displayable in the up-down direction of the windshield 45. The upper limit position indicated by the displayable upper limit line L1 is specified by legal regulations. The visual guidance virtual image GVI displayed on the windshield 45 by the LED array 47 allows the driver U seated on the driver's seat 42 to see the view to the front of the vehicle 1 via the windshield 45 together with the visual guidance virtual image GVI.

The displayed visual guidance virtual image GVI is a virtual image extending in the vehicle width direction. The LED array 47 makes the projecting LEDs different from one another to vary each of display positions, and each length of the visual guidance virtual image GVI in the vehicle width direction. The illustrated visual guidance virtual image GVI has its color darkened from an end toward the center in the vehicle width direction. A color shade of the visual guidance virtual image GVI is a mere example, and is not limited to the shade as illustrated in the drawing.

A display range HA of the visual guidance virtual image GVI is extendedly formed below the displayable upper limit line L1 on the windshield 45. A length of the display range Ha in the vehicle width direction corresponds to that of the LED array 47. A length of the display range HA in the direction intersecting the vehicle width direction corresponds to that of the LED array 47 in the front-rear direction.

A display control unit 74 to be described later performs operations to be described below to display the visual guidance virtual image GVI when seen by the driver U seated on the driver's seat 42 while being overlaid with, or matched at the horizontal position of the object 48 existing ahead of the vehicle 41 in the display range HA. Even if the object 48 seen by the driver U seated on the driver's seat 42 via the windshield 45 is located above the displayable upper limit line L1, the driver U can identify the object 48 to which the visual guidance virtual image GVI guides.

Figure 9:
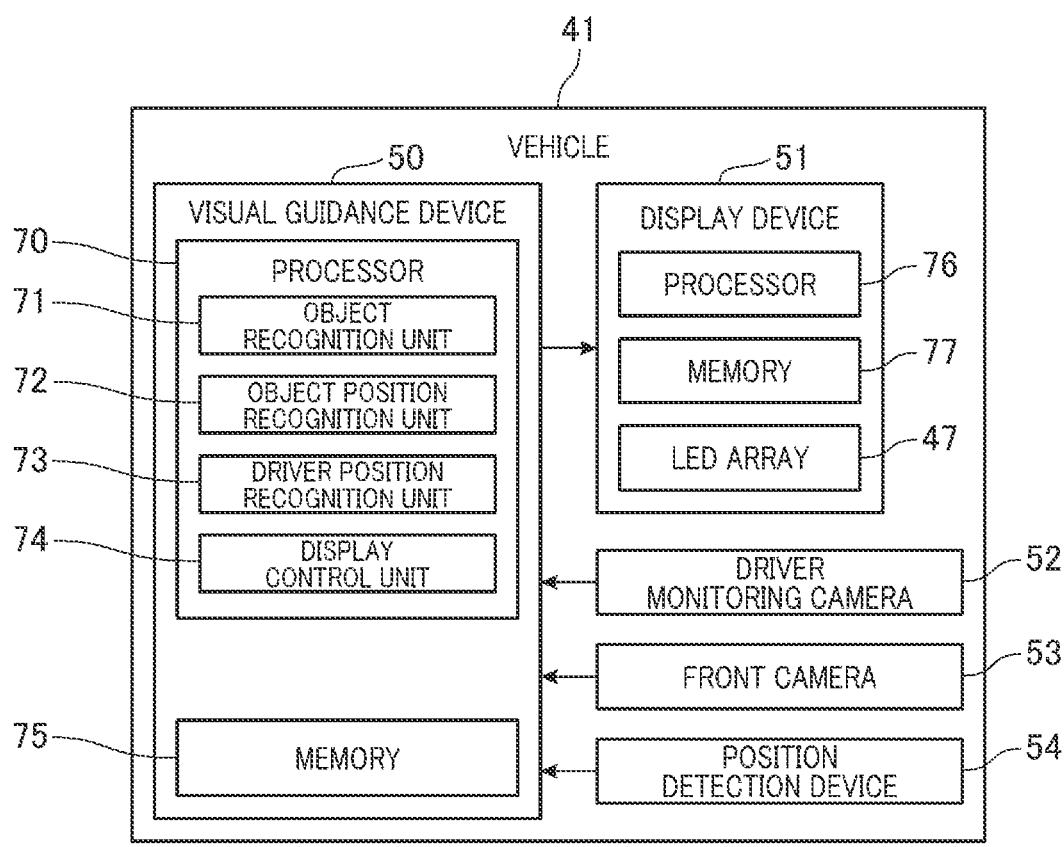
FIG. 9 is a block diagram of a structure of the vehicle.

FIG. 9 corresponding to FIG. 2 of the first embodiment is a view of a structure of the vehicle 41. In this embodiment, unless otherwise specified by descriptions or parts as below, a visual guidance device 50, a display device 51, a driver monitoring camera 52, a front camera 53, and a position detection device 54 are the same as the visual guidance device 10, the display device 11, the driver monitoring camera 12, the front camera 13, and the position detection device 14, respectively.

In this embodiment, unless otherwise specified by descriptions or parts as below, processors 70, 76, an object recognition unit 71, an object position recognition unit 72, a driver position recognition unit (operator position recognition unit) 73, the display control unit 74, and memories 75, 77 are the same as the processors 30, 37, the object recognition unit 31, the object position recognition unit 32, the driver position recognition unit (operator position recognition unit) 33, the display control unit 35, and the memories 36, 38, respectively.

The vehicle 41 includes the visual guidance device 50. The visual guidance device 50 includes the processor 70 such as a CPU (Central Processing Unit) and an MPU (Micro-processing unit), and the memory 75.

The processor 70 reads and executes the control program stored in the memory 75 to control the respective units of the visual guidance device 50. The processor 70 executes the control program stored in the memory 75 to implement functions of the object recognition unit 71, the object position recognition unit 72, the driver position recognition unit 73, and the display control unit 74.

The driver position recognition unit 73 corresponds to the operator position recognition unit in the present disclosure.

The memory 75 stores the program to be executed by the processor 70, and data to be processed by the processor 70. The memory 75 stores the control program to be executed by the processor 70, and other various data. The memory 75 includes a nonvolatile storage region. The memory 75 may include a volatile storage region to constitute a work area in the processor 70.

The visual guidance device 50 is connected to the display device 51, the driver monitoring camera 52, the front camera 53, and the position detection device 54. The devices to be connected to the visual guidance device 50 are not limited to those units as described above. For example, other devices such as a rear camera and a vehicle speed sensor may be connected.

The display device 51 includes the processor 76 such as the CPU and the MPU, the memory 77, and the LED array 47.

The processor 76 reads and executes the control program stored in the memory 77 to control the respective units of the display device 51. In the embodiment, the processor 76 causes the LED array 47 to display the visual guidance virtual image GVI in the display range HA based on the display data input from the visual guidance device 50.

The memory 77 stores the program to be executed by the processor 76, and data to be processed by the processor 76. The memory 77 stores the control program to be executed by the processor 76, and other various data. The memory 77 includes a nonvolatile storage region. The memory 77 may include a volatile storage region to constitute a work area in the processor 76.

The driver monitoring camera 52 is a camera provided at a predetermined position in the interior of the vehicle 41 for capturing an image of the driver U seated on the driver's seat 42. A capturing range of the driver monitoring camera 52 includes at least a head HD of the driver U seated on the driver's seat 42. The driver monitoring camera 52 outputs captured data as data of captured results to the visual guidance device 50.

A front camera 53 is provided at a predetermined position of the vehicle 41 for capturing an image of the front of the vehicle 41. The front camera 53 outputs captured data as data of captured results to the visual guidance device 50.

The position detection device 54 is capable of detecting a position of the object existing around the vehicle 41. The position detection device 54 is constituted by at least one or more devices selected from a group including a sonar, a radar, a Lidar, each capable of measuring the distance from the object by utilizing a sound wave, a radio wave, an electromagnetic wave, or light rays, and a stereo camera or the like, capable of measuring the distance from the object by utilizing a parallax.

As described above, the processor 70 of the visual guidance device 50 implements functions of the object recognition unit 71, the object position recognition unit 72, the driver position recognition unit 73, and the display control unit 74.

The object recognition unit 71 recognizes the object 48 in the captured result of the front camera 53 based on the captured data output from the front camera 53. Based on characteristics such as a shape, color, and the like, the object recognition unit 71 recognizes the object 48 in the captured result of the front camera 53. Data necessary for recognizing the object 48 are stored in the memory 75.

The object position recognition unit 72 recognizes the position of the object 48 recognized by the object recognition unit 71. The object position recognition unit 72 recognizes the position of the object 48 relative to the vehicle 41 in a top view. Based on a detection result of the position detection device 54 and/or a captured result of the front camera 53, the object position recognition unit 72 recognizes the position of the object 48 recognized by the object recognition unit 71.

The driver position recognition unit 73 recognizes the position of the driver U seated on the driver's seat 42. In the embodiment, the driver position recognition unit 73 recognizes the position of the head HD of the driver U in the vehicle 41 as the position of the driver U seated on the driver's seat 42. The driver position recognition unit 73 recognizes the position of the head HD in the vehicle 41 in the top view. The driver position recognition unit 73 recognizes the head HD of the driver U in the captured result of the driver monitoring camera 52 based on the characteristics such as the shape, color, and the like. Based on the size of the head HD in the captured result, and the position of the head HD at the field angle of the captured result, the driver position recognition unit 73 recognizes the position of the head HD of the driver U in the vehicle 41.

The display control unit 74 causes the display device 51 to display the visual guidance virtual image GVI. The display control unit 74 generates the display data for instruction to display the visual guidance virtual image GVI, and outputs the generated display data to the display device 51. The processor 76 of the display device 51 causes the LED array 47 to display the visual guidance virtual image GVI based on the input display data. The display data generated by the display control unit 74 represent the display position of the visual guidance virtual image GVI in the vehicle width direction, and the length of the visual guidance virtual image GVI in the vehicle width direction.

In response to the input of the display data, the processor 76 of the display device 51 determines the display position of the display data as the center position of the visual guidance virtual image GVI to be displayed in the vehicle width direction. The display device 51 lights the LEDs corresponding to the display position indicated by the display data, and the LEDS corresponding to the length indicated by the display data. The processor 76 of the display device 51 displays the visual guidance image GVI having the center position in the vehicle width direction as the display position indicated by the display data, and the length in the vehicle width direction corresponding to the length indicated by the display data.

The display control unit 74 corrects the display position of the visual guidance virtual image GVI in the vehicle width direction. Based on the position of the object 48 recognized by the object position recognition unit 72, and the position of the head HD of the driver U recognized by the driver position recognition unit 73, the display control unit 74 corrects the display position of the visual guidance virtual image GVI. Correction performed by the display control unit 74 will be described later. The display control unit 74 generates the display data indicating the corrected display position.

Figure 10:
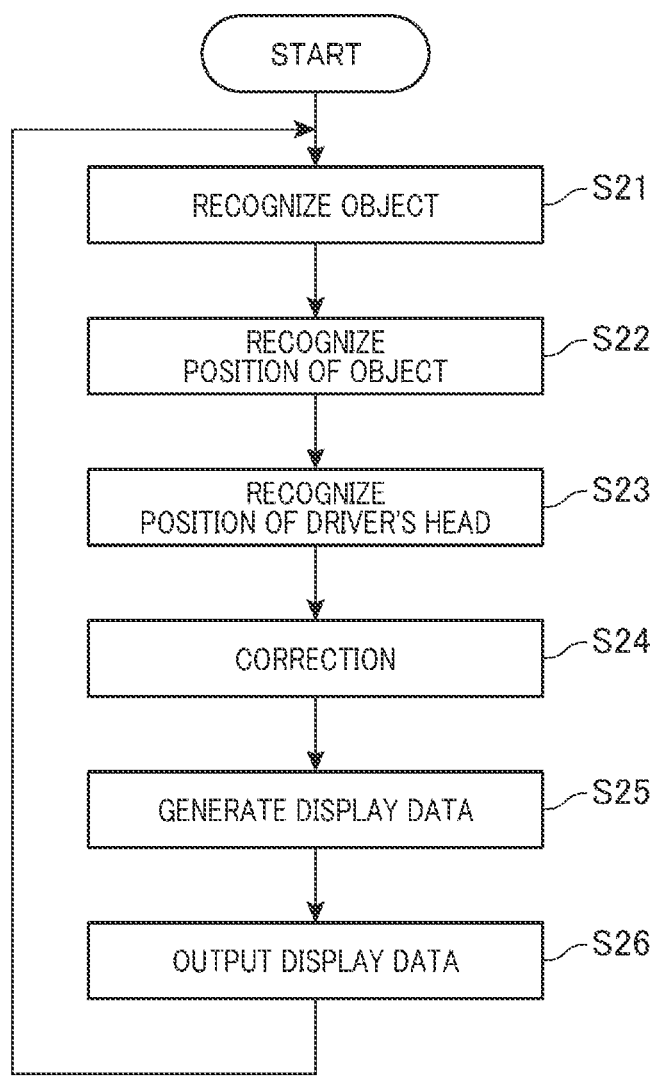
FIG. 10 is a flowchart representing operations of a visual guidance device.

FIG. 10 is a flowchart representing operations of the visual guidance device 50.

The flowchart shown in FIG. 10 presupposes that the driver U is seated on the driver's seat 42, and the driver monitoring camera 52 captures an image of the driver U. The flowchart shown in FIG. 10 presupposes that the front camera 53 captures an image, and the position detection device 54 performs a sensing operation.

Referring to the flowchart in FIG. 10, the object recognition unit 71 recognizes the object 48 from the captured result of the front camera 53 (step S21).

The object position recognition unit 72 recognizes the position of the object 48 recognized in step S21 (step S22).

Then the driver position recognition unit 73 recognizes the position of the head HD of the driver U in the vehicle 41 from the captured result of the driver monitoring camera 52 (step S23).

Based on the position of the object 48 recognized in step S22, and the position of the head HD of the driver U recognized in step S23, the display control unit 74 corrects the display position of the visual guidance virtual image GVI (step S24).

FIG. 11 is an explanatory view of correcting the display position of the visual guidance virtual image GVI.

FIG. 11 illustrates an example that another vehicle 8g as the object 48 exists ahead of the vehicle 41, and illustrates a state where the visual guidance device 50 guides the visual line of the driver U to the other vehicle 8g.

In the top view of the vehicle 41, the display control unit 74 corrects a position at which the windshield 45 intersects a line connecting positions of the head HD of the driver U and the object 48 as the display position of the visual guidance virtual image GVI in the vehicle width direction.

FIG. 11 illustrates an example that the position of the head HD of the driver U is moved to the left. Referring to FIG. 11, the head HD before movement to the left is indicated by a solid line. The head HD after movement to the left from the head indicated by the solid line is indicated by a dotted line. Referring to FIG. 11, a line L2 connects the position of the head HD before movement to the left to the position of the other vehicle 8g as the object 48 in a top view of the vehicle 41. Referring to FIG. 11, a line L3 connects the position of the head HD after movement to the left to the position of the other vehicle 8g as the object 48 in the top view of the vehicle 41. As illustrated in FIG. 11, the position of the other vehicle 8g is kept unchanged in both states indicated by the lines L2 and L3.

When the head HD of the driver U is positioned as indicated by the solid line, the display control unit 74 corrects the display position of the visual guidance virtual image GVI to a position I1. At the position I1, the line L2 intersects the windshield 45 in the vehicle width direction in the top view of the vehicle 41.

When the position of the head HD of the driver U moves to the left to change the position as indicated by the dotted line, the display control unit 74 corrects the display position of the visual guidance virtual image GVI to a position I2 to the left of the position I1. At the position I2, the line L3 intersects the windshield 45 in the vehicle width direction in the top view of the vehicle 41.

Returning back to the description of the flowchart in FIG. 10, after correction of the display position in step S24, the display control unit 74 generates the display data indicating the corrected display position (step S25).

The display control unit 74 then outputs the display data to the display device 51 (step S26).

After execution of step S26, the processor 70 of the visual guidance device 50 executes the process from step S21 repeatedly. This may vary the display position of the visual guidance device 50 by following every change in the position of the head HD of the driver U.

FIG. 12 is an explanatory view of the visual line of the driver U when the display position of the visual guidance virtual image is not corrected.

FIG. 12 illustrates an example that the other vehicle 8g as the object 48 exists ahead of the vehicle 41, and the visual guidance device 50 guides the visual line of the driver U to the other vehicle 8g.

Like FIG. 11, FIG. 12 illustrates an example that the position of the head HD of the driver U has moved to the left. Referring to FIG. 12, the head HD at the position before movement to the left is indicated by the solid line, and the head HD at the position after movement to the left is indicated by the dotted line. A visual line LS1 is formed when the driver U before moving the head HD to the left in the top view of the vehicle 41 sees the visual guidance virtual image GVI. Referring to FIG. 12, a visual line LS2 is formed when the driver U after moving the head HD to the left in the top view of the vehicle 41 sees the visual guidance virtual image GVI.

As FIG. 12 illustrates, the other vehicle 8g as the object 48 exists ahead of the visual line LS1. In FIG. 12, the visual guidance device 50 causes the display device 51 to display the visual guidance virtual image GVI so that the visual line of the driver U can be guided to the other vehicle 8g before moving the head HD of the driver U to the left. Meanwhile, as FIG. 12 illustrates, the other vehicle 8g as the object 48 does not exist ahead of the visual line LS2. That is, if the head HD of the driver U moves to the left, the visual guidance device 50 may fail to guide the visual line of the driver U to the other vehicle 8g accurately in spite of the visual guidance virtual image GVI displayed by the display device 51 unless the display position is corrected.

The visual guidance device 50 corrects the display position of the visual guidance virtual image GVI to allow change in the display position of the visual guidance virtual image GVI in the vehicle width direction as illustrated in FIG. 11. This allows the other vehicle 8g to exist ahead of the visual line of the driver U in spite of change in the position of the head HD Of the driver U. That is, the visual guidance device 50 allows guidance of the visual line of the driver U to the other vehicle 8g accurately in spite of change in the position of the head HD of the driver U.

Third Embodiment

Figure 13:
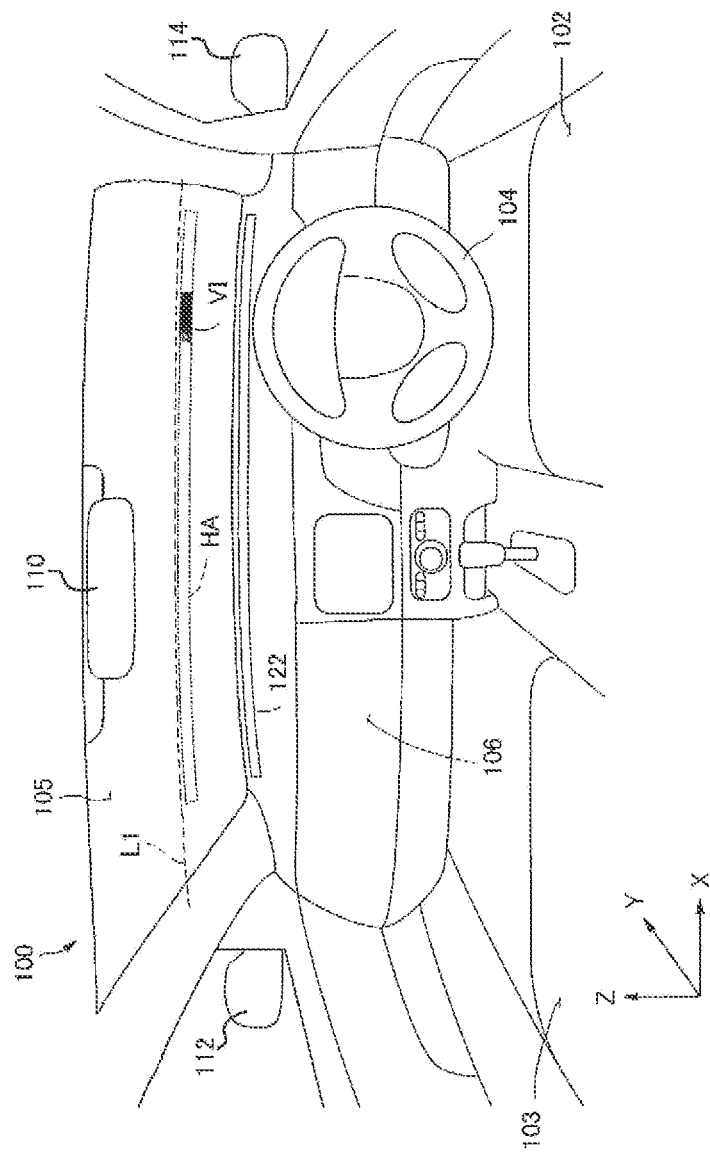
FIG. 13 is a view of a front interior structure of a vehicle which is installed with an attention calling system according to an embodiment of the present invention.
Figure 14:
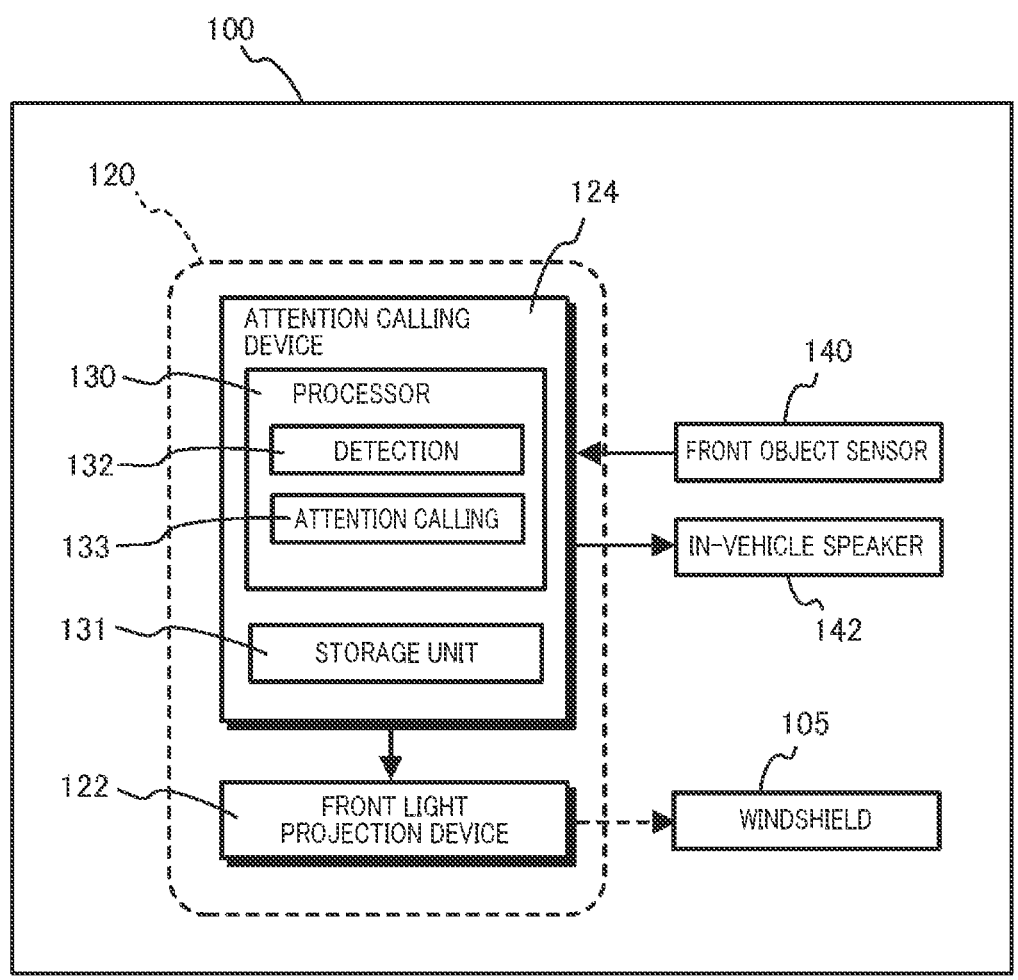
FIG. 14 illustrates a structure of an attention calling system according to a first embodiment of the present invention.

A third embodiment of the present invention will be described. FIG. 13 corresponding to FIG. 1 according to the first embodiment is a view of a front interior structure of a vehicle 100 as a moving body which is installed with the attention calling system according to the embodiment of the present invention. FIG. 14 illustrates a structure of an attention calling system 120 according to the third embodiment. Structures of other parts of the vehicle 100 will be described later in association with other embodiments.

In the embodiment, the vehicle 100 is a four-wheeled vehicle. Referring to FIG. 13, a Z-axis denotes a vehicle height direction of the vehicle 100, an X-axis denotes a vehicle width direction of the vehicle 100, and a Y-axis denotes a longitudinal direction of the vehicle 100 (or a straight-running direction). In the following description, a direction (including X-axis and Y-axis directions) orthogonal to the vehicle height direction (Z-axis direction) will be referred to as a horizontal direction.

Referring to FIG. 13, an operator's seat 102 as a driver's seat and a front passenger seat 103 are disposed in the interior of the vehicle 100. In the interior of the vehicle 100, a steering wheel 104, a windshield 105 serving as a partition between the vehicle exterior and the vehicle interior, and an instrument panel 106 are provided. The vehicle 100 includes a rearview mirror 110, a left fender mirror (or left door mirror) 112, and a right fender mirror (or right door mirror) 114 for helping the operator to visually recognize the rear view and the rear side view of the vehicle 100.

Referring to FIG. 14, the attention calling system 120 includes a front light projection device 122 and an attention calling device 124, which are disposed in the interior of the vehicle 100. The front light projection device 122 outputs a visual display on the windshield 105, which can be visually recognized by the operator. The attention calling device 124 controls the front light projection device 122 to call the operator's attention to the object by means of the visual display. The front light projection device 122 projects predetermined-shaped light (graphical shape such as a rectangle) onto the windshield 105 for outputting the visual display. The front light projection device 122 corresponds to the display device 11 as described referring to FIG. 1.

Referring to FIG. 13, in the embodiment, the front light projection device 122 is formed as a light source array consisting of multiple light sources arranged on the instrument panel 106 below the windshield 105 along the vehicle width direction, for example, an LED array capable of projecting multi-colored light. The front light projection device 122 projects light to the windshield 105 under the control of the attention calling device 124 so that a visual display VI for guiding the operator's visual line is displayed below an upper limit displayable line L1 of the windshield 105. The upper limit displayable line L1 indicates the upper limit position that allows display of an image in the upper-lower direction (vehicle height direction) of the windshield 105. The upper limit position indicated by the upper limit displayable line L1 is prescribed by the legal regulation. For example, the upper limit position may be limited by the domestic law, domestic regulation, or the like.

The visual display VI is formed by projecting predetermined-sized light to the windshield 105. The visual display VI is a virtual image formed in a visual field of the operator resulting from reflection of the projected light. The position and size (horizontal length) of the visual display VI on the windshield 105 may be determined by selecting the light source used for projecting light to the windshield 105 from the multiple light sources that constitute the front light projection device 122.

A display range HA of the visual display VI extends below a displayable upper limit line L1 of the windshield 105. The display range HA as a belt-like range with a predetermined width extends on the windshield 105 in the vehicle width direction of the vehicle 100. The display range HA may be referred to as a belt-like range on the windshield 105, which horizontally extends in the direction orthogonal to the vehicle height direction of the vehicle 100.

The light source array or the LED array is an example of the front light projection device 122. However, the structure of the front light projection device 122 is not limited to the one as described above. Any configuration may be conceivable for the front light projection device 122 so long as the visual display VI with predetermined or larger size can be projected in the display range HA. For example, the front light projection device 122 may be a so-called projector for displaying an image as the visual display VI with predetermined size or larger in the display range HA.

Referring to FIG. 14, the attention calling device 124 includes a processor 130 and a storage unit 131. The storage unit 131 is constituted by a volatile or non-volatile semiconductor memory, and/or a hard disk device. The processor 130 is a computer having such processor as CPU (Central Processing Unit). The processor 130 may be provided with ROM (Read Only Memory) to which programs have been written, RAM (Random Access Memory) for temporal data storage, and the like. The processor 130 includes a detection unit 132 and an attention calling unit 133 each as a functional element or a functional unit.

Those functional elements of the processor 130 are implemented through execution of the program by the processor 130 as the computer. The computer program can be stored in an arbitrary computer-readable storage medium. Alternatively, it is possible to form all or part of the functional elements of the processor 130 into hardware devices each including one or more electronic circuit components.

The detection unit 132 is the object recognition unit or the object position recognition unit for detecting the object existing in an area surrounding the vehicle 100. The object may, for example, be a real object having its probability of contact with the vehicle 100 equal to or higher than a given value. The contact probability is calculated from the relative speed of the object to the vehicle 100. The detection unit 132 corresponds to the object recognition unit 31 or the object position recognition unit 32 as described referring to FIG. 1.

Specifically, the detection unit 132 acquires a video image (or image) from a front object sensor 140 installed in the vehicle 100 for detecting an object to the front of the vehicle 100. The front object sensor 140 may be a camera, a laser, and/or a lidar. The detection unit 132 detects a predetermined real object from the front video image derived from the front object sensor 140. If the detected real object has the contact probability with the vehicle 100 derived from the relative speed to the vehicle 100 is equal to or larger than the given value, the real object is detected as the object. In the embodiment, the predetermined real object may be traffic participants including vehicles and pedestrians, and fixtures including road signs, electric poles, mailboxes, and the like. The detection unit 132 sends position information of each of the detected objects to the attention calling unit 133.

The attention calling unit 133 corresponds to the display control unit as described referring to FIG. 1. The attention calling unit 133 as the display control unit controls the front projection device 122 as the display device to output the visual display in the display range HA on the windshield 105 of the vehicle 100. Specifically, the attention calling unit 133 displays the visual display VI at the horizontal position in the display range HA, which is the same as that of the object on the windshield 105 seen from the operator's position.

More specifically, the attention calling unit 133 calculates each intersection point between the operator's visual line directed to the objects and the windshield 105 based on the standard eye position of the operator seated on the operator's seat 102, and each piece of position information of the objects received from the detection unit 132. The attention calling unit 133 displays each visual display VI at the horizontal position in the display range HA, which is the same as that of the calculated intersection point.

If the object is detected at a position deviating from a predetermined front visual field range around the operator seated on the operator's seat of the vehicle 100 as the center, the attention calling unit 133 generates a sound through distributedly disposed multiple in-vehicle speakers 142 for notifying the operator of object orientation.

The front visual field range is determined to allow the operator seated on the operator's seat to perform visual recognition naturally while keeping the operator's face directed forward. The front visual field range is defined by the predetermined viewing angle (for example, 45°) from the visual line of the operator seated on the operator's seat in the straight-running direction (Y-direction of FIG. 13) of the vehicle 100.

Unlike the generally employed technique, the above-configured attention calling system 120 does not display the image overlaid with the real object on the windshield, but displays the visual display VI on the windshield 105 at the same horizontal position as that of the object seen from the operator's position in the belt-like display range HA extending in the vehicle width direction. In this case, since reduced chance for the operator to see the object overlaid with the visual display VI enhances concentration of the operator, the attention calling system 120 is capable of calling the operator's attention to various traffic participants in the environment surrounding the vehicle 100.

The front light projection device 122 outputs the visual display VI on the windshield 105 by projecting predetermined-shaped light (graphical shape such as a rectangle). The simple visual display VI is capable of calling the operator's attention to the object without distracting attention.

The front light projection device 122 includes multiple light sources arranged along the vehicle width direction below the windshield 105. The simply configured attention calling system 120 is capable of calling the operator's attention to the object.

If the object is detected in the area surrounding the vehicle 100 at a position deviating from the predetermined front visual field range around the operator seated on the operator's seat of the vehicle 100 as the center, the attention calling unit 133 generates a sound inside the vehicle for the object orientation. The attention calling system 120 generates the sound to allow the operator to perform orientation of the detected object in the area demanding the operator to move his/her face to visually recognize the object. This makes it possible to call the operator's attention to the object without distracting the attention.

In the attention calling system 120, the object denotes the real object with probability of contact with the vehicle 100 equal to or larger than the given value. That is, the attention calling system 120 narrows down the real object that is likely to cause the risk to the operation of the vehicle 100, and displays the visual display VI indicating the direction of the object. This makes it possible to call the operator's attention to the object further concentratedly.

Figure 15:
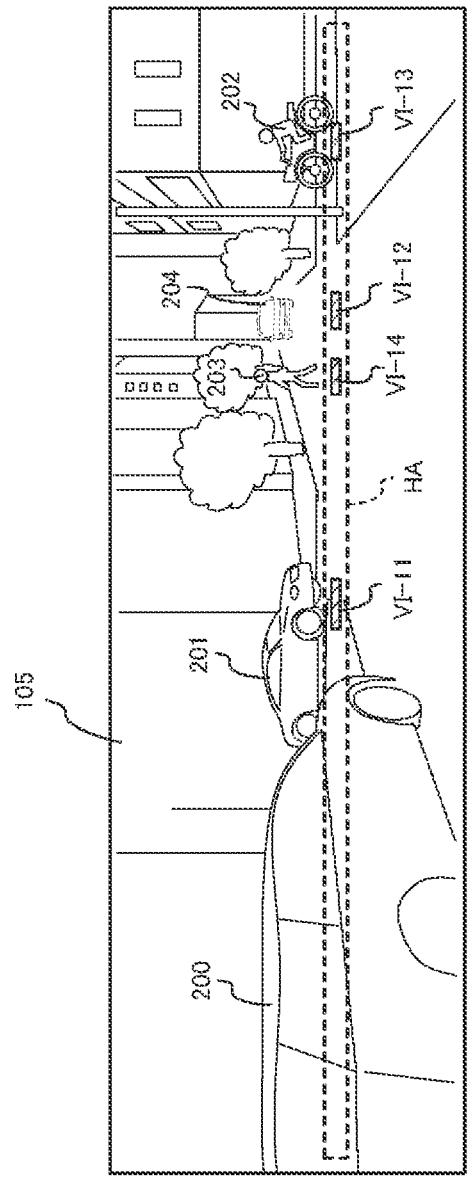
FIG. 15 illustrates an example of visual displays on the windshield, which are displayed by the attention calling system as illustrated in FIG. 14.

FIG. 15 illustrates an example of the visual displays VI on the windshield 105, which are displayed by the attention calling system 120. FIG. 15 illustrates a scene of the front area of the vehicle 100 seen by the operator in the vehicle 100 through the windshield 105. The illustrated example shows a vehicle 200 parked at the left side before the intersection, a vehicle 201 running from the left side of the crossing road, and a motorbike 202 running from the right side of the crossing road in the front area of the urban area having the intersection. In the front area, a pedestrian 203 is crossing the traveling road on which the own vehicle 100 is running, and a vehicle 204 is running on the opposite lane of the traveling road.

At this moment, the detection unit 132 detects vehicles except the parked vehicle 200, that is, the vehicles 201, 204, the motorbike 202, and the pedestrian 203 crossing the road as the objects liable to contact with the vehicle 100. The attention calling unit 133 allows the front light projection device 122 to display visual displays VI-11, VI-12, VI-13, VI-14 (hatched rectangles) at the horizontal positions corresponding to the vehicles 201, 204, the motorbike 202, and the pedestrian 203 as the detected objects in the display range HA (rectangular range indicated by a dotted line) on the windshield 105.

Figure 16:
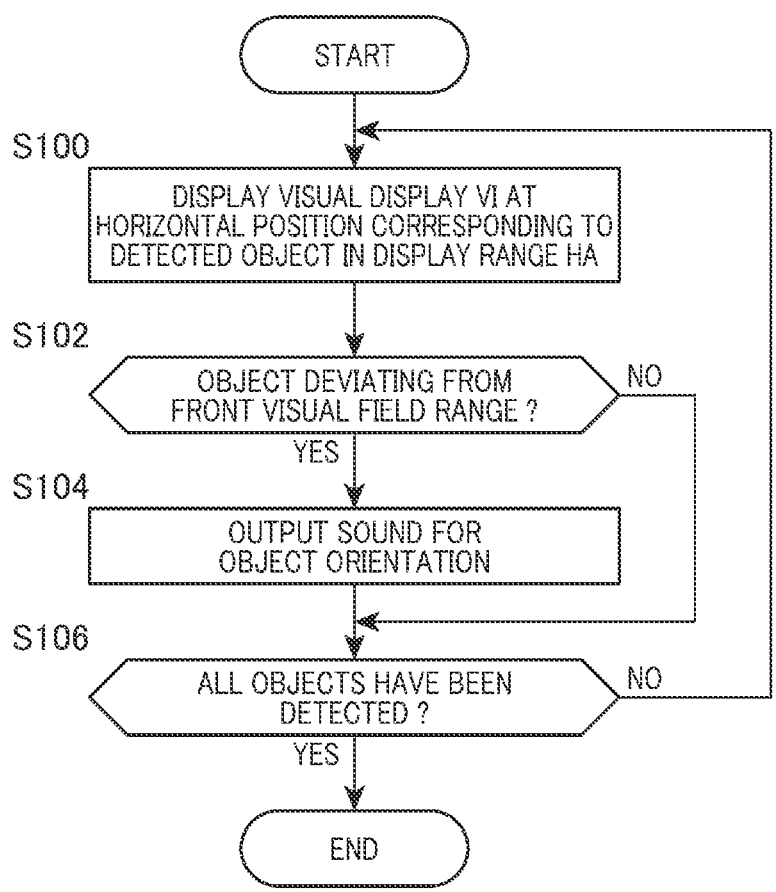
FIG. 16 is a flowchart representing an operation procedure executed by the attention calling system as illustrated in FIG. 14.

FIG. 16 is a flowchart representing an operation procedure executed by the attention calling system 120. When the detection unit 132 as illustrated in FIG. 14 detects at least one object, the process shown in FIG. 16 is started for each of the detected objects.

Upon start of the process, the attention calling unit 133 allows the front light projection device 122 to display the visual displays VI at the horizontal positions corresponding to the respective detected objects in the display range HA on the windshield 105 based on the respective position information of the objects detected by the detection unit 132 (S100).

The attention calling unit 133 determines whether or not the object has been detected at the position deviating from the predetermined front visual field range based on the position information of the object received from the detection unit 132 (S102). If the object has been detected at the position deviating from the predetermined front visual field range (YES in S102), the attention calling unit 133 outputs a sound through the in-vehicle speaker 142 for notifying the operator of orientation of the object (S104).

The attention calling unit 133 determines whether or not the object is no longer detected by the detection unit 132 (S106). If the object is no longer detected (YES in S106), the attention calling unit 133 terminates execution of the process. Meanwhile, if the object has been continuously detected (NO in S106), the attention calling unit 133 returns to step S100 for executing the process repeatedly.

Fourth Embodiment

Figure 17:
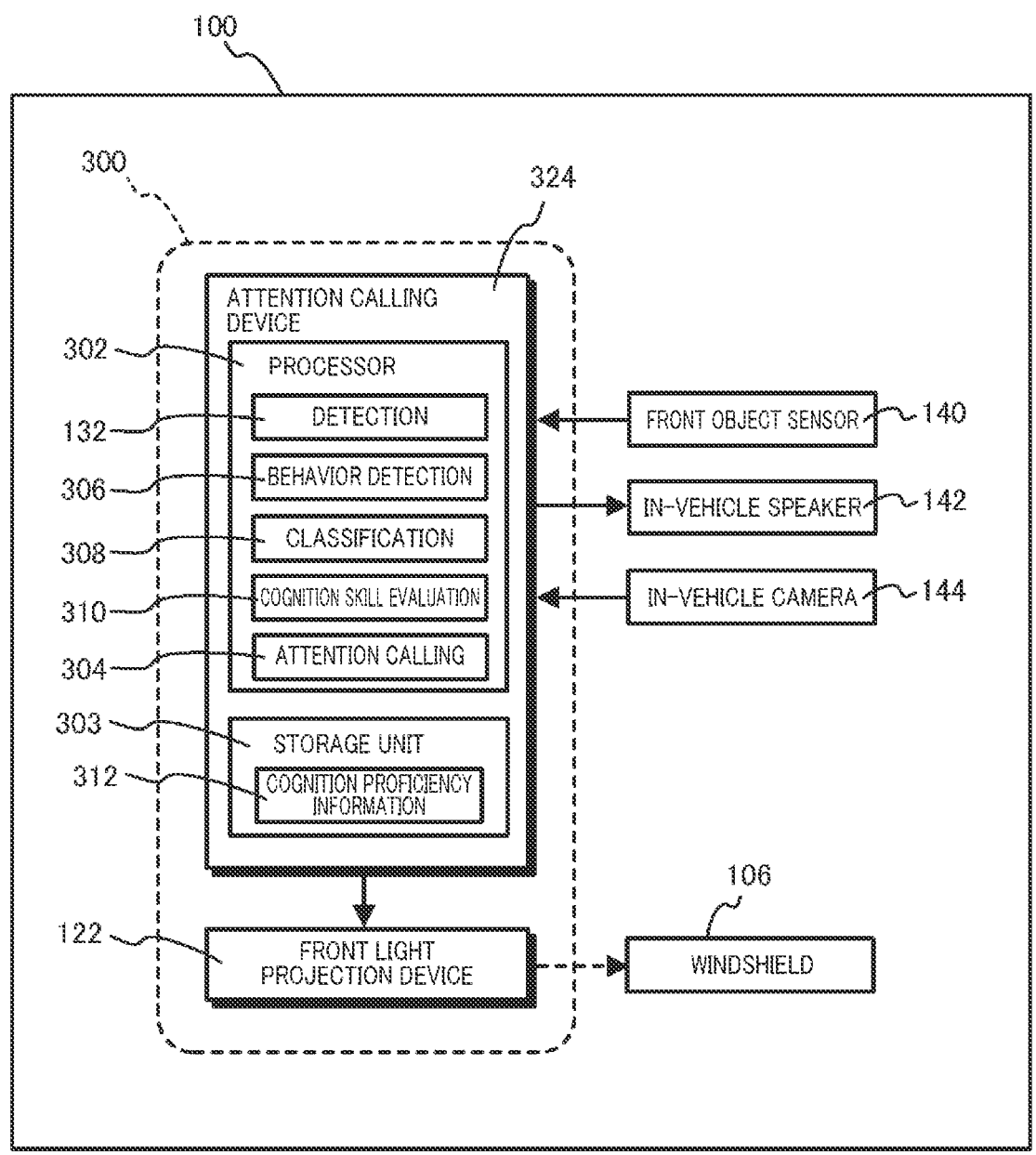
FIG. 17 illustrates a structure of an attention calling system according to a second embodiment of the present invention.

A fourth embodiment according to the present invention will be described. FIG. 17 illustrates a structure of an attention calling system 300 according to the fourth embodiment of the present invention. In place of the attention calling system 120, the attention calling system 300 is installed in the vehicle 100 as described in the third embodiment referring to FIG. 13. The components shown in FIG. 17, which are the same as those shown in FIG. 14 will be designated with the same codes, and explanations referring to FIG. 14 will apply correspondingly.

The attention calling system 300 includes the front light projection device 122 for outputting the visual display onto the windshield 105, which can be visually recognized by the operator, and an attention calling device 324 for controlling the front light projection device 122 to call the operator's attention to the object by means of the visual display.

The attention calling device 324 has its structure similar to that of the attention calling device 124 as illustrated in FIG. 14 except that a processor 302 and a storage unit 303 are provided in place of the processor 130 and the storage unit 131. The storage unit 303 is constituted by the volatile or nonvolatile semiconductor memory, and/or a hard disk device. A cognition skill evaluation unit 310 of the processor 302 to be described later stores cognition proficiency information 312.

The processor 302 has its structure similar to that of the processor 130 except that an attention calling unit 304 is provided as the functional element or the functional unit in place of the attention calling unit 133. Unlike the processor 130, the processor 302 further includes a behavior detection unit 306, a classification unit 308, and the cognition skill evaluation unit 310 as the functional elements or the functional units.

Like the processor 130, those functional elements of the processor 302 are implemented through execution of the program by the processor 302 as the computer. The computer program can be stored in an arbitrary computer-readable storage medium. Alternatively, it is possible to form all or part of the functional elements of the processor 302 into hardware devices each including one or more electronic circuit components.

The behavior detection unit 306 detects movements of visual line and face direction (hereinafter referred to as the face movement) of the operator using an in-vehicle camera 144 installed in the vehicle 100. The in-vehicle camera 144 is a so-called driver monitoring camera (DMC) for observing the operator.

The classification unit 308 classifies each of the detected objects into one of multiple categories based on at least a type of the object, and the traffic scene in the presence of the object. The category of the object may be a segment indicating an object appearing place, an object appearing timing, and/or a motion of the appearing object in the current traffic scene in addition to the object type.

The object type indicates the segment that divides the objects into the pedestrian, vehicle, obstacle, and the like. The pedestrian may be subdivided into an adult, a child, an aged person, and the like. The vehicle may be subdivided into an automobile, a motorbike, a bus, a bicycle, and the like. The obstacle may be subdivided into a ball, a fallen object, a disabled car, and the like.

The traffic scene is divided into a straight road, a railroad crossing, an intersection, a corner, and the like. The intersection may further be subdivided into the intersection in the presence of the parked vehicle, the intersection in the absence of the parked vehicle, the intersection with low visibility in the presence of building, the intersection with high visibility, and the like. The traffic scene may be subdivided in accordance with the number of traffic participants existing in the scene and/or the average speed of the traffic participants.

The thus obtained category may be expressed as "child appearing from the parked vehicle at the intersection", "bicycle appearing from building at the intersection with low visibility", "motorbike running straight forward on the opposite lane at the intersection", and the like.

The cognition skill evaluation unit 310 calculates a cognition proficiency value indicating a degree of cognition proficiency with respect to each categorized object, and stores the calculated cognition proficiency value for each category in the storage unit 303 as the cognition proficiency information 312. The degree of cognition proficiency with respect to the object represents the degree of intentionality to take action to reach the object cognition state (movement of visual line or face). The intentionality to take action to reach the cognition state may be dependent on the object appearing place, the object appearing timing, and/or appearing motions in the current traffic scene in addition to the category or type of the object. The cognition skill evaluation unit 310 associates the calculated object cognition proficiency value with the category of the object, and stores the cognition proficiency information 312 indicating the cognition proficiency value for each category in the storage unit 303.

Specifically, when the operator visually recognizes the object, the cognition skill evaluation unit 310 calculates the operator's cognition proficiency value with respect to the category of the object based on whether or not the operator's face has moved toward the object before moving the visual line to the object. Upon intentional visual recognition of presence/absence of the traffic participant based on prediction to some extent, the operator generally tends to timely face toward the place where the traffic participants are likely to appear, in other words, toward the real object before moving his/her visual line toward the real object.

The cognition skill evaluation unit 310 calculates the cognition proficiency value of the category of the object as a target for calculating the proficiency value based on whether or not the object as the target for calculating the proficiency value is the real object that has undergone the visual line passage during the visual line movement to the other object, and whether or not the face movement is followed by the visual line movement.

The determination with respect to the operator's visual recognition of the object can be made by the behavior detection unit 306 based on whether or not the operator's visual line has been retained on the object for a given or longer time.

More specifically, the cognition skill evaluation unit 310 calculates the cognition proficiency value with respect to the category of the object in the following manner.

a) After the visual line movement subsequent to the face direction movement, if the visual line has been retained on the object for the given or longer time, the cognition proficiency value of the category of the object is set to 1.

b) During the visual line movement subsequent to the face direction movement, if the visual line has passed an object, the cognition proficiency value of the category of the object is set to 2.

c) After the visual line movement with no preceding face direction movement, if the visual line has been retained on an object for the given or longer time, the cognition proficiency value of the category of the object is set to 3.

d) During the visual line movement with no preceding face direction movement, if the visual line has passed an object, the cognition proficiency value of the category of the object is set to 4.

e) If the visual line has never been retained on nor passed an object, the cognition proficiency value of the category of the object is set to 5.

Like the attention calling unit 133, the attention calling unit 304 controls the front light projection device 122 to output the visual display VI in the display range HA on the windshield 105 of the vehicle 100 as illustrated in FIG. 13. Unlike the attention calling unit 133, the attention calling unit 304 refers to the cognition proficiency information 312 stored in the storage unit 303 upon output of the visual display VI, and displays the visual display VI indicating each direction position of the detected objects in the display range HA on the windshield 105 in the mode adapted to the operator's cognition proficiency value which has been calculated for each category of the object based on the cognition proficiency information 312.

Specifically, the visual display VI may be displayed in the mode adapted to the operator's cognition proficiency value by means of, for example, color, luminance, and/or size of the visual display VI as the projected light in accordance with the operator's cognition proficiency value.

FIG. 18 represents an example of the cognition proficiency information 312 stored in the storage unit 303 by the cognition skill evaluation unit 310. In FIG. 18, the cognition proficiency information of an operator is listed in the form of a table. The cognition skill evaluation unit 310 stores the cognition proficiency information as shown in FIG. 18 in the storage unit 303. Referring to the table of FIG. 18, rows from the left to the right will be referred to as a first row, a second row, ..., and a sixth row, and columns downward from the top will be referred to as a first column, a second column, a third column, ..., and a sixth column.

The first row of the cognition proficiency information table as shown in FIG. 18 represents a list of categories used by the classification unit 308 for object classification. The categories in the first row of FIG. 18 are expressed descriptively. However, like the generally employed technique, the segments such as presence/absence of shielding object, crossing road/traveling road, pedestrian/vehicle, and the like may be formed into combinations of codes, each of which is usable as the category.

Values from the second to the sixth rows as shown in FIG. 18 correspond to the most recent cognition proficiency values of each categorized objects calculated five times by the cognition skill evaluation unit 310. Values in the third column from the second to the sixth rows as shown in FIG. 18 indicate the most recent cognition proficiency values calculated five times at each time when the operator encounters the vehicle categorized as the "vehicle appearing from crossing road in the absence of shielding object."

Figure 19:
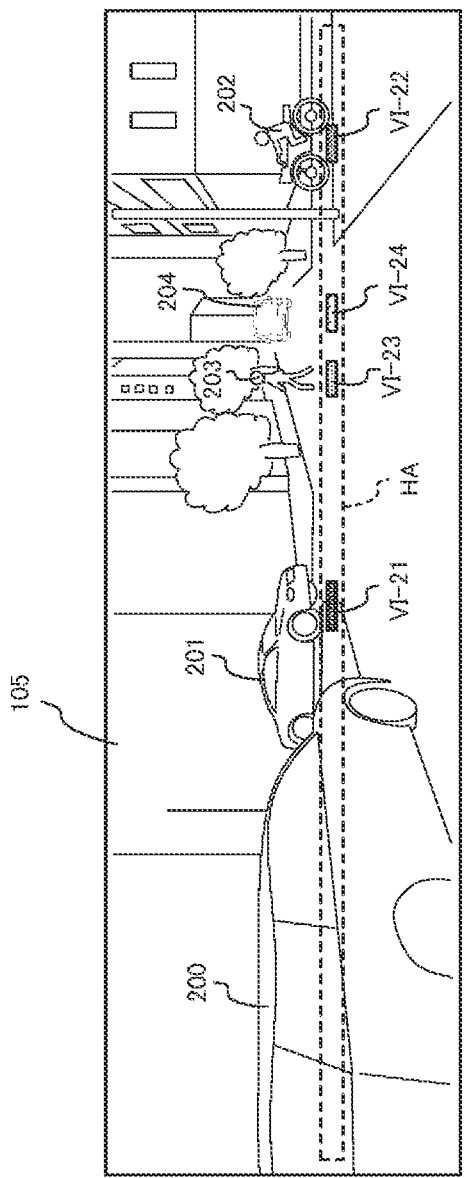
FIG. 19 illustrates an example of visual displays on the windshield, which are displayed by the attention calling system as illustrated in FIG. 17.

FIG. 19 illustrates an example of visual displays VI on the windshield 105, which are displayed by the attention calling unit 304 based on the cognition proficiency information as shown in FIG. 18. The traffic scene of the area to the front of the vehicle 100 as illustrated in FIG. 19 is the same as the one illustrated in FIG. 15. In this case, it is assumed that the classification unit 308 classifies the vehicle 201 as the category of "vehicle appearing from crossing road in the presence of shielding object", and the vehicle 204 as the category of "vehicle running straight on the lane opposite to the traveling road at the intersection". It is assumed that the classification unit 308 classifies the motorbike 202 and the pedestrian 203 as the categories of "vehicle appearing from crossing road in the absence of shielding object", and "pedestrian crossing the traveling road at the intersection", respectively.

The attention calling unit 304 refers to the cognition proficiency information 312 stored in the storage unit 303 as shown in FIG. 18 for displaying the visual displays VI of the vehicles 201, 204, the motorbike 202, and the pedestrian 203 as the objects detected by the detection unit 132 in the display range HA on the windshield 105.

The attention calling unit 304 displays the visual display VI of the categorized object in the mode having its visual attractivity higher as increase in the cognition proficiency value from 1 to 5 in accordance with the cognition proficiency value of the category indicated by the cognition proficiency information 312. The expression of "display in the mode having its visual attractivity higher" represents that the hue of the visual display VI is sequentially changed from cool to warm color so as to be more conspicuous as increase in the cognition proficiency value from 1 to 5. It is possible to use not only the hue but also brightness (color tone), flickering speed, size, or the like for the mode to change the visual display VI adapted to the cognition proficiency value. In this embodiment, it is assumed that as the cognition proficiency value is increased step by step from 1 to 5, the visual display VI will be displayed in blue, green, yellow, orange, and red, respectively.

The example of FIG. 18 shows that the cognition proficiency value 4 is the most frequent result of the recent cognition proficiency values calculated five times with respect to the category encountered by the operator, that is, the "vehicle appearing from crossing road in the presence of shielding object". Accordingly, the attention calling unit 304 displays the visual display VI-21 of the above-categorized vehicle 201 in orange in the display range HA on the windshield 105 as illustrated in FIG. 19. The value 3 is shown as the most frequent result of the recent cognition proficiency values calculated five times with respect to the category of the "vehicle appearing from crossing road in the absence of shielding object". Accordingly, the attention calling unit 304 displays the visual display VI-22 of the above-categorized motorbike 202 in yellow in the display range HA on the windshield 105 as illustrated in FIG. 19.

Similarly, the value 2 is shown as the most frequent result of the recent cognition proficiency values calculated five times with respect to the category of the "pedestrian crossing the traveling road at the intersection". Accordingly, the attention calling unit 304 displays the visual display VI-23 of the above-categorized pedestrian 203 in green in the display range HA on the windshield 105 as illustrated in FIG. 19. The value 1 is shown as the most frequent result of the recent cognition proficiency values calculated five times with respect to the category of the "vehicle running straight on the lane opposite to the traveling road at the intersection". Accordingly, the attention calling unit 304 displays the visual display VI-24 of the above-categorized vehicle 204 in blue in the display range HA on the windshield 105 as illustrated in FIG. 19.

The color as the mode for displaying the visual display VI is selected using the most frequent value as the recent result of cognition proficiency values calculated five times with respect to each category. It is also possible to use an integer value derived from revaluation/devaluation, and rounding of the average value of the recent results of cognition proficiency values calculated five times, and the minimum/maximum value of the recent results of cognition proficiency values calculated five times.

Like the attention calling system 120, the above-configured attention calling system 300 displays the visual display VI at a horizontal position corresponding to the object in the belt-like display range HA on the windshield 105. Like the attention calling system 120, the attention calling system 300 is capable of calling the operator's attention to various traffic participants existing in the environment surrounding the vehicle 100 without distracting the operator's attention.

Especially, the attention calling system 300 is configured to display the visual display VI of the object in the mode adapted to the cognition proficiency value of the operator with respect to the category of the object. The attention calling system 300 allows the operator to visually recognize the respective objects with priority in accordance with the cognition proficiency value by means of the output visual display VI. This makes it possible to call the operator's attention to various traffic participants existing in the environment surrounding the vehicle 100 in more effective mode for driving operations performed by the operator.

The attention calling system 300 is configured to calculate the cognition proficiency value for each category of the objects based on presence/absence of the face movement prior to the visual line movement, which indicates the operator's intentional movement for cognition. This makes it possible to calculate the cognition proficiency value by executing the simple process.

The attention calling system 300 is configured to determine the cognition proficiency value with respect to the category of the specific object (undergoes the visual line passage) depending on whether or not the object has undergone the visual line passage during the intentional visual line movement for visually recognizing the object. The attention calling system 300 obtains the cognition proficiency value of the object that is not a target of visual recognition based on the tendency for the movement path of the operator's visual line. The cognition proficiency value can be reflected to the mode for displaying the visual display.

Figure 20:
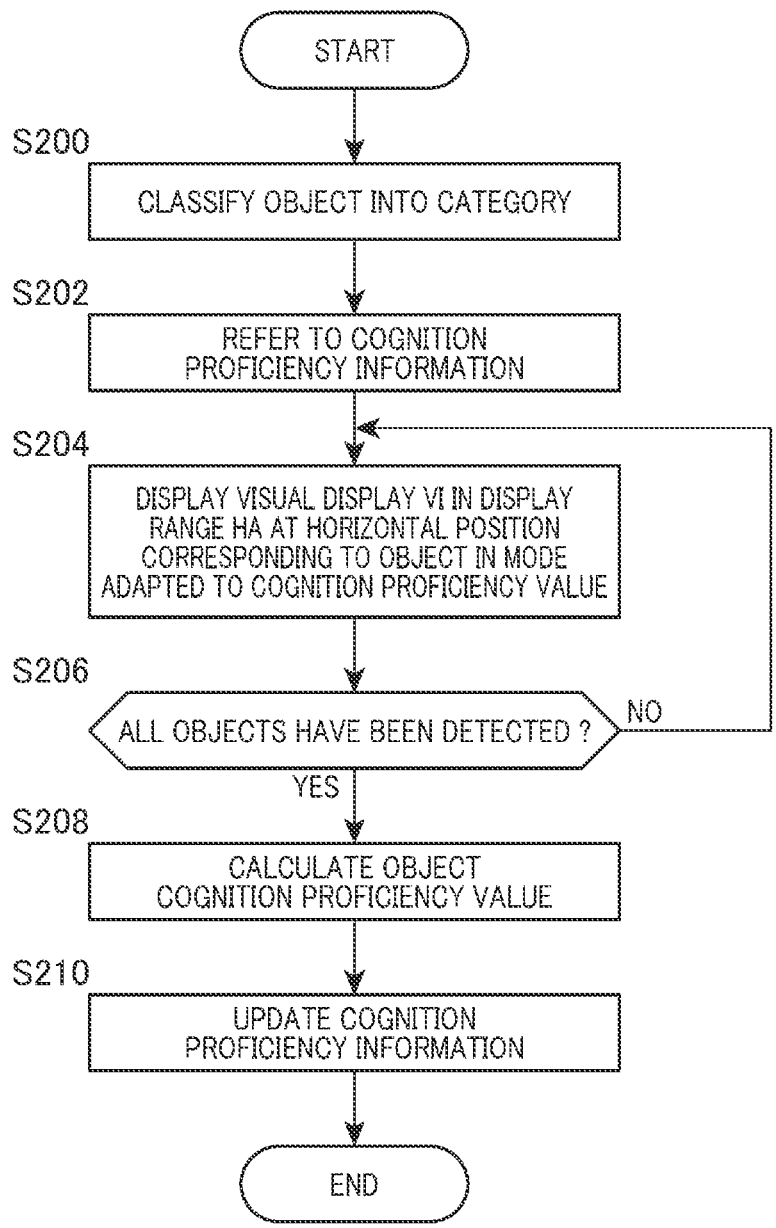
FIG. 20 is a flowchart representing an operation procedure executed by the attention calling system as illustrated in FIG. 17.

FIG. 20 is a flowchart representing an operation procedure executed by the attention calling system 300. When the detection unit 132 as illustrated in FIG. 17 detects at least one object, the process shown in FIG. 20 is started for each of the detected objects.

Upon start of the process, the classification unit 308 classifies the detected object into the category (S200). The attention calling unit 304 refers to the cognition proficiency information 312 stored in the storage unit 303 (S202), and displays the visual display VI at the horizontal position corresponding to the object in the display range HA in the mode adapted to the cognition proficiency value (S204).

The attention calling unit 304 determines whether or not the object is no longer detected by the detection unit 132 (S206). If the object has been continuously detected (NO in S206), the attention calling unit 304 returns to step S204 for executing the process repeatedly. Meanwhile, if the object is no longer detected (YES in S206), the cognition skill evaluation unit 310 calculates the operator's cognition proficiency value with respect to the object based on how visual line and face direction of the operator move, which have been detected by the behavior detection unit 306 (S208).

The cognition skill evaluation unit 310 stores the calculated cognition proficiency value in association with the category of the object in the storage unit 303 as the cognition proficiency information. Specifically, the cognition skill evaluation unit 310 adds the calculated cognition proficiency value to the cognition proficiency information 312 stored in the storage unit 303 for updating the cognition proficiency information 312 (S210). After the cognition proficiency information 312 is updated by the cognition skill evaluation unit 310, the processor 302 terminates the process.

Fifth Embodiment

Figure 21:
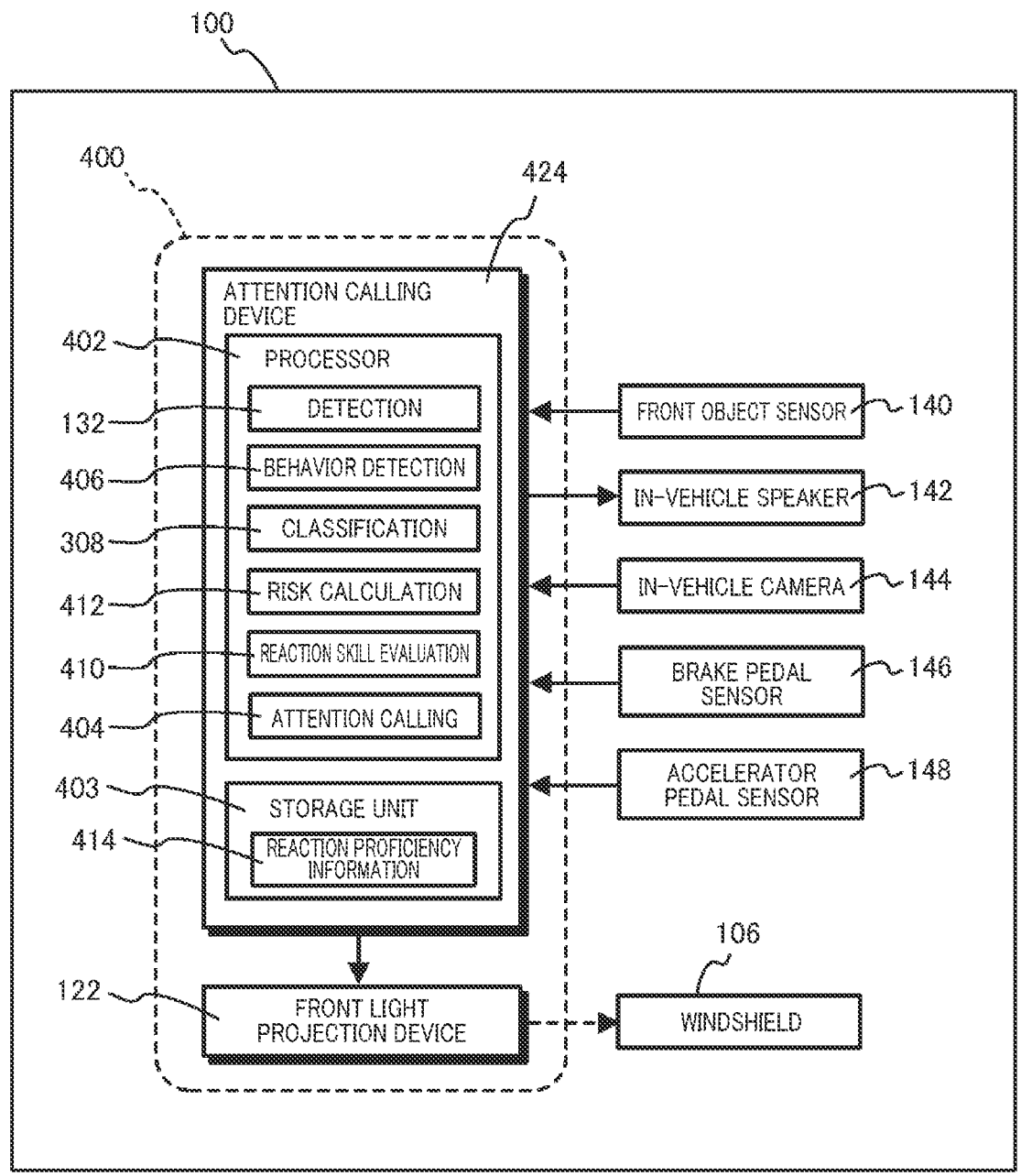
FIG. 21 illustrates a structure of an attention calling system according to a third embodiment of the present invention.

A fifth embodiment of the present invention will be described. FIG. 21 illustrates a structure of an attention calling system 400 according to the fifth embodiment of the present invention. In place of the attention calling system 120, the attention calling system 400 is installed in the vehicle 100 as described in the third embodiment referring to FIG. 13. The components shown in FIG. 21, which are the same as those shown in FIGS. 14 and 17 will be designated with the same codes in FIGS. 14 and 17, and explanations referring to FIGS. 14 and 17 will apply correspondingly.

The attention calling system 400 includes the front light projection device 122 for outputting the visual display onto the windshield 105, which can be visually recognized by the operator, and an attention calling device 424 for controlling the front light projection device 122 to call the operator's attention to the object by means of the visual display.

The attention calling device 424 has its structure similar to that of the attention calling device 324 as illustrated in FIG. 17 except that a processor 402 and a storage unit 403 are provided in place of the processor 302 and the storage unit 303. The storage unit 403 has its structure similar to that of the storage unit 303, and stores reaction proficiency information 414 using a reaction skill evaluation unit 410 of the processor 402 to be described later.

The processor 402 has its structure similar to that of the processor 302 except that an attention calling unit 404 and a behavior detection unit 406 are provided each as the functional element or the functional unit in place of the attention calling unit 304 and the behavior detection unit 306. Unlike the processor 302, the processor 402 does not include the cognition skill evaluation unit 310 but includes the reaction skill evaluation unit 410 and a risk calculation unit 412.

Like the processor 302, the functional elements of the processor 402 are implemented through execution of the program by the processor 402 as the computer. The computer program can be stored in an arbitrary computer-readable storage medium. Alternatively, it is possible to form all or part of the functional elements of the processor 402 into hardware devices each including one or more electronic circuit components.

The risk calculation unit 412 calculates a risk value indicating a degree of risk of contact between the vehicle 100 and each of the objects detected by the detection unit 132 based on the category of the object classified by the classification unit 308. The risk value is different from the contact probability calculated based on at least the relative speed of each object detected by the detection unit 132 to the vehicle 100. For example, the actual accidents are divided into the categories as described above, and the ratio of the number of accidents for each category to the total number of accidents is compared with a given threshold value range so that the risk value is obtained by correlating the ratio to a multi-stage evaluation value. In the embodiment, the risk value is evaluated in 10 stages. The risk value 1 denotes the lowest accident occurrence probability, and the risk value 10 denotes the highest accident occurrence probability.

The risk calculation unit 412 is configured to calculate the respective risk values of the detected objects with reference to the risk information indicating the risk value for each category preliminarily stored in the storage unit 403. Alternatively, the risk calculation unit 412 utilizes a learned risk calculation model derived from machine learning with respect to the relation between the category of the object as the risk calculation target and the accident probability of the categorized object so that the risk value with respect to the category of the object is calculated.

Like the behavior detection unit 306, the behavior detection unit 406 detects movements of the visual line and the face direction of the operator using the in-vehicle camera 144, and determines whether or not the operator has visually recognized the object. Specifically, when the time for which the operator's visual line has been retained on the object exceeds the given time, the behavior detection unit 406 determines that the operator has visually recognized the object.

The behavior detection unit 406 measures an actual reaction time taken for the operator to start the specific operation of the vehicle 100 from visual recognition of the object detected by the detection unit 132. In the embodiment, the behavior detection unit 406 detects the specific operation, that is, the operation of the brake pedal or the accelerator pedal using a brake pedal sensor 146 or an accelerator pedal sensor 148.

The reaction skill evaluation unit 410 subtracts a standard reaction time predetermined for the classified category of each object detected by the detection unit 132 from the actual reaction time measured by the behavior detection unit 406 to calculate a reaction delay time for each object. The reaction skill evaluation unit 410 calculates the operator's reaction proficiency value with respect to the category based on the calculated reaction delay time, and stores the reaction proficiency value for each category in the storage unit 403 as the reaction proficiency information 414.

The reaction proficiency value is evaluated in 5 stages. As the reaction delay time (including a negative value) becomes shorter, the reaction proficiency value takes a smaller value. For example, the reaction skill evaluation unit 410 allows the calculated reaction delay time to be associated with any one of the reaction proficiency values from 0 to 4 using the predetermined set of threshold values.

Like the attention calling unit 133 as illustrated in FIG. 14, the attention calling unit 404 controls the front light projection device 122 to output the visual display VI in the horizontally extending belt-like display range HA on the windshield 105 of the vehicle 100. Unlike the attention calling unit 133, the attention calling unit 404 displays the visual display VI indicating each direction position of the objects detected by the detection unit 132 in the display range HA on the windshield 105 at least in the mode adapted to the risk value with respect to the object, which has been calculated by the risk calculation unit 412.

The attention calling unit 404 displays the visual display VI of the categorized object in the mode that makes visual attractivity higher as the risk value of the category becomes closer to the value 10. In this case, the expression of "display in the mode that makes visual attractivity higher" represents that as the risk value is increased from 1 to 10, the hue of the visual display VI is sequentially changed from cool to warm color so as to be more conspicuous. It is possible to use not only the hue but also brightness (color tone), flickering speed, size, or the like as the mode for the visual display VI adapted to the cognition proficiency value.

Specifically, the attention calling unit 404 expresses 10 colors varying from the cool to warm colors in 10-color codes taking values from 1 to 10, respectively. The attention calling unit 404 associates each of the risk values from 1 to 10, which have been calculated for the category of the detected object with the color code that takes the same value. The visual display VI of the object is displayed using the color corresponding to the associated color code. The relation between the color code and the color may be defined as described below. For example, in association with increase in the color code from 1 to 10 stepwise, the visual display VI is variously colored in purple, bluish purple, blue, blue-green, green, yellowish green, yellow, orange-yellow, and red, correspondingly.

The object with higher risk value is displayed as the visual display VI with higher visual attractivity. Accordingly, the operator's visual line can be guided to the object with higher risk value.

In the embodiment, the attention calling unit 404 determines the display mode of the visual display VI considering the operator's reaction skill for each category of the object in addition to the risk value. Specifically, the attention calling unit 404 refers to the reaction proficiency information 414 with respect to the operator, which has been stored in the storage unit 403 by the reaction skill evaluation unit 410 for displaying the visual display VI of the object in the display range HA.

The attention calling unit 404 calculates a danger value by adding the operator's reaction proficiency value (in the embodiment, taking the value from 0 to 4 as described above) with respect to the category of the object indicated by the reaction proficiency information to the risk value. The attention calling unit 404 displays the visual display VI of the object in color corresponding to the color code with the same value as the calculated danger value. The visual display VI of the object with the calculated danger value in excess of the value 10 can be displayed in color corresponding to the color code with maximum value of 10.

After displaying the visual display VI of each detected object in the thus determined display mode (display color in this embodiment), if it is determined that the operator has not visually recognized the object, the attention calling unit 404 raises the visual attractivity level of the visual display VI of the object with time.

Specifically, the attention calling unit 404 measures the time elapsing from display of the visual display VI of the object, and incrementally changes its color to the one corresponding to the color code one step higher than the current color code every passage of the given time (for example, 1 second) so that the visual attractivity of the visual display VI is raised. Increase in the visual attractivity level of the visual display VI is stopped when the color code is increased up to the maximum value 10, or the behavior detection unit 406 detects the operator's visual recognition of the object.

Figure 22:
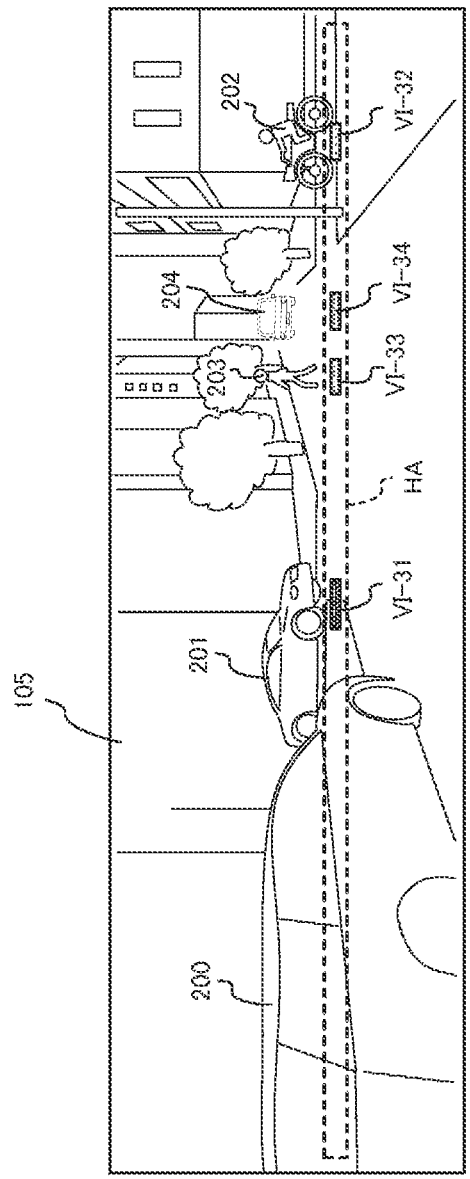
FIG. 22 illustrates an example of visual displays on the windshield, which are displayed by the attention calling system as illustrated in FIG. 21.

FIG. 22 illustrates an example of the visual displays VI on the windshield 105, which are displayed by the attention calling unit 404. The traffic scene and categorization of the objects in the area to the front of the vehicle 100 as illustrated in FIG. 22 are similar to those of the example as illustrated in FIG. 19. FIG. 22 represents the state immediately after starting display of the visual displays VI of the respective objects. Colors of the visual displays VI of the respective objects, that is, the visual displays VI-31, VI-32, VI-33, and VI-34 corresponding to the vehicle 201, the motorbike 202, the pedestrian 203, and the vehicle 204 are determined based on the risk values given to the categories of the vehicle 201, the motorbike 202, the pedestrian 203, and the vehicle 204. Referring to the example of FIG. 22, the danger values, for example, 9, 4, 6, 6 obtained by adding the risk value to the reaction proficiency value are given to the classified categories of the vehicle 201, the motorbike 202, the pedestrian 203, and the vehicle 204, respectively. Correspondingly, the visual displays VI-31, VI-32, VI-33, and the VI-34 are displayed in colors of orange, blue-green, yellowish green, and yellowish green, respectively.

Figure 23:
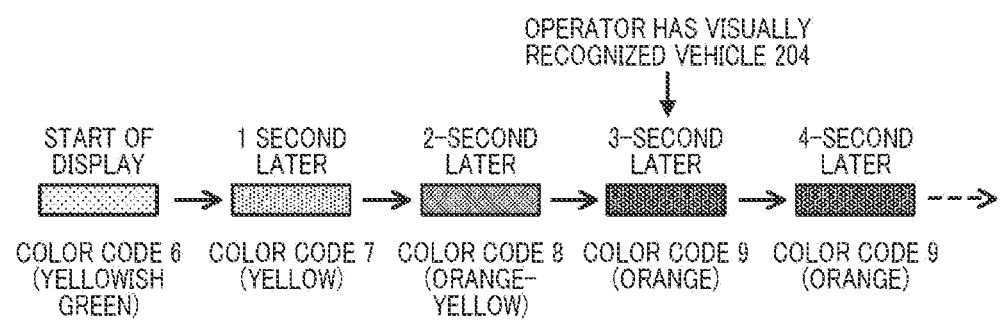
FIG. 23 represents an example of time-dependent change in the visual display as illustrated in FIG. 22.

Each color of the visual displays VI-31, VI-32, VI-33, VI-34 will be changed with time until the operator visually recognizes the vehicle 201, the motorbike 202, the pedestrian 203, and the vehicle 204 corresponding to those visual displays, respectively. FIG. 23 represents an example of change in the mode for displaying the visual display VI-34 of the vehicle 204 with the elapse of time for which the vehicle 204 has been kept visually unrecognized by the operator.

FIG. 23 illustrates the visual display VI-34 to be displayed in the display range HA transitionally from the left to the right. The visual display VI-34 represents the respective states at the start of the display, 1-second later, 2-second later, 3-second later, and 4-second later. Referring to FIG. 23, it is assumed that the operator has visually recognized the vehicle 204 corresponding to the visual display VI-34 after the elapse of 3 seconds from the start of display.

As the danger value of the vehicle 204 is 6 (as described above), the color code of the visual display VI-34 at the start of display is 6 (yellowish green). Then the attention calling unit 404 changes the color of the visual display VI-34 to the one corresponding to the color code with the number one step higher than the current number at every second. The color will be changed to the one corresponding to the color code 7 (yellow) after the elapse of 1 second, the one corresponding to the color code 8 (orange-yellow) after the elapse of 2 seconds, and the one corresponding to the color code 9 (orange) after the elapse of 3 seconds. After the elapse of 3 seconds, the attention calling unit 404 stops incrementing the color code of the visual display VI-34 in response to the operator's visual confirmation of the vehicle 204. As a result, after the elapse of 4 seconds onward, the visual display VI-34 is kept displayed in color corresponding to the color code 9 (orange).

Like the attention calling system 120, the above-configured attention calling system 400 displays the visual display VI at the horizontal position corresponding to the object in the belt-like display range HA on the windshield 105. Like the attention calling system 120, the attention calling system 400 is capable of calling the operator's attention to various traffic participants existing in the environment surrounding the vehicle 100 without distracting the operator's attention.

The attention calling system 400 displays the visual display VI of the object at least in the mode adapted to the risk value of the category of the object. The attention calling system 400 allows the operator to visually recognize the respective objects with priority in accordance with the risk value of contact with the vehicle 100. This makes it possible to call the operator's attention to various objects existing in the environment surrounding the vehicle 100 in the mode more effective for the operator to take the operating action.

In the attention calling system 400, the mode for displaying the visual display VI of the object is determined based on the operator's reaction proficiency value with respect to the category of the object. The attention calling system 400 indicates existence of the object that makes the operator's actual reaction time from the visual recognition to the operating action longer than the standard reaction time by means of the visual display VI with higher visual attractivity. This makes it possible call the operator's attention to various objects existing in the environment surrounding the vehicle 100 with priority in accordance with the operator's reactive operation speed.

If it is determined that the operator has not visually recognized the object, the attention calling unit 404 of the attention calling system 400 raises the visual attractivity level of the visual display VI of the object with time (the display color is changed to make it appear warmer in the embodiment). The attention calling system 400 prevents the elapse of long time for which the object is kept visually unrecognized by the operator. As a result, the attention calling system of a structure 2 avoids the operator's delay in taking action on the appearing object.

The attention calling system 400 is configured to determine that the operator has visually recognized the object when the time for which the operator's visual line has been retained on the object exceeds the given time. Presence/absence of visual recognition of the object can be determined by executing the simplified process.

Figure 24:
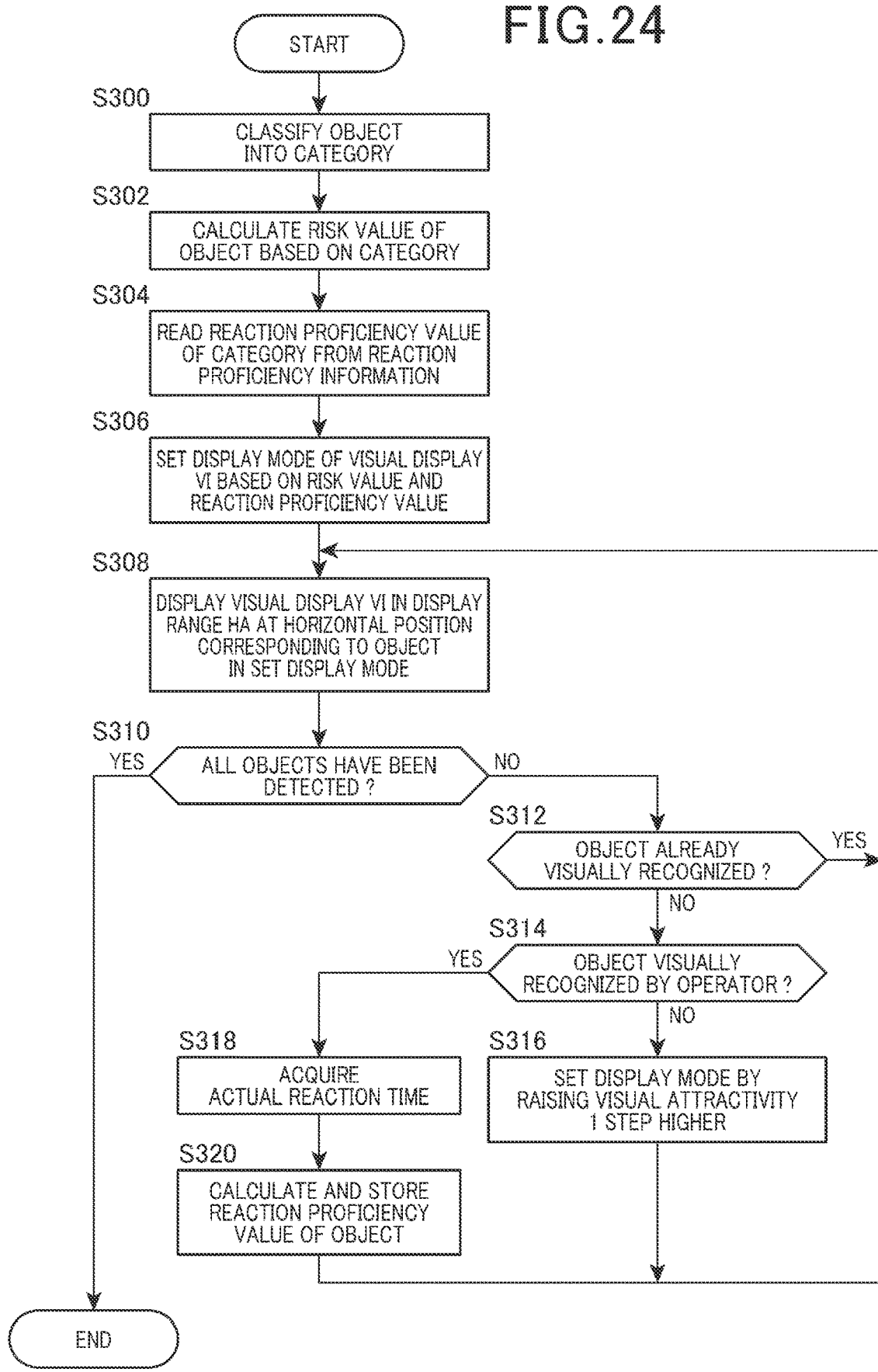
FIG. 24 is a flowchart representing an operation procedure executed by the attention calling system as illustrated in FIG. 21.

FIG. 24 is a flowchart representing an operation procedure executed by the attention calling system 400. When the detection unit 132 as illustrated in FIG. 21 detects at least one object, the process shown in FIG. 24 is started for each of the detected objects.

Upon start of the process, the classification unit 308 classifies the detected object into the category (S300). The risk calculation unit 412 calculates the risk value based on the classified category of the object (S302).

The attention calling unit 404 reads the reaction proficiency value with respect to the category of the object with reference to the reaction proficiency information 414 stored in the storage unit 403 (S304). The attention calling unit 404 sets the display mode for displaying the visual display VI of the object based on the risk value and the reaction proficiency value (S306). The attention calling unit 404 displays the visual display VI at the horizontal position corresponding to the object in the display range HA in the mode set as described above (S308).

The attention calling unit 404 determines whether or not the object is no longer detected by the detection unit 132 (S310). If the object is no longer detected (YES in S310), the attention calling unit 404 terminates the process.

If the object has been continuously detected (NO in S310), the attention calling unit 404 determines whether or not the object has been visually recognized (S312). If the object has been already visually recognized (YES in S312), the attention calling unit 404 returns to step S308 for executing the process repeatedly without changing setting of the display mode of the visual display VI.

If the object has not been visually recognized yet (NO in S312), the attention calling unit 404 determines whether or not the operator has visually recognized the object based on the operator's visual line movement detected by the behavior detection unit 406 (S314). If the operator has not visually recognized the object (NO in S314), the attention calling unit 404 sets the display mode of the visual display VI by raising its visual attractivity one step higher than that of the current display mode (S316). The process then returns to step S308 for executing the process repeatedly. As described above, in this embodiment, the display color for the visual display VI is changed to make it appear warmer (red, for example) to raise the visual attractivity of the display mode of the visual display VI one step higher.

If the operator has visually recognized the object in step S314 (YES in S314), the reaction skill evaluation unit 410 acquires the actual reaction time measured by the behavior detection unit 406 (S318). The reaction skill evaluation unit 410 calculates the reaction proficiency value with respect to the object using the acquired actual reaction time, and associates the calculated reaction proficiency value with the category of the object, which is added to the reaction proficiency information 414 stored in the storage unit 403 (S320). The processor 402 then returns to step S308 for executing the process repeatedly without changing setting of the display mode of the visual display VI.

Sixth Embodiment

Figure 25:
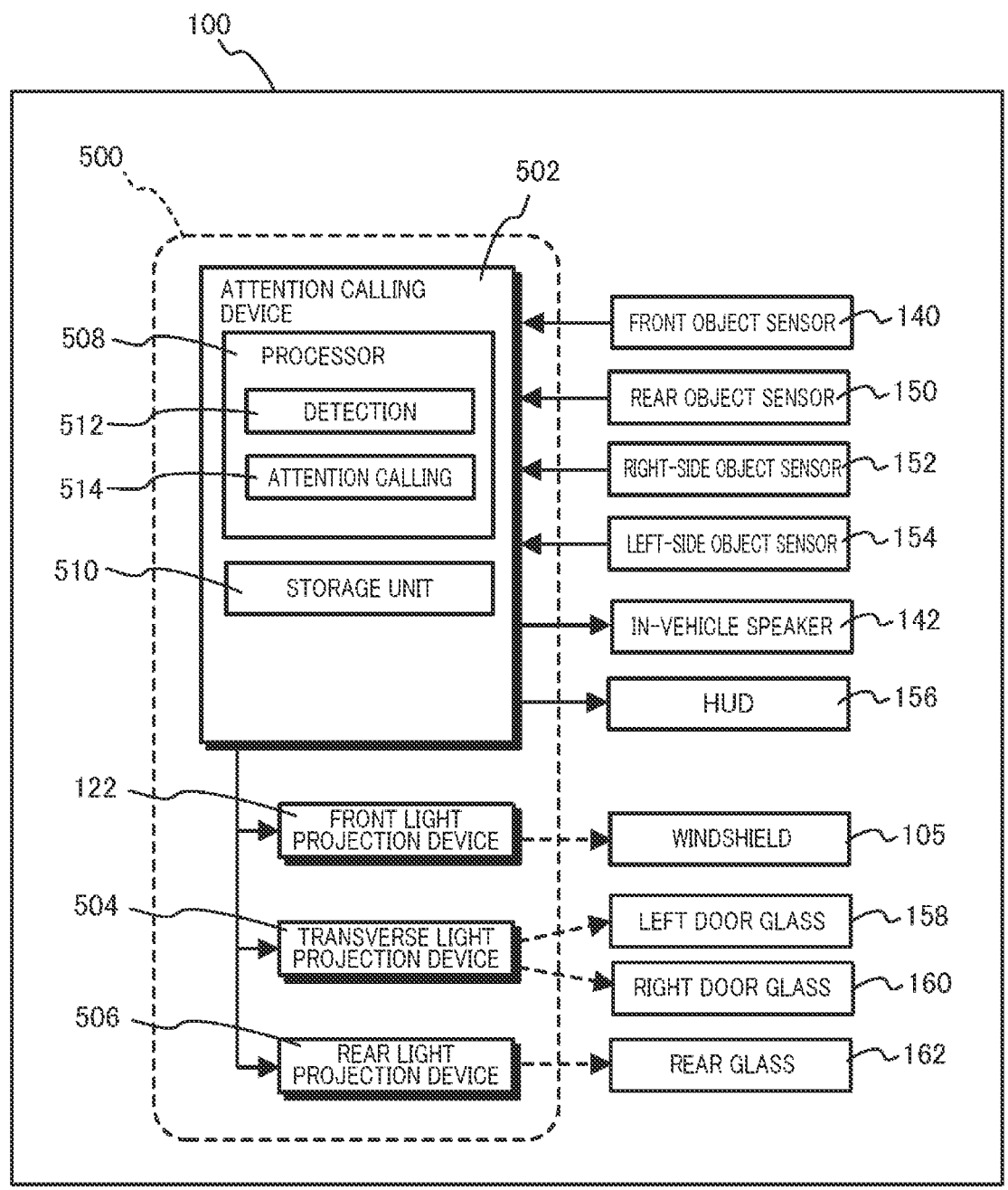
FIG. 25 illustrates a structure of an attention calling system according to a fourth embodiment of the present invention.

A sixth embodiment of the present invention will be described. FIG. 25 illustrates a structure of an attention calling system 500 according to the sixth embodiment of the present invention. The attention calling system 120 of the third embodiment described above is configured to guide the operator's visual line to the object existing to the front of the vehicle 100. Meanwhile, the attention calling system 500 of this embodiment is configured to notify the operator of the object existing in the area around the vehicle 100 as the center omnidirectionally at 360°.

The components shown in FIG. 25, which are the same as those shown in FIG. 14 will be designated with the same codes in FIG. 14, and explanations referring to FIG. 14 will apply correspondingly.

The attention calling system 500 includes the front light projection device 122 as the display device for outputting the visual display onto the interior structure of the vehicle 100, which can be visually recognized by the operator of the vehicle 100, a transverse light projection device 504, a rear light projection device 506, and an attention calling device 502 for controlling those light projection devices to call the operator's attention to the object existing around the vehicle 100 by means of the visual display.

Figure 26:
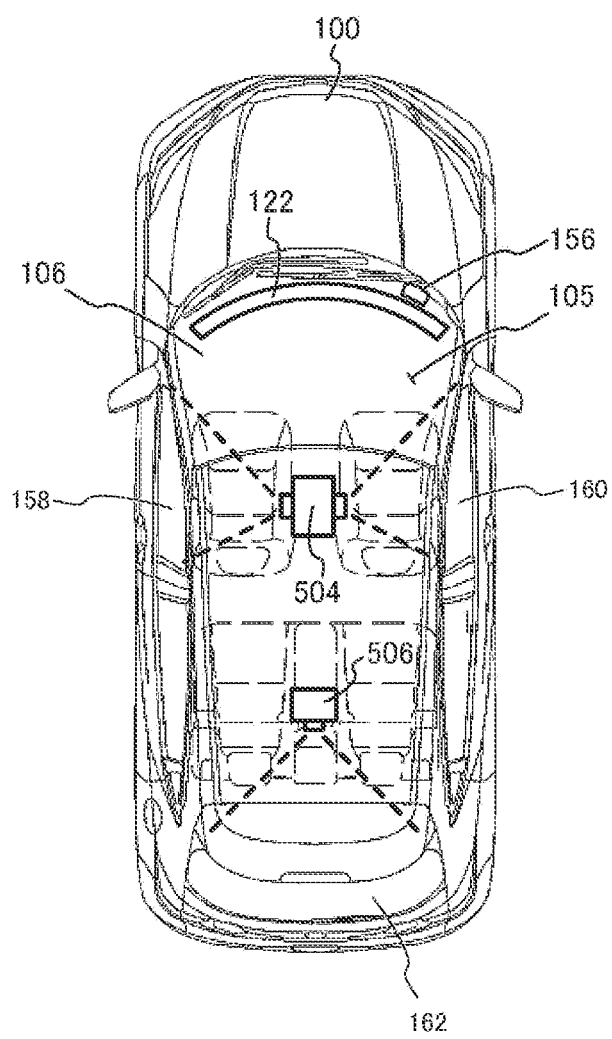
FIG. 26 illustrates an arrangement example of light projection devices inside a vehicle installed with the attention calling system as illustrated in FIG. 25.

FIG. 26 illustrates an example of arrangement of the light projection devices inside the vehicle 100. Referring to FIG. 26, the components shown in FIG. 26, which are the same as those shown in FIG. 13 will be designated with the same codes in FIG. 13, and explanations referring to FIG. 13 will apply correspondingly.

An instrument panel 106 at the front in the vehicle interior is provided with the front light projection device 122. The front light projection device 122 as described referring to FIG. 13 displays the visual display VI in the display range HA on the windshield 105 as the interior structure. The instrument panel 106 also includes a HUD (head-up display) 156 for display on the windshield 105 in accordance with the generally employed technique.

The transverse light projection device 504 and the rear light projection device 506 are disposed at the inner front side (front in the vehicle interior) and the inner rear side of the roof of the vehicle 100, respectively. Each of the transverse light projection device 504 and the rear light projection device 506 may be formed as a projector. The transverse light projection device 504 and the rear light projection device 506 project the visual displays onto the interior structures at the right and left sides, and the rear side of the vehicle 100 in the predetermined display ranges, respectively. In the embodiment, the transverse light projection device 504 projects light to a left door glass 158 and a right door glass 160 each as the interior structure. The rear light projection device 506 projects light to a rear glass 162 as the interior structure. If the vehicle 100 includes front ventilation windows at the left and right sides, they can be regarded as the interior structures to which the visual display is output by the transverse light projection device 504.

For example, like the front light projection device 122 as illustrated in FIG. 13 for visual display in the display range HA on the windshield 105, the transverse light projection device 504 and the rear light projection device 506 display the visual displays on the interior structures in the predetermined display range, that is, the horizontally extending belt-like range orthogonal to the vehicle height direction of the vehicle 100.

Like the visual display VI to be displayed on the windshield 105 by the front light projection device 122, the transverse light projection device 504 and the rear light projection device 506 project the predetermined-sized light onto the interior structures as the visual display. Correspondingly, the visual display projected onto the interior structures by the transverse light projection device 504 and the rear light projection device 506 will be referred to as the visual display VI.

Referring to FIG. 25, the attention calling device 502 includes a processor 508 and a storage unit 510. The storage unit 510 is constituted by the volatile or nonvolatile semiconductor memory, and/or a hard disk device, for example. The processor 508 is a computer having such processor as CPU. The processor 508 may be provided with ROM to which programs have been written, RAM for temporal storage of data, and the like. The processor 508 includes a detection unit 512 and an attention calling unit 514 each as a functional element or a functional unit.

Those functional elements of the processor 508 are implemented through execution of the program by the processor 508 as the computer. The computer programs can be stored in an arbitrary computer-readable storage medium. Alternatively, it is possible to form all or part of the functional elements of the processor 508 into hardware devices each including one or more electronic circuit components.

The detection unit 512 detects the object in the area surrounding the vehicle 100. Specifically, the detection unit 512 allows the front object sensor 140, a rear object sensor 150, a right-side object sensor 152, and a left-side object sensor 154, which are installed in the vehicle 100 to detect objects in the front area, the rear area, the right-side area, and the left-side area around the vehicle 100, respectively. The rear object sensor 150, the right-side object sensor 152, and the left-side object sensor 154 may be in the form of a camera, a laser, and/or a lidar like the front object sensor 140.

The detection unit 512 acquires video images of the front area, rear area, right-side area, and left-side area around the vehicle 100 from the front object sensor 140, the rear object sensor 150, the right-side object sensor 152, and the left-side object sensor 154, respectively. The detection unit 512 detects the predetermined real objects from the acquired video images. If one of those real objects has the probability of contact with the vehicle 100 equal to or larger than a given value, which has been calculated from the relative speed to the vehicle 100, the real object is detected as the object. Like the first embodiment, the predetermined real object corresponds to the traffic participants including the vehicle and the pedestrian, and obstacles. The detection unit 512 transmits each piece of position information of the detected objects to the attention calling unit 514.

It is possible to dispose the front object sensor 140, the rear object sensor 150, the right-side object sensor 152, and the left-side object sensor 154 on a front bumper, a rear bumper, a right fender mirror body, and a left fender mirror body of the vehicle 100, respectively.

The attention calling unit 514 notifies the operator of the direction of the object existing in the area surrounding the vehicle 100, which has been detected by the detection unit 512 by means of the visual display. Specifically, the attention calling unit 514 controls the front light projection device 122, the transverse light projection device 504, and the rear light projection device 506 to output the visual display VI at the horizontal position corresponding to the direction of the object seen from the operator's position in the predetermined display range on the interior structure of the vehicle 100.

Specifically, the circumferential area of the vehicle 100 is divided into multiple angular areas. The visual display VI is output from the front light projection device 122, the transverse light projection device 504, or the rear light projection device 506 depending on the area in the presence of the object detected by the detection unit 512.

Figure 27:
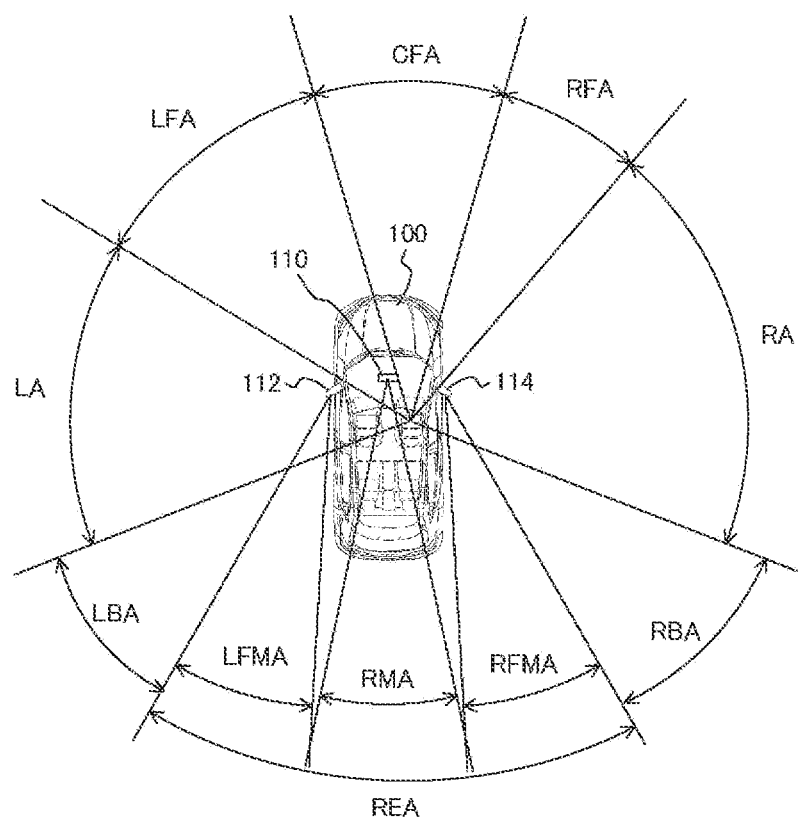
FIG. 27 illustrates an example of angular areas around the vehicle as the center, which are defined by the attention calling system as illustrated in FIG. 25.

FIG. 27 illustrates an example of angular areas surrounding the vehicle 100 as a center. The components shown in FIG. 27, which are the same as those shown in FIG. 13 will be designated with the same codes in FIG. 13, and explanations referring to FIG. 13 will apply correspondingly.

Referring to the example of FIG. 27, a center front area CFA is defined as the area which can be visually recognized by the operator seated on the operator's seat of the vehicle 100 while having the operator's face kept directed forward. A left front area LFA and a right front area RFA are defined as areas which can be visually recognized by the operator while having the operator's face directed leftward and rightward at approximately 45°. In the example of FIG. 27, a left-side area LA and a right-side area RA of the vehicle 100 are also defined as areas which can be visually recognized while having the operator's waist lightly twisted leftward or rightward.

Referring to the example of FIG. 27, a rear area REA is defined as the area which can be visually recognized by the operator by means of the rearview mirror 110, the left fender mirror 112, and the right fender mirror 114. The rear area REA is subdivided into a rearview mirror area RMA which can be visually recognized by the operator by means of the rearview mirror 110, a left fender mirror area LEMA which can be visually recognized by the operator by means of the left fender mirror 112, and a right fender mirror area RFMA which can be visually recognized by the operator by means of the right fender mirror 114.

The rest of the area as illustrated in FIG. 27 includes a left blind spot area LBA and a right blind spot area RBA as areas where the operator cannot visually recognize the object.

Like the attention calling unit 133 of the first embodiment, the attention calling unit 514 allows the front light projection device 122 to display the visual displays VI indicating each direction of the objects in the center front area CFA, the left front area LFA, and the right front area RFA, which have been detected by the detection unit 512 in the display range HA on the windshield 105.

Additionally, the attention calling unit 514 allows the transverse light projection device 504 to display the visual displays VI indicating directions of the objects in the left-side area LA and the right-side area RA, which have been detected by the detection unit 512 on the left door glass 158 and the right door glass 160, respectively.

The attention calling unit 514 allows the rear light projection device 506 to display the visual display VI indicating the direction of the object in the rear area REA, which has been detected by the detection unit 512 on the rear glass 162.

Besides the left blind spot area LBA and the right blind spot area RBA as areas where the operator cannot visually recognize the object, the attention calling unit 514 notifies the operator of direction of the object which may possibly come into contact with the vehicle 100 among those existing in substantially entire circumferential area of the vehicle 100. This makes it possible to call the operator's attention, and guide the operator's visual line.

The attention calling unit 514 displays a ring-shaped display indicating the direction from the vehicle 100 on the display unit. The attention calling unit 514 outputs the visual display to an arc part of the ring-shaped display corresponding to the object direction. In this embodiment, the display unit is in the form of the HUD 156.

Specifically, the attention calling unit 514 displays the radar-like display screen indicating direction of the object detected by the detection unit 512 in the entire circumferential area of the vehicle 100 including the left blind spot area LBA and the right blind spot area RBA on the HUD 156. The radar-like display screen displayed on the HUD 156 for indicating the object direction by the attention calling unit 514 will be referred to as an object radar display.

Figure 28:
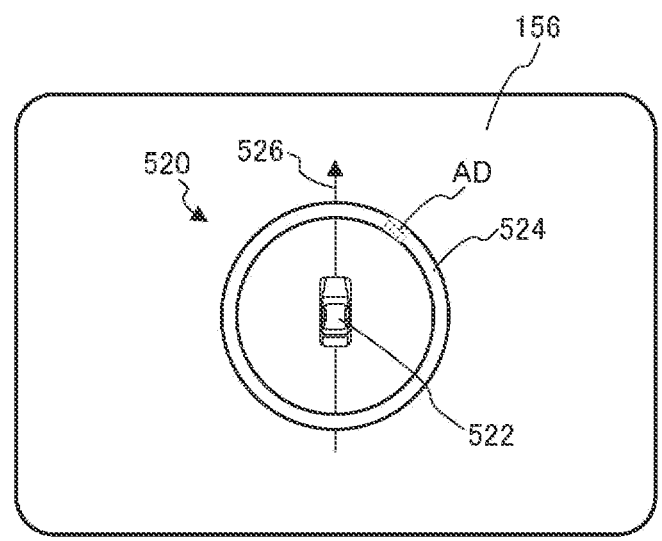
FIG. 28 illustrates an example of an object radar display on a HUD of the attention calling system as illustrated in FIG. 25.

FIG. 28 illustrates an example of the object radar display to be displayed on the HUD 156 by the attention calling unit 514. The object radar display 520 includes a vehicle icon 522 indicating the vehicle 100, and a ring-shaped display 524 omnidirectionally indicating an entire circumferential area of the vehicle 100 as the center at 360°. The attention calling unit 51 outputs the visual display corresponding to the object direction to the arc part of the ring-shaped display 524. Specifically, the attention calling unit 514 displays a visual display AD in the arc part of the ring-shaped display 524, which corresponds to the direction of the object detected by the detection unit 512. An upward arrow 526 displayed on the ring-shaped display 524 in FIG. 28 indicates a straight-running direction of the vehicle 100. The arrow 526 is provided only for explanation purpose in the embodiment, but can be provided to partially constitute the object radar display 520.

In the example of FIG. 28, the visual display AD is shown as the arc part of the ring-shaped display 524 at an angle of approximately 30° to the right from the straight-running direction (direction indicated by the arrow 526) of the vehicle icon 522. The visual display AD indicates the object at the right front side of the vehicle 100 at approximately 30°, which has a possibility to come into contact with the vehicle 100.

Figure 29:
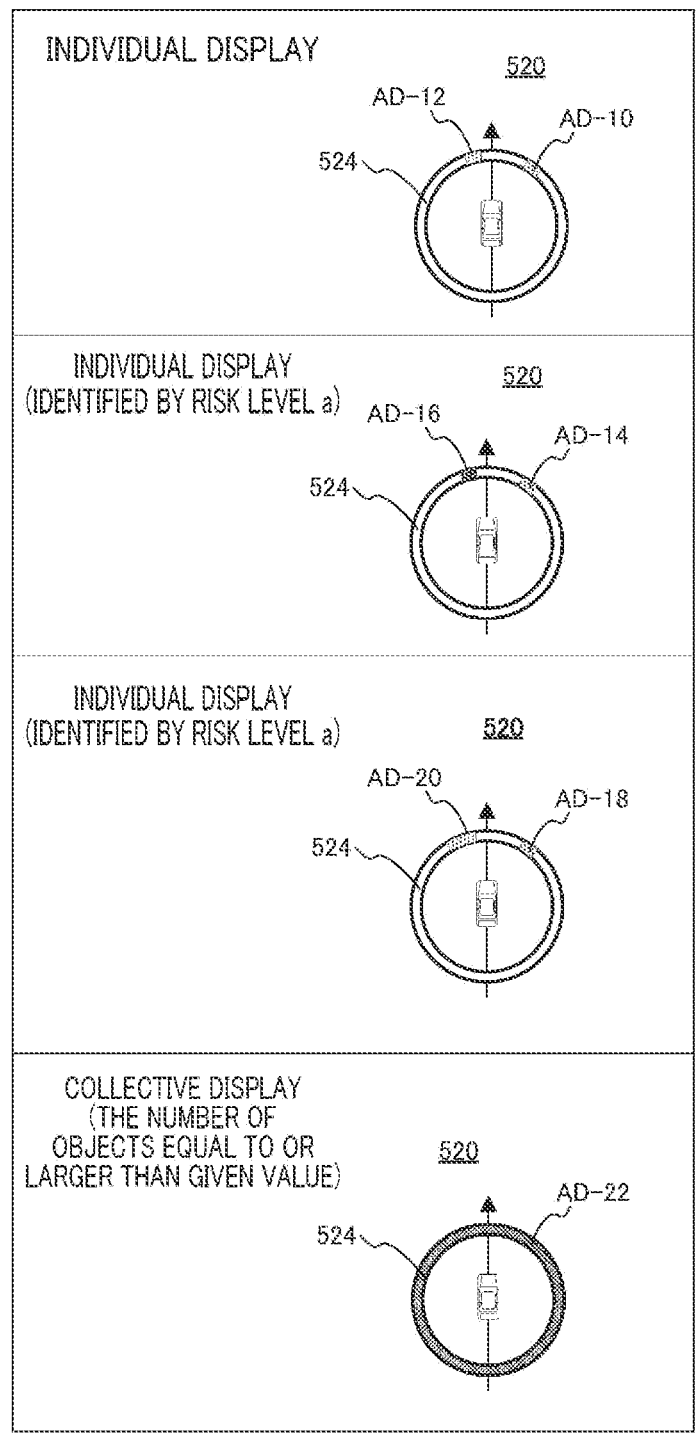
FIG. 29 illustrates examples of various display modes of the object radar display.

FIG. 29 is a table showing various display modes of the object radar display 520 to be displayed by the attention calling unit 514. The first stage (uppermost stage) of the table in FIG. 29 illustrates an exemplary case that each of the detected objects is displayed individually in the same visual display mode. In the illustrated example, the visual displays AD-10 and AD-12 displayed on the ring-shaped display 524 indicate existence of objects in areas at the right angular position of 30°, and at the left angular position of 15° to the vehicle 100, respectively.

An example of the second stage of the table of FIG. 29 indicates visual displays of multiple objects individually displayed like the example illustrated in the first stage. Each of the visual displays is displayed in the mode adapted to the risk degree of the corresponding object. For example, each of the objects is displayed in the color in accordance with the contact probability with the vehicle 100. In the illustrated example, for example, the visual display AD-14 is displayed in green, and the visual display AD-16 is displayed in yellow. The contact probability with the vehicle 100 can be calculated from the relative speed of the object detected by the detection unit 512 to the vehicle 100. The attention calling unit 514 is allowed to determine the color for visually displaying the detected object based on the predetermined correlation information indicating the correlation between the calculated relative speed range and the display color used for the visual display.

An example of the third stage of the table of FIG. 29 indicates visual displays of multiple objects individually displayed each in the mode adapted to the risk degree like the example illustrated in the second stage. Unlike the example illustrated in the second stage, in the third stage, the risk degree is expressed by size of the visual display rather than color of the visual display. In the illustrated example, for example, each of the visual displays AD-18 and AD-20 is expressed as a band-like arc at central angle of approximately 10° and 20°, respectively. The object expressed as the larger visual display AD-20 indicates the one having its contact probability higher than that of the object expressed as the smaller visual display AD-18. For example, the contact probability with the vehicle 100 can be calculated from the relative speed of the object detected by the detection unit 512 to the vehicle 100. The attention calling unit 514 is allowed to determine the size of the visual display of the detected object based on the predetermined correlation information indicating the correlation between the range of the calculated contact probability and the central angle of the band-like arc used for the visual display.

An example of the fourth stage (lowermost) of the table of FIG. 29 indicates that upon detection of the objects equal to or more than the given value in the area surrounding the vehicle 100, the visual display of those objects will be displayed over the entire circumference of the ring-shaped display 524. In the illustrated example, for example, the visual display AD-22 extends over the entire circumference of the ring-shaped display 524 to notify that the objects more than the given value, that is, 3 or more objects have been detected in the area surrounding the vehicle 100. The given value may be set to an arbitrary value without being limited to 3. The visual display AD-22 may be displayed in the color corresponding to the highest contact probability of the object among the contact probabilities of the detected objects.

Like the attention calling system 120, the above-configured attention calling system 500 displays the visual display VI at the horizontal position corresponding to the object in the belt-like display range HA on the windshield 105. Like the attention calling system 120, the attention calling system 500 is capable of calling the operator's attention to various traffic participants existing in the environment surrounding the vehicle 100 without distracting the operator's attention.

The attention calling system 500 displays the visual display VI indicating directions of the objects existing in the lateral and rear sides of the vehicle 100, which are seen from the operator in the horizontally extending display range on the interior structure. The attention calling system 500 is capable of calling the operator's attention by informing directions of objects in the entire area surrounding the vehicle 100, which can be visually recognized by the operator.

The attention calling unit 514 of the attention calling system 500 generates sounds to be output through the in-vehicle speaker 142 to notify the operator of the object orientation in addition to the visual display. The attention calling system 500 is capable of calling the operator's attention to the object by appealing to both acoustic sense and visual sense.

The front light projection device 122, the transverse light projection device 504, and the rear light projection device 506 output the visual display VI by projecting the predetermined-shaped light onto the interior structure such as the windshield 105. The attention calling system 500 implements the visual display in the mode which allows the operator to make an instinctive confirmation.

In the attention calling system 500, the windshield 105, the left door glass 158, the right door glass 160, and/or the rear glass 162 of the vehicle 100 serve as the interior structures on which the visual displays VI are displayed by the front light projection device 122, the transverse light projection device 504, and the rear light projection device 506. The front ventilation window of the vehicle 100, if any, is also allowed to serve as the interior structure. That is, the attention calling system 500 is configured to output the visual display onto the interior structure through which the outside of the vehicle 100 can be visually recognized. It is possible to call the operator's attention to the object, and implement the immediate visual recognition of the object.

In the attention calling system 500, the front light projection device 122 is configured to output the visual display VI by projecting the predetermined-shaped light onto the windshield 105. The attention calling system 500 displays the visual display indicating the object direction at least on the windshield 105, which is overlaid with the scene of the vehicle front requiring the operator's highest attention. This makes it possible to call the operator's attention effectively to the object requiring the special attention upon operation of the vehicle 100.

The front light projection device 122 for outputting the visual display VI onto the windshield 105 includes multiple light sources arranged below the windshield 105 along the horizontal direction (vehicle width direction). This allows the front light projection device for outputting the visual display VI onto the windshield 105 to be simply configured.

In the attention calling system 500, the object radar display 520 as the ring-shaped display on the HUD 156 notifies the operator of existence of the object in the entire circumferential area of the vehicle 100, which includes the blind spot areas. The attention calling system 500 allows the operator to easily confirm the objects existing in the entire circumferential area of the vehicle 100 at a time by means of the ring-shaped display as well as the condition of the entire area surrounding the vehicle 100.

The object radar display 520 displays the visual display AD indicating the object direction in the mode adapted to the probability of the object to come into contact with the vehicle 100. This allows the operator to visually recognize the respective objects with priority in accordance with the degree of the contact risk. It is possible to call the operator's attention to various objects existing in the environment surrounding the moving body in the mode further effective for the operator to take the operating action.

If the number of objects exceeds the given value, the object radar display 520 displays the visual display AD that extends over the entire circumference of the ring-shaped display 524 so that the operator's attention is not distracted by the individual objects. The attention calling system 500 allows the operator to confirm existence of the object around the vehicle 100 without distracting the operator's attention.

In the attention calling system 500, the object denotes the real object having the contact probability with the vehicle 100 equal to or higher than the given value. The attention calling system 500 narrows down the real objects that may cause the risk to the operation of the vehicle 100, and outputs the visual display indicating the direction. It is possible to call the operator's attention to the object without distracting the attention.

FIG. 30 is a flowchart representing an operation procedure executed by the attention calling system 500. When the detection unit 512 as illustrated in FIG. 25 detects at least one object, the process shown in FIG. 30 is started for each of the detected objects.

Upon start of the process, the attention calling unit 514 displays the visual display VI at the horizontal position on the interior structure, which corresponds to the direction of the detected object (S400). The attention calling unit 514 displays the visual display AD indicating the direction of the detected object on the object radar display 520 of the HUD 156 (S402). As FIG. 29 illustrates, the attention calling unit 514 is allowed to display the visual display AD in the mode adapted to the probability of the object detected by the detection unit 512 to come into contact with the vehicle 100. If the number of the objects detected by the detection unit 512 is larger than the given value, the attention calling unit 514 may be configured to display the visual display AD that extends over the entire circumference of the ring-shaped display 524.

The attention calling unit 514 determines whether or not the area where the object has been detected is the center front area CFA (S404). If the area where the object has been detected is not the center front area CFA (NO in S404), sounds are output to the operator through the in-vehicle speaker 142 for object orientation (S406).

The attention calling unit 514 then determines whether or not the object is no longer detected by the detection unit 512 (S408). If the object is no longer detected (YES in S408), the attention calling unit 514 terminates the process.

Meanwhile, in step S404, if the area where the object has been detected is the center front area CFA (YES in S404), the attention calling unit 514 proceeds the process to step S408 without outputting the sound. If the object has been detected continuously in step S408 (NO in S408), the attention calling unit 514 returns to step S400 for executing the process repeatedly.

Other Embodiments

In the first embodiment as described above, the four-wheeled automobile vehicle 1 has been described as an example of the moving body in the disclosure. The moving body may be of various types for riding purpose, for example, two-wheeled vehicles, flight vehicles, ships, and the like.

For example, in the first embodiment as described above, the display device 11 provided with the LED array 7 is configured to display the visual guidance virtual image GVI. The display device 11, however, is not limited to the configuration provided with the LED array 7, but may be constituted by a projector, for example. If the display device 11 is constituted by the projector, the projector is disposed on a top surface in the vehicle interior to display the visual guidance virtual image GVI on the windshield 5 based on the display data from the visual guidance device 10. In the configuration as above, the display range HA of the visual guidance virtual image GVI extends over the entire region of the windshield 5 below the displayable upper limit line L1.

In the first embodiment as described above, the visual line of the driver U is guided to the object by the display of the visual guidance virtual image GVI. The visual guidance device 10 may be configured to output the sound through the speaker of the vehicle 1 in addition to the display of the visual guidance virtual image GVI for guiding the visual line of the driver U. In this case, the visual guidance device 10 may be configured to turn the sound output through the speaker ON/OFF in accordance with the display position of the visual guidance virtual image GVI in the vehicle width direction, and adjust the volume in accordance with the distance between the object and the vehicle 1.

In the first embodiment as described above, the driver position recognition unit 33 is configured to recognize the position of the head HD of the driver U as the position of the driver U, for example. The part to be recognized by the driver position recognition unit 33 as the position of the driver U may be the forehead, eyes, nose, mouth, or the like of the driver U without being limited to the head HD of the driver U.

The first embodiment has been described about an example of the configuration which varies the length of the visual guidance virtual image GVI in accordance with a level of possibility that the object 8 influences the vehicle 1.

Besides the length of the visual guidance virtual image GVI, there may be various properties to be varied in accordance with the level of possibility that the object 8 influences the vehicle 1. For example, as the possibility that the object 8 influences the vehicle 1 becomes higher, the color of the visual guidance virtual image GVI may be varied to the one with higher visual attractivity, for example, the color varied from white, yellow, and red. As the level of possibility that the object 8 influences the vehicle 1 becomes higher, the blinking frequency of the visual guidance virtual image GVI may be made higher.

The control program to be executed by the processors 30, 37 may be recorded in the portable information recording medium for implementation. An example of the information recording medium includes a magnetic recording medium such as a hard disk, an optical recording medium such as a CD, and a semiconductor storage device such as a USB (Universal Serial Bus) memory, an SSD (Solid State Drive), and the like. Any other recording media may also be employed as well.

The processors 30, 37 may be constituted by a single unit of processor, or multiple processors, for example.

The respective units illustrated in FIG. 2 are described as examples without being limited to the specific embodiments. That is, each hardware individually associated with each unit is not necessarily installed. It is possible to implement the respective functions through the program executed by the single unit of processor. The first embodiment may be configured to cause the hardware to execute a part of functions implemented by the software, or to cause the software to execute a part of functions implemented by the hardware. Each configuration of other specific units of the vehicle 1 and the visual guidance device 10 may be arbitrarily modified so long as they do not deviate from the scope of the disclosure.

Each step of operations as represented by FIG. 3 is a part divided in accordance with the main processing contents for easy understanding of operations of the respective units of the visual guidance device 10. The disclosure is not restricted by the method for division or title of the process step.

In the second embodiment as described above, the four-wheeled automobile vehicle 1 has been described as an example of the moving body in the disclosure. The moving body may be of various types for riding purpose, for example, two-wheeled vehicles, flight vehicles, ships, and the like.

For example, the second embodiment as described above is configured to cause the display device 51 provided with the LED array 47 to display the visual guidance virtual image GVI. The display device 51, however, is not limited to the configuration provided with the LED array 47, but may be constituted by the projector, for example. If the display device 51 is constituted by the projector, the projector is disposed on a top surface in the vehicle interior to display the visual guidance virtual image GVI on the windshield 45 based on the display data from the visual guidance device 50. In the configuration as above, the display range HA of the visual guidance virtual image GVI covers the entire region below the displayable upper limit line L1 on the windshield 45.

For example, the second embodiment as described above is configured to guide the visual line of the driver U to the object 48 by displaying the visual guidance virtual image GVI. The visual guidance device 50 may be configured to output sound through the speaker of the vehicle 41 in addition to the display of the visual guidance virtual image GVI when guiding the visual line of the driver U. In this case, the visual guidance device 50 may be configured to turn the sound through the speaker ON/OFF in accordance with the display position of the visual guidance virtual image GVI in the vehicle width direction, and adjust the volume in accordance with the distance between the object and the vehicle 41.

In the second embodiment as described above, the driver position recognition unit 73 is configured to recognize the position of the head HD of the driver U as the position of the driver U. A part to be recognized by the driver position recognition unit 73 as the position of the driver U may be the forehead, eyes, nose, mouth, or the like of the driver U without being limited to the head HD of the driver U.

The control program to be executed by the processors 70, 76 may be recorded in the portable information recording medium for implementation. An example of the information recording medium includes a magnetic recording medium such as a hard disk, an optical recording medium such as a CD, and a semiconductor storage device such as a USB (Universal Serial Bus) memory, and an SSD (Solid State Drive). Any other recording media may also be employed as well.

For example, the processors 70, 76 may be constituted by a single unit of processor, or multiple processors.

The respective units as illustrated in FIG. 9 are described as examples without being limited to the specific embodiment. That is, each hardware individually associated with each unit is not necessarily installed. It is possible to implement the respective functions through the program executed by the single unit of processor. The second embodiment described above may be configured to cause the hardware to execute a part of functions implemented by the software, or to cause the software to execute a part of functions implemented by the hardware. Each configuration of other specific units of the vehicle 1 and the visual guidance device 50 may be arbitrarily modified so long as they do not deviate from the scope of the disclosure.

Each step of operations as represented by FIG. 10 is a part divided in accordance with the main processing contents for easy understanding of operations of the respective units of the visual guidance device 10. The disclosure is not restricted by the method for division or title of the process step.

In the third to the sixth embodiments described above, the predetermined real object as the prospective object may be traffic infrastructure elements including a railroad crossing, a traffic light, a traffic electric bulletin board, and a traffic sign without being limited to the movable real objects such as the vehicle and the pedestrian.

The moving body installed with the attention calling system 120, 300, 400, or 500 may be an arbitrary moving body to be operated by the operator, for example, an airplane and a ship.

The technical characteristic of any one of the attention calling systems 120, 300, 400, and 500 may be imparted to the other attention calling system. For example, it is possible to apply the characteristics to be implemented by the attention calling systems 300, 400 for displaying the visual display VI on the windshield 105 in the mode adapted to the cognition proficiency value, the risk value, and/or the reaction proficiency value to the attention calling system 500 for displaying the visual displays VI on the left door glass 158, the right door glass 160, and the rear glass 162.

The attention calling device 502 of the attention calling system 500 is provided with the behavior detection unit 306, the classification unit 308, and the cognition skill evaluation unit 310 as shown in FIG. 12, and/or the behavior detection unit 406, the risk calculation unit 412, and the reaction skill evaluation unit 410 as shown in FIG. 16 so that the visual display VI can be output in the mode adapted to the cognition proficiency value, the risk value, and/or the reaction proficiency value.

In the attention calling system 500, if the object is detected in the rearview mirror area RMA, the left fender mirror area LFMA, and the right fender mirror area REMA as illustrated in FIG. 22, the attention calling unit 514 is allowed to output the visual display in the predetermined display range defined on mirror surfaces of the rearview mirror 110, the left fender mirror 112, and the right fender mirror 114.

In each of the third to the sixth embodiments as described above, the visual display VI may have any shape without being limited to the rectangle. The visual display may be formed into a circle, an arbitrary polygon such as a triangle, or a line segment.

The attention calling system 500 does not need to include three light projection devices, that is, the front light projection device 122, the transverse light projection device 504, and the rear light projection device 506. It is sufficient to provide at least one light projection device. The single light projection device may be configured to output the visual display VI to all predetermined interior structures, for example, the windshield 105, the left door glass 158, the right door glass 160, the rear glass 162, and the like.

Like the front light projection device 122, the transverse light projection device 504 and/or the rear light projection device 506 may be a light source array disposed below the left door glass 158, the right door glass 160, and the rear glass 162 for displaying the visual display.

The windshield 105, the left door glass 158, the right door glass 160, and the rear glass 162 do not need to be made of the glass material. They can be made of arbitrary material which exhibits transparency (luminous transmittance) through which the operator can visually recognize the object around the vehicle 100.

Structure Supported by Embodiments

The first embodiment described above supports the following structures.

The visual guidance device 10 guides the visual line of the driver U in the vehicle 1 to the object 8 existing ahead of the vehicle 1. The visual guidance device 10 includes the object recognition unit 31 which recognizes the object 8, and the display control unit 35 which causes the display device 11 to display the visual guidance virtual image GVI for guiding the visual line of the driver U at the position corresponding to the object 8 recognized by the object recognition unit 31 on the windshield 5 of the vehicle 1. The display control unit 35 sets the length of the visual guidance virtual image GVI to be displayed by the display device 11 in the width direction of the vehicle 1 to the length in accordance with the status of the object 8 existing ahead of the vehicle 1.

When the object 8 is recognized, and the display device 11 is caused to display the visual guidance virtual image GVI at the position corresponding to the object 8 recognized on the windshield 5 of the vehicle 1, the attention calling method implemented by the visual guidance device 10 for guiding the visual line sets the length of the visual guidance virtual image GVI to be displayed by the display device 11 in the width direction of the vehicle 1 to the length in accordance with the status of the object 8 existing ahead of the vehicle 1.

When the visual guidance device 10 is caused to recognize the object 8, and the display device 11 is caused to display the visual guidance virtual image GVI at the position corresponding to the recognized object 8 on the windshield 5 of the vehicle 1, the control program executed by the visual guidance device 10 sets the length of the visual guidance virtual image GVI to be displayed by the display device 11 in the width direction of the vehicle 1 to the length in accordance with the status of the object 8 existing ahead of the vehicle 1.

The visual guidance device 10, the attention calling method, and the control program set the length of the visual guidance virtual image GVI to be displayed at the position corresponding to the object 8 in the vehicle width direction to the length in accordance with the status of the object 8 existing ahead of the vehicle 1. This makes it possible to vary the visual attractivity of the visual guidance virtual image GVI in accordance with the status of the object 8 existing ahead of the vehicle 1. Accordingly, the visual guidance device 10 and the attention calling method ensure to reduce the chance that the driver U overlooks the object 8 which should be seen.

In the existence of the object 8 moving ahead of the vehicle 1, the display control unit 35 sets the length of the visual guidance virtual image GVI to be displayed by the display device 11 in the vehicle width direction to the length corresponding to the distance from the current position of the object 8 to the position taken after movement of the object 8 by the predetermined period of time.

In the existence of the object 8 moving ahead of the vehicle 1, it is possible to set the length of the visual guidance virtual image GVI to be displayed at the position corresponding to the object 8 in the vehicle width direction to the length corresponding to movement of the object 8. This makes it possible to enhance the visual attractivity of the visual guidance virtual image GVI to be displayed corresponding to the object 8 on the move, and to reduce the chance that the driver U overlooks the object 8. The length of the visual guidance virtual image GVI in the vehicle width direction is set to the length corresponding to the moving distance of the object 8. This allows the driver U to easily confirm how far the object 8 is expected to move only by seeing the visual guidance virtual image GVI.

The display control unit 35 causes the display device 11 to display the visual guidance virtual image GVI extending in a moving direction of the object 8 from the position corresponding to the current position of the object 8.

The driver U is allowed to easily confirm how far the object 8 is expected to move from the current position in the moving direction only by seeing the visual guidance virtual image GVI.

In the existence of multiple objects 8 ahead of the vehicle 1, the display control unit 35 sets the length of the visual guidance virtual image GVI to be displayed by the display device 11 in the vehicle width direction to the length corresponding to the distance between two objects which are separated farthest in the vehicle width direction.

In the existence of multiple objects 8 ahead of the vehicle 1, it is possible to set the length of the visual guidance virtual image GVI in the vehicle width direction to the length indicating the existence of multiple objects 8. This makes it possible to enhance visual attractivity of the visual guidance virtual image GVI to be displayed corresponding to the multiple objects 8, and to reduce the chance that the driver U overlooks the multiple objects 8 existing ahead of the vehicle 1. The length of the visual guidance virtual image GVI in the vehicle width direction is set to the length corresponding to the distance between the two objects 8 which are separated farthest in the vehicle width direction.

This makes it possible to urge the driver U to move the visual line in the vehicle width direction. Even in the existence of the object 8 at the position which is likely to be overlooked, it is possible to reduce the chance that the driver U overlooks the object 8. As the objects 8 exists at the end of the visual guidance virtual image GVI in the vehicle width direction along the visual line direction, the driver U can be aware of the existence of the object 8 immediately.

When the number of the objects 8 existing ahead of the vehicle 1 is n or more (n is an integer equal to or more than three), the display control unit 35 causes the display device 11 to display the visual guidance virtual image GVI in a display mode different from a display mode of the visual guidance virtual image GVI to be displayed when the n or more objects 8 do not exist ahead of the vehicle 1.

When the number of the objects 8 is equal to or more than n, the display mode of the visual guidance virtual image GVI is made different. This makes it possible to vary the visual attractivity of the visual guidance virtual image GVI in accordance with the number of the objects 8 existing ahead of the vehicle 1. Accordingly, it is possible to further reduce the chance that the driver U overlooks the multiple objects 8 existing ahead of the vehicle 1.

When the number of the objects 8 existing ahead of the vehicle 1 is m or more (m is an integer equal to or more than three), the display control unit 35 sets the length of the visual guidance virtual image GVI to be displayed by the display device 11 in the vehicle width direction to the length extending across the entire width of the display range HA of the display device 11.

When the number of the objects 8 is m or more, the length of the visual guidance virtual image GVI in the vehicle width direction is set to the length extending across the entire width of the display range HA of the display device 11. This makes it possible to enhance the visual attractivity of the visual guidance virtual image GVI in the existence of many objects 8, and to reduce the chance that the driver U overlooks those objects 8 existing ahead of the vehicle 1.

When the visual guidance virtual image GVI is displayed by the display device 11, the display control unit 35 makes the length of the visual guidance virtual image GVI in the vehicle width direction longer as the possibility of the object 8 influencing the vehicle 1 becomes higher.

As the possibility that the object 8 influences the vehicle 1 becomes higher, the visual attractivity of the visual guidance virtual image GVI can be enhanced. Accordingly, it is possible to further reduce the chance that the driver U overlooks the object 8 which should be seen.

The second embodiment described above supports the following structure.

The visual guidance device 50 guides the visual line of the driver U in the vehicle 41 to the object 48 existing ahead of the vehicle 41. The visual guidance device 50 includes the object position recognition unit 72 for recognizing the position of the object 48, the driver position recognition unit 73 for recognizing the position of the driver U in the vehicle 41, and the display control unit 74 for causing the display device 51 to display the visual guidance virtual image GVI on the windshield 45 of the vehicle 41. Based on the position of the object 48 recognized by the object position recognition unit 72, and the position of the driver U recognized by the driver position recognition unit 73, the display control unit 74 corrects the display position of the visual guidance virtual image GVI.

In the attention calling method in which the visual guidance device 50 performs the visual guidance, the position of the object 48 is recognized, the position of the driver U in the vehicle 41 is recognized, the display device 51 is caused to display the visual guidance virtual image GVI on the windshield 45 of the vehicle 41, and the display position of the visual guidance virtual image GVI is corrected based on the recognized position of the object 48, and the recognized position of the driver U.

With the visual guidance device 50 and the attention calling method, the display position of the visual guidance virtual image GVI may be set in consideration of the position of the object 48 existing ahead of the vehicle 41, and the position of the driver U in the vehicle 41. Even in the case of change in the position of the driver U in the vehicle 41, the object 48 is allowed to exist ahead of the visual line of the driver U from the visual guidance virtual image GVI. This makes it possible to guide the visual line of the driver U accurately to the object 48 even in the case of change in the position of the driver U in the vehicle 41.

In the top view of the vehicle 41, the display control unit 74 corrects the position at which the windshield 45 intersects the line connecting the position of the object 48 recognized by the object position recognition unit 72 to the position of the driver U recognized by the driver position recognition unit 73 as the display position of the visual guidance virtual image GVI.

This allows the object 48 to exist ahead of the visual line of the driver U from the visual guidance virtual image GVI. Even in the case of change in the position of the driver U in the vehicle 41, the visual line of the driver U can be guided to the object 48 more accurately.

The driver position recognition unit 73 recognizes the position of the head HD of the driver U as the position of the driver U.

The display position can be corrected on the basis of the head HD having eyes. This allows the object 48 to exist ahead of the visual line of the driver U to the visual guidance virtual image GVI more accurately. Even in the case of change in the position of the driver U in the vehicle 41, the visual line of the driver U can be guided to the object 48 more accurately.

When the driver U sees the visual guidance virtual image GVI, the display control unit 74 causes the display device 51 to display the visual guidance virtual image GVI which is overlaid with the object 48, or matched at the position of the object 48 in the vehicle width direction.

When seeing the windshield 45 while being seated on the driver's seat 42, the driver U is allowed to identify the object 48 to which the visual guidance virtual image GVI guides even if the object 48 is positioned above the displayable upper limit line L1.

The third to the sixth embodiments described above support the following structures.

Structure 1

The attention calling system includes the light projection device for outputting the visual display which is visually recognizable by the operator of the moving body on the windshield of the moving body, and the attention calling device for controlling the light projection device to call the operator's attention to the object around the moving body by means of the visual display. The attention calling device includes the detection unit for detecting the object in the area surrounding the moving body, and the attention calling unit for outputting the visual display in the predetermined display range on the windshield of the moving body by controlling the light projection device. The display range is the horizontally extending belt-like range on the windshield in the width direction of the moving body. The attention calling unit outputs the visual display at the horizontal position in the display range corresponding to the horizontal position of the object on the windshield seen from the position of the operator.

The attention calling system according to the structure 1 displays the visual display VI at the horizontal position corresponding to the horizontal position of the object seen from the operator in the belt-like display range on the windshield. The attention calling system according to the structure 1 significantly reduces the opportunity that the operator sees the object overlaid with the visual display VI. This makes it possible to call the operator's attention to various traffic participants existing in the environment surrounding the moving body without distracting the operator's attention.

Structure 2

In the attention calling system according to the structure 1, the light projection device outputs the visual display by projecting predetermined shaped light rays onto the windshield.

The attention calling system as the structure 2 ensures to call the operator's attention to the object without distracting the attention by means of the simple visual display.

Structure 3

In the attention calling system according to the structure 1 or 2, the light projection device includes multiple light sources arranged on the lower part of the windshield along the width direction of the moving body.

In the attention calling system as the structure 3, the simply configured light projection device allows the operator's attention to be called to the object.

Structure 4

In the attention calling system according to any one of the structures 1 to 3, when the object in the area surrounding the moving body is detected at the position deviating from the predetermined front visual field range having the position of the operator seated on the operator's seat of the moving body defined as the center, the sound for the object orientation is generated in the interior of the moving body.

In the attention calling system as the structure 4, when the object is detected in the area which requires the operator to move the face for visual confirmation, the operator is notified of orientation of the object by the sound. This makes it possible to call the operator's attention to the object without distracting the attention to the object.

Structure 5

In the attention calling system according to any one of the structures 1 to 4, the object is the real object having the probability of contact with the moving body equal to or higher than the predetermined value.

In the attention calling system as the structure 5, the real object which may be the risk to the moving body operation is narrowed down so that the direction of such real object is indicated by the visual display. This makes it possible to call the operator's attention to the object without distracting the attention.

Structure 6

The attention calling method to be implemented by the computer includes the steps of detecting an object existing in an area surrounding a moving body, and outputting the visual display in the predetermined display range on the windshield of the moving body by controlling the light projection device provided in the interior of the moving body. The display range is the horizontally extending belt-like range on the windshield in the width direction of the moving body. In the step of outputting the visual display, the visual display is output at the horizontal position in the display range corresponding to the horizontal position of the object on the windshield seen from the position of the operator in the moving body.

The attention calling method as the structure 6 implements the attention calling system configured according to the structure 1 by allowing the computer to execute the program.

REFERENCE SIGNS LIST 1, 41, 100, 200, 201, 204 vehicle (moving body)
2, 42 driver's seat
102 operator's seat
3, 43, 103 front passenger seat
4, 44, 104 steering wheel
5, 45, 105 windshield
6, 46, 106 instrumental panel
7, 47 LED array
8, 48 object
8a, 8b, 8c, 8d, 8e, 8f person
8g another vehicle
10, 50 visual guidance device
11, 51 display device
12, 52 driver monitoring camera
13, 53 front camera
14, 54 position detection device
30, 70 processor
31, 71 object recognition unit
32, 72 object position recognition unit
33, 73 driver position recognition unit
34 status recognition unit
35, 74 display control unit
36, 75 memory
37, 76 processor
38, 77 memory
110 rearview mirror
112 left fender mirror
114 right fender mirror
120, 300, 400, 500 attention calling system
122 front light projection device
124, 324, 424, 502 attention calling device
130, 302, 402, 508 processor
131, 303, 403, 510 storage unit
132, 512 detection unit
133, 304, 404, 514 attention calling unit
140 front object sensor
142 in-vehicle speaker
144 in-vehicle camera
146 brake pedal sensor
148 accelerator pedal sensor
150 rear object sensor
152 right-side object sensor
154 left-side object sensor
156 HUD
158 left door glass
160 right door glass
162 rear glass
202 motorbike
203 pedestrian
306, 406 behavior detection unit
308 classification unit
310 cognition skill evaluation unit
312 cognition proficiency information
410 reaction skill evaluation unit
412 risk calculation unit
414 reaction proficiency information
504 transverse light projection device
506 rear light projection device
520 object radar display
522 vehicle icon
524 ring-shaped display
526 arrow
HA display range
HD head
AD, AD-10, AD-12, AD-14, AD-16, AD-18, AD-20, AD-22, U driver (operator)
GVI visual guidance virtual image
VI, VI-11, VI-12, VI-13, VI-14, VI-21, VI-22, VI-23, VI-24, VI-31, VI-32, VI-33, VI-34 visual display

The invention claimed is:

1. A visual guidance device for guiding a visual line of an operator of a moving body to an object existing ahead of the moving body, the visual guidance device comprising:
an object recognition unit for recognizing the object; and
a display control unit for causing a display device to display a visual guidance virtual image for guiding the visual line of the operator at a position corresponding to the object recognized by the object recognition unit on a windshield of the moving body, wherein the display control unit sets a length of the visual guidance virtual image to be displayed by the display device in a width direction of the moving body to a length in accordance with a status of the object existing ahead of the moving body,
wherein when the number of objects existing ahead of the moving body is m or more (m is an integer equal to or more than three), the length of the visual guidance virtual image to be displayed by the display device in the width direction is set to a length extending across an entire width of a display range of the display device.

2. The visual guidance device according to claim 1, wherein in the existence of the object moving ahead of the moving body, the display control unit sets the length of the visual guidance virtual image to be displayed by the display device in the width direction to a length corresponding to a distance from a current position of the object to a position taken after movement by a predetermined period of time.

3. The visual guidance device according to claim 2, wherein the display control unit causes the display device to display the visual guidance virtual image extending in a moving direction of the object from a position corresponding to the current position of the object.

4. The visual guidance device according to claim 1, wherein in the existence of multiple objects ahead of the moving body, the display control unit sets the length of the visual guidance virtual image to be displayed by the display device in the width direction to a length corresponding to a distance between two objects which are separated farthest in the width direction.

5. The visual guidance device according to claim 4, wherein when the number of the objects existing ahead of the moving body is n or more (n is an integer equal to or more than three), the display control unit causes the display device to display the visual guidance virtual image in a display mode different from a display mode of the visual guidance virtual image to be displayed when the n or more objects do not exist ahead of the moving body.

6. The visual guidance device according to claim 1, wherein when the visual guidance virtual image is displayed by the display device, the display control unit makes the length of the visual guidance virtual image in the width direction longer as a possibility of the object influencing the moving body becomes higher.

7. An attention calling system comprising:
a display device for outputting a visual display which is visually recognizable by an operator of a moving body on a windshield of the moving body; and
an attention calling device for controlling the display device to call the operator's attention to the object around the moving body by means of the visual display, wherein:
the attention calling device includes an object recognition unit for detecting the object existing in an area surrounding the moving body, and a display control unit for outputting the visual display in a predetermined display range on the windshield of the moving body by controlling the display device;
the display range is a horizontally extending belt-like range on the windshield in a width direction of the moving body; and
the display control unit outputs the visual display at a horizontal position in the display range corresponding to a horizontal position of the object on the windshield seen from a position of the operator,
wherein when the number of the objects existing ahead of the moving body is m or more (m is an integer equal to or more than three), the length of the visual display to be displayed by the display device in the width direction is set to a length extending across an entire width of a display range of the display device.

8. An attention calling system comprising:
the visual guidance device according to claim 1; and
a display device for outputting a visual display which is visually recognizable by an operator of a moving body on a windshield of the moving body, wherein:
the visual guidance device includes an object recognition unit for detecting an object existing in an area surrounding the moving body, and a display control unit for outputting the visual display in a predetermined display range on the windshield of the moving body by controlling the display device;
the display range is a horizontally extending belt-like range on the windshield in a width direction of the moving body; and
the display control unit outputs the visual display at a horizontal position in the display range corresponding to a horizontal position of the object on the windshield seen from a position of the operator.

9. The attention calling system according to claim 7, wherein the display device is a light projection device which outputs the visual display by projecting predetermined shaped light rays onto the windshield.

10. The attention calling system according to claim 7, wherein the display device includes multiple light sources arranged on a lower part of the windshield along the width direction of the moving body.

11. The attention calling system according to claim 7, wherein when the object in the area surrounding the moving body is detected at a position deviating from a predetermined front visual field range having a position of the operator seated on an operator's seat of the moving body defined as the center, a sound for the object orientation is generated in an interior of the moving body.

12. The attention calling system according to claim 7, wherein the object is a real object having a possibility of contact with the moving body equal to or higher than a predetermined value.

13. The visual guidance device according to claim 1, further comprising:
an object position recognition unit for recognizing a position of the object; and
an operator position recognition unit for recognizing a position of the operator in the moving body, wherein the display control unit corrects a display position of the visual guidance virtual image based on the position of the object recognized by the object position recognition unit, and the position of the operator recognized by the operator position recognition unit.

14. The visual guidance device according to claim 13, wherein, in a top view of the moving body, the display control unit corrects a position at which the windshield intersects a line connecting the position of the object recognized by the object position recognition unit to the position of the operator recognized by the operator position recognition unit as a display position of the visual guidance virtual image.

15. The visual guidance device according to claim 13, wherein the operator position recognition unit recognizes a position of a head of the operator as the position of the operator.

16. The visual guidance device according to claim 13, wherein when the operator sees the visual guidance virtual image, the display control unit causes the display device to display the visual guidance virtual image which is overlaid with the object, or matched at a position of the object in a horizontal direction.

17. An attention calling method implemented by a computer, comprising the steps of:
detecting an object existing in an area surrounding a moving body; and
outputting a visual display in a predetermined display range on a windshield of the moving body by controlling a display device provided in an interior of the moving body, wherein:
the display range is a horizontally extending belt-like range on the windshield in a width direction of the moving body; and
in the step of outputting the visual display, the visual display is output at a horizontal position in the display range corresponding to a horizontal position of the object on the windshield seen from a position of an operator in the moving body,
wherein when the number of the objects existing ahead of the moving body is m or more (m is an integer equal to or more than three), the length of the visual display to be displayed by the display device in the width direction is set to a length extending across an entire width of a display range of the display device.

18. An attention calling method implemented by a visual guidance device for guiding a visual line of an operator of a moving body to an object existing ahead of the moving body, wherein:
the object is recognized; and
when a display device is caused to display a visual guidance virtual image for guiding the visual line of the operator to a position corresponding to the object recognized on a windshield of the moving body, a length of the visual guidance virtual image to be displayed by the display device in a width direction of the moving body is set to a length in accordance with a status of the object existing ahead of the moving body,
wherein when the number of the objects existing ahead of the moving body is m or more (m is an integer equal to or more than three), the length of the visual guidance virtual image to be displayed by the display device in the width direction is set to a length extending across an entire width of a display range of the display device.

19. An attention calling method implemented by a visual guidance device for guiding a visual line of an operator of a moving body to an object existing ahead of the moving body, wherein:
- a position of the object is recognized;
- a position of the operator in the moving body is recognized;
- a display device is caused to display a visual guidance virtual image on a windshield of the moving body for guiding the visual line of the operator to the object; and
- when displaying the visual guidance virtual image, a display position of the visual guidance virtual image is corrected based on the recognized position of the object, and the recognized position of the operator,
- wherein when the number of the objects existing ahead of the moving body is m or more (m is an integer equal to or more than three), the length of the visual guidance virtual image to be displayed by the display device in the width direction is set to a length extending across an entire width of a display range of the display device.

20. A non-transitory computer-readable storage medium executed by a computer of a visual guidance device for guiding a visual line of an operator of a moving body to an object existing ahead of the moving body, wherein when the object is recognized, and a display device is caused to display a visual guidance virtual image for guiding the visual line of the operator on a windshield of the moving body at a position corresponding to the recognized object, the computer is caused to set a length of the visual guidance virtual image to be displayed by the display device in a width direction of the moving body to a length in accordance with a status of the object existing ahead of the moving body,
- wherein when the number of the objects existing ahead of the moving body is m or more (m is an integer equal to or more than three), the length of the visual guidance virtual image to be displayed by the display device in the width direction is set to a length extending across an entire width of a display range of the display device.

* * * * *